US006487305B2

(12) United States Patent
Kambe et al.

(10) Patent No.: US 6,487,305 B2
(45) Date of Patent: *Nov. 26, 2002

(54) DEFORMED MAP AUTOMATIC GENERATION SYSTEM INCLUDING AUTOMATIC EXTRACTION OF ROAD AREA FROM A BLOCK MAP AND SHAPE DEFORMATION OF AT LEAST ONE ROAD AREA DRAWN IN THE MAP

(75) Inventors: Nobuhiro Kambe, Tokyo; Akihiro Abe, Yokohama; Takanori Shimada, Funabashi; Go Nakano, Tokyo, all of (JP)

(73) Assignee: Matsushita Electric Industrial Co. Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/878,180

(22) Filed: Jun. 18, 1997

(65) Prior Publication Data

US 2001/0040984 A1 Nov. 15, 2001

(30) Foreign Application Priority Data

Jun. 19, 1996 (JP) .............................. 8-177145
Jun. 24, 1996 (JP) .............................. 8-181715
Oct. 15, 1996 (JP) .............................. 8-291203
May 9, 1997 (JP) .............................. 9-134518

(51) Int. Cl.[7] ............................ G06K 9/00; G06K 9/36; G08C 1/123
(52) U.S. Cl. .................. 382/113; 382/241; 382/242; 340/995
(58) Field of Search ................. 382/113, 192, 382/241, 242; 340/995

(56) References Cited

U.S. PATENT DOCUMENTS 5,025,261 A  6/1991 Ohta et al. .................. 342/357

(List continued on next page.)

FOREIGN PATENT DOCUMENTS

DE  4219326  12/1992

(List continued on next page.)

OTHER PUBLICATIONS

MicroSation PC Reference Guide; Bentley Systems, Inc. and Intergraph Corporation, pp. R1–1, R3–1 to R3–27, R5–1 to R5–19, R1–125 to R1–130; U2–1 to U2–20, U3–45, to U3–48, U3–99 to U3–104, U3–129 to U3–138 and U3–213 U3–233, 1991.*

(List continued on next page.)

*Primary Examiner*—Amelia M. Au
*Assistant Examiner*—Mehrdad Dastouri
(74) *Attorney, Agent, or Firm*—Israel Gopstein; Clark & Brody

(57) ABSTRACT

A vector block information indicating a plurality of line segment rows is read out from a block map. Each line segment row divides an area of a block from an area of a road in an image drawing region. Each point at which one end of a line segment row contacts with a boundary line of the image drawing region is set as a boundary point. In this case, a road crossing the boundary line of the image drawing region is indicated by a pair of line segment rows having a pair of boundary points close to each other. To determine an area of the road, the pair of boundary points are connected with each other through a connecting line segment. Therefore, a road area in the image drawing region can be automatically extracted from the block map. In addition, an end area of the road placed at the boundary line of the image drawing region is reshaped to have two right-angle corners at the end area of the road, a length of a road area at the boundary line of the image drawing region is shortened, an area of a narrow road is deleted from the road area, an area of a narrow road is widened, or a plurality of blocks placed in an administrative district is unified by deleting areas of a plurality of roads dividing the blocks.

16 Claims, 57 Drawing Sheets

U.S. PATENT DOCUMENTS

| | | | | |
|---|---|---|---|---|
| 5,170,165 A | * | 12/1992 | Iihoshi et al. | 340/995 |
| 5,278,946 A | * | 1/1994 | Shimada et al. | 707/104 |
| 5,448,485 A | * | 9/1995 | Ishibashi et al. | 364/443 |
| 5,448,696 A | * | 9/1995 | Shimada et al. | 345/357 |
| 5,464,444 A | * | 11/1995 | Kawamura et al. | 395/133 |
| 5,467,411 A | * | 11/1995 | Tanaka et al. | 382/113 |
| 5,471,205 A | | 11/1995 | Izawa | 340/995 |
| 5,502,640 A | * | 3/1996 | Yagyu et al. | 340/995 |
| 5,553,211 A | * | 9/1996 | Uotani | 395/135 |
| 5,583,494 A | * | 12/1996 | Mizutani et al. | 340/995 |
| 5,602,564 A | * | 2/1997 | Iwamura et al. | 345/119 |
| 5,602,570 A | * | 2/1997 | Capps et al. | 345/173 |
| 5,638,280 A | * | 6/1997 | Nishimura et al. | 364/449 B |
| 5,793,310 A | * | 8/1998 | Watanabe et al. | 340/995 |
| 5,848,374 A | * | 12/1998 | Wakabayashi et al. | 340/995 |

FOREIGN PATENT DOCUMENTS

| | | |
|---|---|---|
| EP | 0673010 | 9/1995 |
| JP | 1-317036 | 12/1989 |
| JP | 3-3083 | 1/1991 |
| JP | 04-141782 | 5/1992 |
| JP | 4-141782 | 5/1992 |
| JP | 4-152724 | 5/1992 |
| JP | 4-266228 | 9/1992 |
| JP | 5-53498 | 3/1993 |
| JP | 5-89399 | 4/1993 |
| JP | 5-142993 | 6/1993 |
| JP | 5-250420 | 6/1993 |
| JP | 6-120875 | 4/1994 |
| WO | 9607110 | 3/1996 |

OTHER PUBLICATIONS

"Guide to HTML"; by L. Lemay; first published on Jun. 30, 1995 (with partial English translation).

"Information Systems for the Optimal Routes in Urban Transportation"; by M. Kato; Mar., 1987; (with partial English translation).

"Network Information Extraction Method from a Digitized Street Map Data Base"; by M. Kato et al; 1988; (with partial English translation).

"VRML's 3D World Sculpting the Next Generation Internet"; by Y. Andoh; Oct., 1996 (with partial English translation).

"Electronics, Information and Communication" published by Fujitsu (with partial English translation).

"Overview of Geographic Information System and National Spatial Data Infrastructure"; by K. Akeno et al; Journal of IPSJ vo. 38, No. 2, Feb., 1997 (with partial English translation).

"Map Soft"; published by Nikkei Pasokon; Feb. 26, 1996 (with partial English translation).

"Intelligent Transport Systems (ITS)"; published by Nikkei Newspaper (with partial English translation).

"Station Pert"; published by Val Lab. (with partial English translation).

* cited by examiner

FIG. 4(a)    FIG. 4(b)
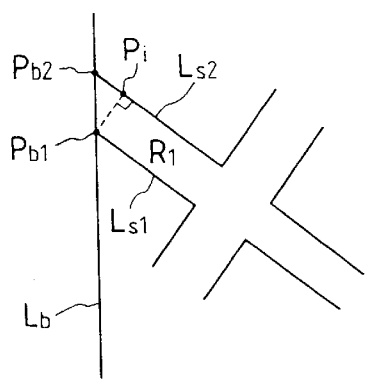
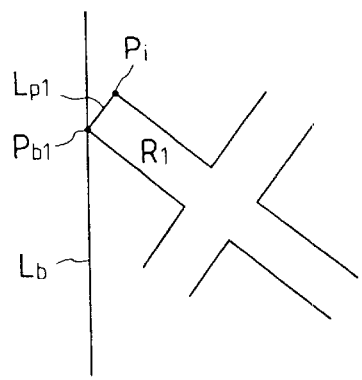
FIG. 4(c)
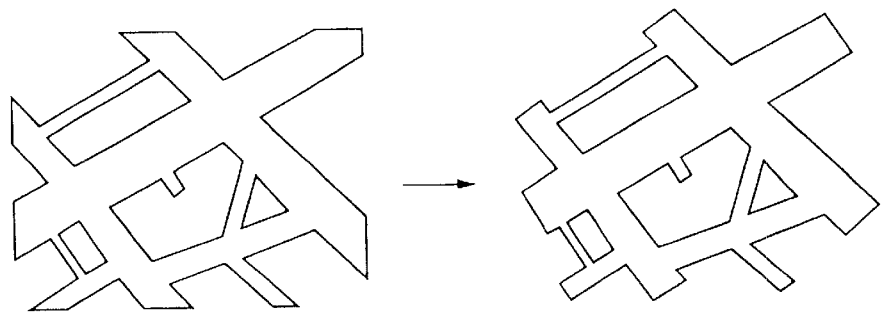
FIG. 5(a)  FIG. 5(b)   FIG. 5(c)
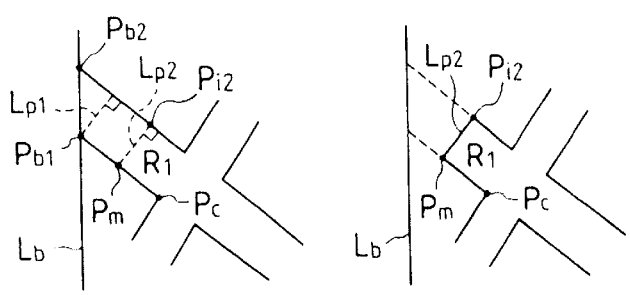
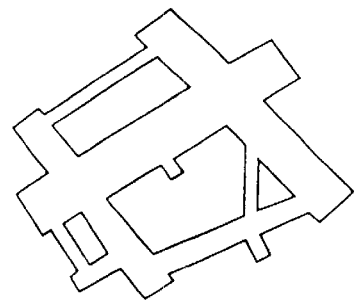

ADMINISTRATIVE DISTRICT

FIG. 20

ROAD TABLE

NODE SUB-TABLE

| NODE NO. | LONGITUDE | LATITUDE |
|---|---|---|
| 1 | 100.5 | 550.2 |
| 2 | 180.3 | 675.2 |
| ⋮ | | |

ARC SUB-TABLE

| ARC NO. | STARTING POINT | END POINT | LENGTH |
|---|---|---|---|
| 1 | 2 | 1 | 90.1 |
| | | | |

REGION NAME SUB-TABLE

| REGION NAME | NODE NUMBER ROW | ARC NUMBER ROW |
|---|---|---|
| OHI TOWN | 1, 2, ⋯ | 1, 2, ⋯ |
| ⋮ | | |

TARGET OBJECT TABLE

| NAME | CATEGORY OF BUSINESS | POSITION INFORMATION (LONGITUDE, LATITUDE) | ADDRESS | TELEPHONE NUMBER | NEAREST STATION | MAIN INSTITUTION FLAG |
|---|---|---|---|---|---|---|
| ROPPONGI PUBLISHING | PUBLISHING | (135.1, 550.1) | 4-5-15 SHINAGAWA | 03-5551-2179 | SHINAGAWA STATION | ON |
| | | | | | | |

TRAFFIC TABLE

| STARTING STATION | ARRIVING STATION | TRAFFIC ROUT | INTERMEDIATE STATION | NECESSARY TIME | FARE |
|---|---|---|---|---|---|
| ROPPONGI | GINZA | HIBIYA LINE | KAMIYA St. KASUMIGASEKI St. HIBIYA St. | 15 MIN. | 180 YEN |
| | | | | | |

| ADDRESS RECORDS |||
| NAME | ADDRESS | TELEPHONE NUMBER |
| --- | --- | --- |
| ROPPONGI PUBLISHING | 4-5-15 SOUTH SHINAGAWA SHINAGAWA WARD | 03-5551-2179 |
|  |  |  |
|  |  |  |

( SURROUNDING AREA SEARCH )

RETRIEVAL REQUEST

RETRIEVAL OF ROUT MAP
STARTING POINT ; SWISS EMBASSY
ARRIVING POINT ; MATSUSHITA COMPANY OFFICE
MEANS OF TRANSPORT ; (WALKING) (SUBWAY TRAIN) (BUS)

(SEARCH EXECUTION)

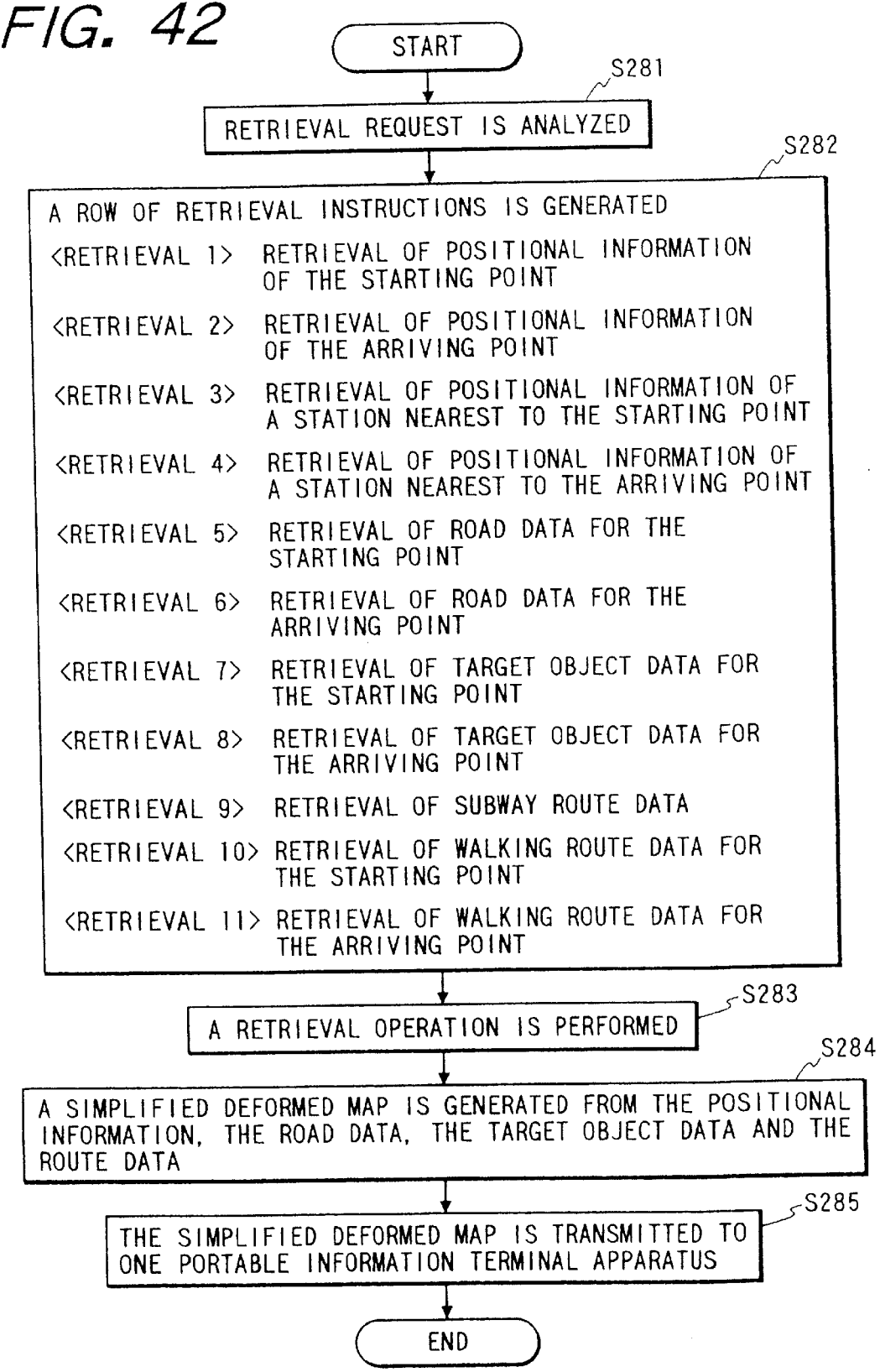

| RETRIEVAL REQUEST | ROW OF RETRIEVAL INSTRUCTIONS |
|---|---|
| ROPPONGI STATION | <RETRIEVAL 1> RETRIEVAL OF POSITIONAL INFORMATION<br><RETRIEVAL 2> RETRIEVAL OF ROAD DATA<br><RETRIEVAL 3> RETRIEVAL OF TARGET OBJECT DATA |
| ⋮ | ⋮ |

FIG. 46

ROAD TABLE #3
ROAD TABLE #2
ROAD TABLE #1

NODE SUB-TABLE

| NODE NO. | LONGITUDE | LATITUDE |
|---|---|---|
| 1 | 100.5 | 550.2 |
| 2 | 180.3 | 675.2 |
| ⋮ | | |

ARC SUB-TABLE

| ARC NO. | STARTING POINT | END POINT | LENGTH |
|---|---|---|---|
| 1 | 2 | 1 | 90.1 |
| ⋮ | | | |

TARGET OBJECT TABLE #3
TARGET OBJECT TABLE #2
TARGET OBJECT TABLE #1

| NAME | CATEGORY OF BUSINESS | POSITION INFORMATION (LONGITUDE, LATITUDE) | ADDRESS | TELEPHONE NUMBER | NEAREST STATION | MAIN INSTITUTION FLAG |
|---|---|---|---|---|---|---|
| ROPPONGI PUBLISHING | PUBLISHING | (135.1, 550.1) | 4-5-15 SHINAGAWA | 03-5551-2179 | SHINAGAWA STATION | ON |

TRAFFIC TABLE #3
TRAFFIC TABLE #2
TRAFFIC TABLE #1

| STARTING STATION | ARRIVING STATION | TRAFFIC ROUTE | INTERMEDIATE STATIONS | NECESSARY TIME | FARE |
|---|---|---|---|---|---|
| ROPPONGI | GINZA | HIBIYA LINE | KAMIYACHO KASUMIGASEKI HIBIYA | 15 MIN. | 180 YEN |

RETRIEVAL REQUEST MANAGING TABLE

| RETRIEVAL REQUEST | ROAD TABLE NO. | TARGET OBJECT TABLE NO. | TRAFFIC TABLE NO. |
|---|---|---|---|
| NAME "ROPPONGI PUBLISHING" | #1 | #1 | #1 |
| | | | |

FIG. 66

WATER GROUP FIGURE TABLE
INSTITUTION FIGURE TABLE
ROAD FIGURE TABLE

NODE SUB-TABLE

| NODE NO. | LONGITUDE | LATITUDE |
|---|---|---|
| 1 | 1030 | 560 |
| 2 | 1034 | 562 |
|  |  |  |
|  |  |  |

ARC SUB-TABLE

| ARC NO. | STARTING POINT | END POINT | LENGTH |
|---|---|---|---|
| 1 | 2 | 1 | 90.1 |
|  |  |  |  |
|  |  |  |  |

INSTITUTION INFORMATION TABLE

| INSUTITUTION NAME | INSUTITUTION TYPE | REPRESENTATIVE POINT | ADDRESS | ZIP CODE | TELEPHONE NUMBER | SELF-GOVERNING BODY | TIME DEPENDING DATA |
|---|---|---|---|---|---|---|---|
| B FIREHOUSE | FIREHOUSE | (1100, 560) | 4-5-15 SHINAGAWA | 150 | 03-5460-2747 | SHINAGAWA WARD | SUNLIGHT RATE DATA |
|  |  |  |  |  |  |  |  |
|  |  |  |  |  |  |  |  |

FIG. 68

```
GEOGRAPHICAL SPATIAL DATA
  (TYPE : RESIDENCE MAP)
  (NO. : TOKYO 233340)
  COMPOSING OBJECTS
    OBJ 1
      (SHAPE ; POLYGON)
      (POSITIONAL INFORMATION ; 1000.550,1200.550,1200.575,1000.575)
      (ATTRIBUTES ;
        (HEIGHT ; 234)
        (FIGURE TYPE ; BUILDING)
        (INSTITUTION TYPE ; FIREHOUSE)
        (INSTITUTION NAME ; B FIREHOUSE)
        (TELEPHONE NUMBER ; 119)
        (ADDRESS ; 4-5-15 EAST SINAGAWA SINAGAWA WARD)
        (ZIP CODE ; 150))
      (FUNCTION ; NOT DEFINED)
      (PHASE RELATIONSHIP ; (INCLUSION RELATIONSHIP, OBJ 2))
      (DEPENDENT RELATIONSHIP ; (ADMINISTERING SELF-GOVERNING BODY,
                                 SHINAGAWA WARD))
      (TIME CHARACTERISTIC ; DATA RENEWING DATE, MARCH 5, 1997)
           :
    OBJ 8
      (SHAPE ; POLYGON)
      (POSITIONAL INFORMATION ; 1020.550,1030.550,1030.575,1020.575)
      (ATTRIBUTES ;
        (HEIGHT ; WATER GROUP)
        (INSTITUTION TYPE ; RIVER)
        (INSTITUTION NAME ; TOKYO RIVER)
        (WATER AMOUNT ; 10 TON/SEC. ON AVERAGE)
      (FUNCTION ; NOT DEFINED)
      (PHASE RELATIONSHIP ; (CROSSING RELATIONSHIP, OBJ 7, OBJ 9))
      (DEPENDENT RELATIONSHIP ; (ADMINISTERING SELF-GOVERNING BODY,
                                 TOKYO METROPOLIS))
      (TIME CHARACTERISTIC ; DEFINED)
```

FIG. 80

DESIGN DESIGNATING PARAMETER SELECTING IMAGE

ROAD REMOVAL
- ① REMOVAL OF ROADS OTHER THAN ROADS ALONG A ROUTE
- ② SHORTENING OF LONG ROAD AND REMOVAL OF ROADS OTHER THAN ROADS ALONG A ROUTE
- ③ NO REMOVAL OF ROAD

CLOSING OF OPEN END OF ROAD
- ① CLOSING WITH A STRAIGHT LINE
- ② CLOSING WITH A CURVED LINE
- ③ NO CLOSING

CROSSING ANGLE AT INTERSECTION
- ① RIGHT ANGLE
- ② NOT PERFORMED

STRAIGHTENING OF ROAD
- ① STRAIGHTENING
- ② NOT PERFORMED

SIMPLIFYING OF ROAD
- ① SIMPLIFYING
- ② NOT PERFORMED

DISPLAY OF ROUT INFORMATION
- ① DISPLAY
- ② NO DISPLAY

MEANS OF TRANSPORT
- ① WALKING
- ② CAR

FIG. 82(a)

DESIGN DESIGNATING PARAMETER SELECTING IMAGE

ROAD REMOVAL
- SELECTED ① REMOVAL OF ROADS OTHER THAN ROADS ALONG A ROUTE
- ② SHORTENING OF LONG ROAD AND REMOVAL OF ROADS OTHER THAN ROADS ALONG A ROUTE
- ③ NO REMOVAL OF ROAD

CLOSING OF OPEN END OF ROAD
- SELECTED ① CLOSING WITH A STRAIGHT LINE
- ② CLOSING WITH A CURVED LINE
- ③ NO CLOSING

CROSSING ANGLE AT INTERSECTION
- ① RIGHT ANGLE
- SELECTED ② NOT PERFORMED

STRAIGHTENING OF ROAD
- ① STRAIGHTENING
- SELECTED ② NOT PERFORMED

SIMPLIFYING OF ROAD
- ① SIMPLIFYING
- SELECTED ② NOT PERFORMED

DISPLAY OF ROUT INFORMATION
- ① DISPLAY
- SELECTED ② NO DISPLAY

MEANS OF TRANSPORT
- ① WALKING
- SELECTED ② CAR

FIG. 83(a)

```
DESIGN DESIGNATING PARAMETER SELECTING IMAGE

ROAD REMOVAL
              ①   REMOVAL OF ROADS OTHER THAN ROADS ALONG A ROUTE
    SELECTED  ②   SHORTENING OF LONG ROAD AND REMOVAL OF ROADS
                  OTHER THAN ROADS ALONG A ROUTE
              ③   NO REMOVAL OF ROAD
    CLOSING OF OPEN END OF ROAD
              ①   CLOSING WITH A STRAIGHT LINE
              ②   CLOSING WITH A CURVED LINE
    SELECTED  ③   NO CLOSING

CROSSING ANGLE AT INTERSECTION
    SELECTED  ①   RIGHT ANGLE
              ②   NOT PERFORMED

STRAIGHTENING OF ROAD
    SELECTED  ①   STRAIGHTENING
              ②   NOT PERFORMED

SIMPLIFYING OF ROAD
    SELECTED  ①   SIMPLIFYING
              ②   NOT PERFORMED

DISPLAY OF ROUT INFORMATION
    SELECTED  ①   DISPLAY
              ②   NO DISPLAY

MEANS OF TRANSPORT
    SELECTED  ①   WALKING
              ②   CAR
```

FIG. 84(a)

```
         DESIGN DESIGNATING PARAMETER SELECTING IMAGE

ROAD REMOVAL
           ①   REMOVAL OF ROADS OTHER THAN ROADS ALONG A ROUTE
           ②   SHORTENING OF LONG ROAD AND REMOVAL OF ROADS
               OTHER THAN ROADS ALONG A ROUTE
   SELECTED ③   NO REMOVAL OF ROAD
      CLOSING OF OPEN END OF ROAD
           ①   CLOSING WITH A STRAIGHT LINE
           ②   CLOSING WITH A CURVED LINE
   SELECTED ③   NO CLOSING

CROSSING ANGLE AT INTERSECTION
           ①   RIGHT ANGLE
   SELECTED ②   NOT PERFORMED

STRAIGHTENING OF ROAD
           ①   STRAIGHTENING
   SELECTED ②   NOT PERFORMED

SIMPLIFYING OF ROAD
           ①   SIMPLIFYING
   SELECTED ②   NOT PERFORMED

DISPLAY OF ROUT INFORMATION
           ①   DISPLAY
   SELECTED ②   NO DISPLAY

MEANS OF TRANSPORT
   SELECTED ①   WALKING
           ②   CAR
```

DEFORMED MAP AUTOMATIC GENERATION SYSTEM INCLUDING AUTOMATIC EXTRACTION OF ROAD AREA FROM A BLOCK MAP AND SHAPE DEFORMATION OF AT LEAST ONE ROAD AREA DRAWN IN THE MAP

BACKGROUND OF THE INVENTION

1. Field of the Invention

The present invention relates generally to a road area extracting apparatus in which a road area is extracted from areas written in a block map, and more particularly to a road area extracting apparatus in which a road area placed in a designated block is automatically extracted and a shape of the road area is deformed according to a user's intention. Also, the present invention relates to a deformed map automatic generation system in which a simplified deformed map is automatically generated from road area data obtained in the road area extracting apparatus. Also, the present invention relates to a map information providing system in which map information generated by the deformed map automatic generation system and related information related to the map information are efficiently provided for a small sized portable information terminal apparatus having a radio communication function in response to a retrieval request transmitted from the portable information terminal apparatus so as to easily realize the map information and the related information. Also, the present invention relates to a geographical information providing system in which geographical spatial data is provided for an information terminal apparatus through a communication network. Also, the present invention relates to a geographical information describing method for describing geographical spatial data transmitted through a communication network.

2. Description of the Related Art for Road Area Extracting Apparatus

As a vector topographical map, a road map having vector data of roads and a block map having vector data indicating block shapes are well-known. In case of the block map, areas other than block areas are recognized as roads.

2.1. Previously Proposed Art

For the vector map, a technique that an area between two line segments almost parallel to each other is regarded as a road and a road network is extracted from the vector map (Published Unexamined Japanese patent Application No. H3-3083 of 1991), a technique that road areas or areas other than road areas are painted out, the road areas painted out or the areas painted out are thinned to form line segments, the line segments are expressed by vectors and a road network is made of the vectors (Published Unexamined Japanese patent Application No. H4-141782 of 1992), and a technique that a closed area of a vector map having block information is traced clockwise, feature points such as an end point, a corner point and the like are detected from the closed area, a vector row connecting the feature points with each other is formed and a road network is made of the vector row (Information Processing Society, 36-th Nation Meeting Document, pp. 2287–2288, 1988) are disclosed.

2.2. Problems to be Solved by the Invention

However, because the road network is only extracted from the vector map in each of the above techniques, a shape of a road is not detected, or the road shape is not deformed. That is, because a portable information system has been recently advanced, a service that map data of positions close to a current position is provided at a real time or a service that a route to a destination is displayed is required. In this information provision, it is required that a map is displayed so as to be easily seen. Also, it is required that a volume of transmitted map data is reduced as small as possible.

3. Description of the Related Art for Automatic Generation System of Deformed Map and Map Information Providing System

3.1. Previously Proposed Art

As a technique for preparing a deformed map, an abbreviated method of a road line segment in vehicle navigation map (Published Unexamined Japanese patent Application No. H5-53498 of 1993), a thinning-out method for deleting a building, of which an area is lower than a prescribed area, according to a contraction scale rate (Published Unexamined Japanese patent Application No. H5-250420 of 1993), and a method for automatically generating an outline map of positions at the periphery of an address handwritten by a user (Published Unexamined Japanese patent Application No. H5-142993 of 1993) are well-known.

Also, as a technique of a radio-transmission of map data, a method for transmitting map information corresponding to a location of a mobile body at any time or on occasion (Published Unexamined Japanese patent Applications No. H1-317036 of 1989, No. 4-152724 of 1992, No. H4-266228 of 1992 and No. H6-120875 of 1994) is well-known.

Also, as a system in which traffic information is provided for a running vehicle by an audio communication and the traffic information is displayed with map information, Vehicle Information & communication system (VICS), Advanced Traffic Information Service (ATIS) ("All of Intelligent Transport systems", edited by Image Technical Research, published by Nippon Keizai newspaper publishing company) and Traffic Information Communication System (Published Unexamined Japanese patent Application No. H5-89399 of 1993) are well-known.

Also, as a system for providing town information and traffic information with map information, a system using a CD-ROM is put on the market ("Map Soft", Nikkei Pasocon, Feb. 26, 1996).

Also, as a system for providing traffic information of an urban area, a train route searching system ("Information Systems for the Optimal Routes in Urban Transportation", written by Masami KATO, Information Processing, Vol. 28, No. 3, 1987) and Station Spart (Val research) are well-known.

3.2. Problems to be Solved by the Invention

However, there are problems in the conventional map information generating systems and the conventional map information providing systems as follows.

In case of a deformed map such as a route information map, a sight-viewing information map, a town map or other outline maps in which a relative positional relationship and an easily seeing function are important more than a positional precision, because a map deformation method depends on a using purpose, a general automatic generating method useful for various purposes is not provided.

Also, in cases where a deformed map is generated by hand, because the generation of the deformed map and the renewal of the deformed map are troublesome, it is difficult to generate a deformed map for a wide ranged area.

Also, because a deformed map is generated by hand, it is difficult to generate a deformed map for an arbitrary area.

Also, because map information and other related information attached to the map information are usually stored in a recording medium such as a CD-ROM and the recording medium with the map information and the other information is delivered to a user, a personal computer in which a CD-ROM actuating apparatus can be used is usually used to reproduce the map information and the other information. In this case, because the personal computer cannot be used outdoors, it is not adequate to display a deformed map according to the map information and the other information stored in the CD-ROM outdoors.

Also, in cases where a user desires to display a map on a portable terminal side, a hardware of a portable terminal such as a display size of an image plane and a memory capacity is restricted, so that it is difficult to display the entire map on condition that the user can easily see the map.

Also, map information is transmitted to a portable terminal of a user by using an audio communication function, the performance of a communication environment and the performance of a network environment are inferior to that in the transmission of the map information performed by a wire communication, so that it is difficult to transmit a large volume of map information to the user's portable terminal by an audio communication.

Also, in cases where the CD-ROM with the map information and the other information is delivered to a user, because the renewal of the information is performed once a year, it is difficult that the user uses updated information.

Also, in cases where the CD-ROM with the map information and the other information is delivered to a user, because the user has various retrieval requests, it is difficult to satisfy the user in cases where the map information and the other information are reproduced indoors.

Also, map information is transmitted to a portable terminal by using an audio communication function, the user is required to pay a cost for the audio communication, and the user is required to wait for the retrieval of the information for a long time. Therefore, it is required to efficiently transmit the map information.

4. Description of the Related Art for Geographical Information Providing System and Geographical Information Describing Method 4.1. Previously Proposed Art As a system for providing geometric information for an information terminal through a communication network, various systems utilizing an internet are known. For example, a system for research is disclosed in a literature "Overview of Geographical Information System and National Spatial Data Infrastructure" written by Kazuhiko AKENO and Yohta KUMAKI, Information Processing, Vol. 38, No. 2, 1997. Also, a system for business is disclosed in a report "Fuzitsu Wildbird" written in sixth page of Nippon Kogyou Newspaper on Dec. 20, 1996.

Geographical data transmitted through an internet is expressed with a hypertext markup language (called HTML) for describing a plurality of documents arranged in a hyperlink structure or a virtual reality modeling language (VRML) for describing a three-dimensional graphics. For example, a nation and a city are selected one by one from a displayed world map to specify a destination, and a map around the destination is displayed. Also, a hotel or a museum placed in a desired province is designated, and information about the hotel or the museum is displayed. For example, a literature "Introduction of HTML" written by Laura LEMAY, translated by Hiroyuki MUSHA et al., 1996 and a literature "VRML's Three-Dimensional world" written by Y. ANDO, Information Processing, Vol. 37, No. 10, 1996 are known.

4.2. Problems to be Solved by the Invention

However, in a conventional map information providing system utilizing the internet, because map information is transmitted as image data from a map information providing apparatus to an information terminal apparatus, a volume of the transmitted image data is enormously increased, so that there is a drawback that a transmission efficiency for the image data is lowered. Therefore, unless a personal computer having a high speed data transmitting function is used as the information terminal apparatus and the map information providing apparatus and the information terminal apparatus are connected with a wire circuit, the map information cannot be transmitted to the information terminal apparatus.

Also, in the conventional map information providing system utilizing the internet, geographical features prepared in advance on a side of the providing system are selected and are merely displayed on a display plane of the information terminal apparatus. Therefore, it is impossible that geographical features displayed on the display plane of the information terminal apparatus are adaptably changed according to a user's request. For example, information displayed on the display plane of the information terminal apparatus cannot be limited to information of institutions desired by a user, a region of a map displayed on the display plane of the information terminal apparatus cannot be limited to a region desired by a user, or a geographical shape cannot be changed according to a user's taste.

SUMMARY OF THE INVENTION

A first object of the present invention is to provide, with due consideration to the drawbacks of such a conventional road area extracting apparatus, a road area extracting apparatus in which a road area placed in an arbitrary area is automatically drawn according to a block map and a shape of the road area is deformed according to a user's intention.

A second object of the present invention is to provide a deformed map automatic generation system in which a deformed map for an arbitrary area is automatically generated on condition that the deformed map is useful for various purposes. Also, the second object of the present invention is to provide a map information providing system in which updated map information and updated related information are efficiently transmitted to a user's portable information terminal apparatus at a superior communication and network environment according to various user's retrieval requests, and a deformed map generated by the deformed map automatic generation system according to the updated map information and the updated related information is displayed without any hardware restriction even though the portable information terminal apparatus is placed outdoors.

A third object of the present invention is to provide a geographical information providing system and a geographical information describing method in which geographical spatial data of a map suiting a user's request is efficiently transmitted as geographical information to an information terminal apparatus through a communication network.

The first object is achieved by the provision of a road area extracting apparatus comprising:

receiving means for receiving an image drawing region;
  block information reading out means for reading out pieces of particular block information corresponding to the image drawing region received by the receiving means from a block map data base in which pieces of block information respectively indicating a line segment row and each line segment divides a block area from a road area, a plurality of particular line segment rows indicated by the pieces of particular block information respectively having an end placed at a boundary line of the image drawing region;
  road shape extracting means for setting each point, at which one end of one particular line segment row indicated by one piece of particular block information contacts with the boundary line of the image drawing region, as a boundary point, selecting a pair of boundary points close to each other and connecting the pair of boundary points with each other through a connecting line segment to extract a shape of a road area surrounded by the connecting line segment and a pair of particular line segment rows connected with the connecting line segment from the particular block information read out by the block information reading out means; and road area outputting means for outputting the shape of the road area extracted by the road shape extracting means.

In the above configuration, a large number of pieces of block information respectively indicating a line segment row are stored in a block map data base. Each line segment divides a block area from a road area surrounding the block area, so that each line segment stored in the block map data base is closed and does not have any end.

When an image drawing region is received by the receiving means, pieces of particular block information corresponding to the image drawing region are read out from the block map reading out means. In this case, a plurality of particular line segment rows indicated by the pieces of particular block information are respectively cut at a boundary line of the image drawing region. Therefore, each particular line segment row has an end placed at the boundary line of the image drawing region, so that each particular line segment row does not divides a block area from a road area. Therefore, the road area cannot be determined by each particular line segment row.

To determine a road area according to the particular block information, a connecting line segment connecting a pair of boundary points close to each other is set along the boundary of the image drawing region. Accordingly, a road area in the image drawing region is determined, and a shape of the road area can be drawn according to the particular block information.

The second object of the present invention is achieved by a provision of a deformed map automatic generation system, comprising:

road information storing means for storing pieces of road information respectively indicating an area of a road and pieces of target object information respectively indicating a position of a target object;

input data receiving means for receiving an image drawing region;

road information reading means for reading out pieces of display road information and pieces of display target object information, which indicate a display road map corresponding to the image drawing region received by the input data receiving means, from the road information storing means, a plurality of display target objects placed at prescribed positions indicated by the display target object information being drawn with a plurality of display road areas in the display road map;

positional relationship determining means for determining a positional relationship between one display target object indicated by one piece of display target object information read by the road information reading means and one display road area placed close to the display target object for each display target object and generating a positional relationship fixing map, in which the positional relationships for the display target objects are fixed, from the display road map; deformed map generating means for deformed map generating means for generating a deformed map from the positional relationship fixing map generated by the positional relationship determining means by deforming a shape of one display road area drawn in the positional relationship fixing map while maintaining the positional relationships; and deformed map outputting means for outputting the deformed map generated by the deformed map generating means.

In the above configuration, display road information and display target object information indicating a display road map for the image drawing region are read out from the road information storing means by the road information reading means. In the display road map, a plurality of display target objects placed at prescribed positions indicated by the display target object information are drawn with a plurality of display road areas.

Thereafter, one display road area close to one display target object is specified, a positional relationship between the display target object and the display road area is determined for each display target object, and a positional relationship fixing map is generated from the display road map by the positional relationship determining means. In the positional relationship fixing map, the positional relationships are fixed even though a shape of one display road area is deformed.

Thereafter, a shape of one display road area drawn in the positional relationship fixing map is deformed by the deformed ap generating means while maintaining the positional relationships, so that a deformed map is generated.

Accordingly, the deformed map for the image drawing region an be automatically generated. Also, because the deformed map is generated while maintaining the positional relationships even though a shape of one display road area is deformed, the deformed map is useful for various purposes.

Also, the second object is achieved by the provision of a map information providing apparatus for providing particular map information for a portable information terminal apparatus through a radio communication path in response to a retrieval request of the portable information terminal apparatus, comprising:

map-base information storing means for storing pieces of map-base information and pieces of related information relating to the map-base information;

communicating means for performing a radio communication with the portable information terminal apparatus to receive the retrieval request of the portable information terminal apparatus;

map-base information retrieving means for retrieving particular map-base information and particular related information relating to the particular map-base information from the map-base information storing means in response to the retrieval request received by the communicating means;

a deformed map automatic generation system for automatically generating a simplified deformed map from the particular map-base information and the particular related information retrieved by the map-base information retrieving means; and control means for generating a retrieval instruction row from the retrieval request received by the communicating means, instructing the map-base information retrieving means to retrieve the particular map-base information and the particular related information from the map-base information storing means according to the retrieval instruction row, instructing the deformed map automatic generation system to generate the simplified deformed map from the particular map-base information and the particular related information, and instructing the communicating means to transmit the simplified deformed map generated by the deformed map automatic generation system to the portable information terminal apparatus.

In the above configuration, when a retrieval request is transmitted from the portable information terminal apparatus to the communicating means, a retrieval instruction row is received from the retrieval request by the control means, and particular map-base information and particular related information relating to the particular map-base information are retrieved from the map-base information storing means. Thereafter, a simplified deformed map is automatically generated by the deformed map automatic generation system from the particular map-base information and the particular related information under the control of the control means, and simplified deformed map is transmitted from the communicating means to the portable information terminal apparatus under the control of the control means.

Accordingly, even though a user having the portable information terminal apparatus is positioned far from the map information providing system, the user can view the simplified deformed map displayed on a display plane of the portable information terminal apparatus. Also, because the deformed map is simplified and a volume of data required for the deformed map is small, the simplified deformed map can be efficiently transmitted to a user's portable information terminal apparatus at a superior communication and network environment, and the user can clearly view the simplified deformed map. Also, because the simplified deformed map is automatically generated in response to a retrieval request of the user, any simplified deformed map satisfying a user's request can be transmitted to the user's portable information terminal apparatus.

It is preferred that the particular map-base information retrieved by the map-base information retrieving means indicate a plurality of display road areas and positions of a plurality of display target objects, the particular related information retrieved by the map-base information retrieving means indicate names of the display target objects, and the deformed map automatic generation system comprise positional relationship determining means for determining a positional relationship between one display target object indicated by the particular map-base information and one display road area placed close to the display target object for each display target object and generating a positional relationship fixing map in which the display road areas are drawn with the display target objects and the names of the display target objects while fixing the positional relationships of the display target objects with the display road areas; and deformed map generating means for generating the simplified deformed map from the positional relationship fixing map generated by the positional relationship determining means by deforming a shape of one display road area drawn in the positional relationship fixing map while maintaining the positional relationships.

In the above configuration, a positional relationship fixing map, in which the display road areas are drawn with the display target objects and the names of the display target objects while fixing the positional relationships of the display target objects with the display road areas, is obtained by the positional relationship determining means, and a simplified deformed map is generated from the positional relationship fixing map in the deformed map generating means by deforming a shape of one display road area while maintaining the positional relationships.

Accordingly, a simplified deformed map satisfying a user's request can be reliably transmitted to the user even though the user is placed outdoors.

It is also preferred that the retrieval request transmitted from the portable information terminal apparatus indicate a name of a particular spot corresponding to a particular target object, the particular map-base information retrieved from the map-base information storing means by the map-base information retrieving means indicate one or more display road areas of a particular region around the particular spot and positions of one or more display target objects including the particular target object, the particular related information retrieved from the map-base information storing means by the map-base information retrieving means denote names of the display target objects including a name of the particular spot, and the deformed map automatic generation system comprise positional relationship determining means for determining a positional relationship between one display target object indicated by the particular map-base information and a display road area placed nearest to the display target object for each display target object, attaching the names of the display target objects to the display target objects and generating a positional relationship fixing map in which the display road areas of the particular region around the particular spot are drawn with the display target objects including the particular target object and the names of the display target objects including the name of the particular target object while fixing the positional relationships of the display target objects with the display road areas; and deformed map generating means for generating the simplified deformed map from the positional relationship fixing map generated by the positional relationship determining means by deforming a shape of one display road area drawn in the positional relationship fixing map while maintaining the positional relationship.

In the above configuration, when a name of a particular spot is indicated by the retrieval request, a simplified deformed map in which the particular spot and the name of the particular spot are indicated can be obtained.

It is also preferred that the retrieval request transmitted from the portable information terminal apparatus indicate a name of a particular region, the particular map-base information retrieved from the map-base information storing means by the map-base information retrieving means indicate one or more display road areas of the particular region and positions of one or more display target objects, the particular related information retrieved from the map-base information storing means by the map-base information retrieving means denote names of the display target objects, and the deformed map automatic generation system comprise positional relationship determining means for determining a positional relationship between one display target object indicated by the particular map-base information and a display road area placed nearest to the display target object for each display target object, attaching the names of the display target objects to the display target objects and generating a positional relationship fixing map in which the display road areas of the particular region are drawn with the display target objects and the names of the display target objects while fixing the positional relationships of the display target objects with the display road areas; and deformed map generating means for generating the simplified deformed map from the positional relationship fixing map generated by the positional relationship determining means by deforming a shape of one display road area drawn in the positional relationship fixing map while maintaining the positional relationship.

In the above configuration, when a name of a particular region is indicated by the retrieval request, a simplified deformed map for the particular region can be obtained.

It is also preferred that the retrieval request transmitted from the portable information terminal apparatus indicate a name of a particular region and a category of business, the particular map-base information retrieved from the map-base information storing means by the map-base information retrieving means indicate one or more display road areas of the particular region and positions of one or more display target objects in which a particular target object corresponding to the category of business is included, the particular related information retrieved from the map-base information storing means by the map-base information retrieving means denote names of the display target objects including a name of the particular target object, and the deformed map automatic generation system comprise positional relationship determining means for determining a positional relationship between one display target object indicated by the particular map-base information and a display road area placed nearest to the display target object for each display target object, attaching the names of the display target objects to the display target objects and generating a positional relationship fixing map in which the display road areas of the particular region are drawn with the display target objects including the particular target object and the names of the display target objects including the name of the particular target object while fixing the positional relationships of the display target objects with the display road areas; and deformed map generating means for generating the simplified deformed map from the positional relationship fixing map generated by the positional relationship determining means by deforming a shape of one display road area drawn in the positional relationship fixing map while maintaining the positional relationship.

In the above configuration, when a name of a particular region and a category of business is indicated by the retrieval request, a simplified deformed map for the particular region can be obtained, and a particular target object corresponding to the category of business and a name of the particular target object are drawn in the simplified deformed map.

Accordingly, a simplified deformed map can be reliably transmitted to the user's portable information terminal apparatus in response to one of various user's requests.

It is also preferred that the retrieval request transmitted from the portable information terminal apparatus indicate a name of a particular spot corresponding to a first particular target object and a category of business, the particular map-base information retrieved from the map-base information storing means by the map-base information retrieving means indicate one or more display road areas of a particular region around the particular spot and positions of one or more display target objects in which the first particular target object and a second particular target object corresponding to the category of object, the particular related information retrieved from the map-base information storing means by the map-base information retrieving means denote names of the display target objects including the name of the particular spot and a name of the second particular target object, and the deformed map automatic generation system comprise positional relationship determining means for determining a positional relationship between one display target object indicated by the particular map-base information and a display road area placed nearest to the display target object for each display target object, attaching the names of the display target objects to the display target objects and generating a positional relationship fixing map in which the display road areas of the particular region around the particular spot are drawn with the display target objects including the first and second particular target objects and the names of the display target objects including the name of the particular spot and the name of the second particular target object while fixing the positional relationships of the display target objects with the display road areas; and deformed map generating means for generating the simplified deformed map from the positional relationship fixing map generated by the positional relationship determining means by deforming a shape of one display road area drawn in the positional relationship fixing map while maintaining the positional relationship.

In the above configuration, when a name of a particular spot corresponding to a first particular target object and a category of business is indicated by the retrieval request, a simplified deformed map for a particular region around the particular spot can be obtained, and a particular target object corresponding to the category of business and a name of the particular target object are drawn in the simplified deformed map.

Accordingly, a simplified deformed map can be reliably transmitted to the user's portable information terminal apparatus in response to one of various user's requests.

It is also preferred that the retrieval request transmitted from the portable information terminal apparatus indicate a telephone number, a particular address, an institution name, a corporation name or a personal name, the particular map-base information retrieved from the map-base information storing means by the map-base information retrieving means indicate one or more display road areas of a particular region, in which a particular target object indicated by the telephone number, the particular address, the institution name, the corporation name or the personal name exists, and positions of one or more display target objects including the particular target object, the particular related information retrieved from the map-base information storing means by the map-base information retrieving means denote names of the display target objects including a name of the particular target object, and the deformed map automatic generation system comprise positional relationship determining means for determining a positional relationship between one display target object indicated by the particular map-base information and a display road area placed nearest to the display target object for each display target object, attaching the names of the display target objects to the display target objects and generating a positional relationship fixing map in which the display road areas of the particular region are drawn with the display target objects including the particular target object and the names of the display target objects including the name of the particular target object while fixing the positional relationships of the display target objects with the display road areas; and deformed map generating means for generating the simplified deformed map from the positional relationship fixing map generated by the positional relationship determining means by deforming a shape of one display road area drawn in the positional relationship fixing map while maintaining the positional relationship.

In the above configuration, when a telephone number, a particular address, an institution name, a corporation name or a personal name is indicated by the retrieval request, a simplified deformed map for a particular region, in which a particular target object indicated by the telephone number, the particular address, the institution name, the corporation name or the personal name exists, can be obtained, and the particular target object and a name of the particular target object are drawn in the simplified deformed map.

Accordingly, a simplified deformed map can be reliably transmitted to the user's portable information terminal apparatus in response to one of various user's requests.

It is also preferred that the retrieval request transmitted from the portable information terminal apparatus indicate a current position of the portable information terminal apparatus and a category of business, the particular map-base information retrieved from the map-base information storing means by the map-base information retrieving means indicate one or more display road areas of a particular region around the current position and positions of one or more display target objects in which a particular target object corresponding to the category of business is included, the particular related information retrieved from the map-base information storing means by the map-base information retrieving means denote names of the display target objects including a name of the particular target object, and the deformed map automatic generation system comprise positional relationship determining means for determining a positional relationship between one display target object indicated by the particular map-base information and a display road area placed nearest to the display target object for each display target object, attaching the names of the display target objects to the display target objects and generating a positional relationship fixing map in which the display road areas of the particular region around the current position are drawn with the display target objects including the particular target object and the names of the display target objects including the name of the particular target object while fixing the positional relationships of the display target objects with the display road areas; and deformed map generating means for generating the simplified deformed map from the positional relationship fixing map generated by the positional relationship determining means by deforming a shape of one display road area drawn in the positional relationship fixing map while maintaining the positional relationship.

In the above configuration, when a current position of the portable information terminal apparatus and a category of business is indicated by the retrieval request, a simplified deformed map for a particular region around the current position can be obtained, and a particular target object corresponding to the category of business and a name of the particular target object are drawn in the simplified deformed map.

Accordingly, a simplified deformed map can be reliably transmitted to the user's portable information terminal apparatus in response to one of various user's requests.

It is also preferred that the retrieval request transmitted from the portable information terminal apparatus indicate a name of a starting point corresponding to a first particular target object and an arriving point corresponding to a second particular target object, the particular map-base information retrieved from the map-base information storing means by the map-base information retrieving means indicate one or more display road areas of a particular region, in which the starting and arriving spots are placed, and positions of one or more display target objects including the first and second particular target objects, the particular related information retrieved from the map-base information storing means by the map-base information retrieving means denote names of the display target objects including names of the first and second particular target objects and an optimum route from the starting point to the arriving point, and the deformed map automatic generation system comprise positional relationship determining means for determining a positional relationship between one display target object indicated by the particular map-base information and a display road area placed nearest to the display target object for each display target object, attaching the names of the display target objects to the display target objects and generating a positional relationship fixing map in which the display road areas of the particular region are drawn with the display target objects including the first and second particular target objects, the names of the display target objects including the names of the first and second particular target objects and the optimum route while fixing the positional relationships of the display target objects with the display road areas; and deformed map generating means for generating the simplified deformed map from the positional relationship fixing map generated by the positional relationship determining means by deforming a shape of one display road area drawn in the positional relationship fixing map while maintaining the positional relationship.

In the above configuration, when a name of a starting point corresponding to a first particular target object and an arriving point corresponding to a second particular target object is indicated by the retrieval request, a simplified deformed map for a particular region, in which the starting and arriving spots are placed, can be obtained, and the first and second particular target objects and names of the first and second particular target objects are drawn in the simplified deformed map.

Accordingly, a simplified deformed map can be reliably transmitted to the user's portable information terminal apparatus in response to one of various user's requests.

It is also preferred that the retrieval request transmitted from the portable information terminal apparatus indicate a name of a starting point corresponding to a first particular target object, an arriving point corresponding to a second particular target object and a means of transport, the particular map-base information retrieved from the map-base information storing means by the map-base information retrieving means indicate one or more first display road areas of a first particular region around the starting spot, one or more second display road areas of a second particular region around the arriving spot, positions of one or more first display target objects of the first particular region including the first particular target object and positions of one or more second display target objects of the second particular region including the second particular target object, the particular related information retrieved from the map-base information storing means by the map-base information retrieving means denote names of the first and second display target objects including names of the first and second particular target objects and an optimum route from the starting point to the arriving point through the means of transport, and the deformed map automatic generation system comprise positional relationship determining means for determining a positional relationship between one first display target object indicated by the particular map-base information and a first display road area placed nearest to the first display target object for each first display target object, determining a positional relationship between one second display target object indicated by the particular map-base information and a second display road area placed nearest to the second display target object for each second display target object, attaching the names of the first and second display target objects to the first and second display target objects and generating a positional relationship fixing map in which the first and second display road areas of the first and second particular regions are drawn with the first and second display target objects including the first and second particular target objects, the names of the first and second display target objects including the names of the first and second particular target objects and the optimum route while fixing the positional relationships of the first display target objects with the first display road areas and the positional relationships of the second display target objects with the second display road areas; and deformed map generating means for generating the simplified deformed map from the positional relationship fixing map generated by the positional relationship determining means by deforming a shape of one display road area drawn in the positional relationship fixing map while maintaining the positional relationship.

In the above configuration, when a name of a starting point corresponding to a first particular target object, an arriving point corresponding to a second particular target object and a means of transport is indicated by the retrieval request, a simplified deformed map for a first particular region around the starting spot and a second particular region around the arriving spot, can be obtained. In the first particular region, the first display road areas are drawn with the first display target objects including the first particular target object and the names of the first display target objects including the name of the first particular target objects. In the second particular region, the second display road areas are drawn with the second display target objects including the second particular target object and the names of the second display target objects including the name of the second particular target objects. Also, the optimum route from the starting point to the arriving point through the means of transport is drawn in the simplified deformed map.

Accordingly, a simplified deformed map can be reliably transmitted to the user's portable information terminal apparatus in response to one of various user's requests.

It is also preferred that the map information providing apparatus further comprise retrieval instruction row storing means for storing the retrieval instruction row generated in the control means in correspondence to the retrieval request transmitted from the portable information terminal apparatus, wherein the retrieval instruction row stored in the retrieval instruction row storing means is transmitted to the map-base information retrieving means under the control of the control means without generating any retrieval instruction row in the control means in cases where the same retrieval request as that corresponding to the retrieval instruction row is transmitted from the portable information terminal apparatus.

In the above configuration, in cases where a current retrieval request transmitted from the portable information terminal apparatus is the same as that corresponding to the retrieval instruction row stored in the retrieval instruction row storing means, it is not required to generate a retrieval instruction row from the current retrieval request, and the retrieval instruction row stored in the retrieval instruction row storing means is reused. Therefore, a simplified deformed map can be efficiently transmitted to a user's portable information terminal apparatus.

It is also preferred that the map information providing apparatus further comprise retrieved information storing means for storing the particular map-base information and the particular related information relating to the particular map-base information retrieved by the map-base information retrieving means in correspondence to the retrieval request transmitted from the portable information terminal apparatus, wherein the particular map-base information and the particular related information relating to the particular map-base information stored in the retrieved information storing means are transmitted to the deformed map automatic generation system under the control of the control means without operating the map-base information retrieving means in cases where the same retrieval request as that corresponding to the particular map-base information and the particular related information is transmitted from the portable information terminal apparatus.

In the above configuration, in cases where a current retrieval request transmitted from the portable information terminal apparatus is the same as that corresponding to the particular map-base information and the particular related information stored in the retrieval instruction row storing means, it is not required to again read out the particular map-base information and the particular related information from the map-base information storing means, and the particular map-base information and the particular related information stored in the retrieved information storing means are reused. Therefore, a simplified deformed map can be efficiently transmitted to a user's portable information terminal apparatus.

It is also preferred that the map information providing apparatus further comprise:

retrieved information storing means for storing pieces of particular map-base information and pieces of particular related information relating to the pieces of particular map-base information retrieved by the map-base information retrieving means in correspondence to a plurality of retrieval requests transmitted from the portable information terminal apparatus; and map-base information renewal detecting means for detecting the renewal of a piece of specific map-base information or a piece of specific related information stored in the map-base information storing means and instructing the retrieved information storing means to renew a piece of particular map-base information or a piece of particular related information agreeing with the piece of specific map-base information or the piece of specific related information, wherein the piece of particular map-base information and the piece of particular related information stored in the retrieved information storing means are transmitted to the deformed map automatic generation system under the control of the control means without operating the map-base information retrieving means in cases where the same retrieval request as that corresponding to the piece of particular map-base information and the piece of particular related information is transmitted from the portable information terminal apparatus.

In the above configuration, even though a piece of specific map-base information or a piece of specific related information stored in the map-base information storing means is renewed, the renewal is detected by the map-base information renewal detecting means, and a piece of particular map-base information or a piece of particular related information agreeing with the piece of specific map-base information or the piece of specific related information is renewed in the retrieved information storing means.

Therefore, pieces of updated map-base information and pieces of updated related information can be always stored in the retrieved information storing means and can be reused.

The third object is achieved by the provision of a geographical information describing method, comprising the steps of:

determining a plurality of composing objects existing in a geographical space;

recognizing a plurality of spatial characteristics of one composing object as graphical information for each composing object;

classifying the spatial characteristics of the composing objects into a plurality of characteristic items;

setting a characteristic identifier identifying one characteristic item for each characteristic item to express one spatial characteristic of each composing object with a set of the spatial characteristic and one characteristic identifier corresponding to the spatial characteristic;

expressing one spatial characteristic of one composing object identified by one characteristic identifier with a character string for each spatial characteristic of the composing objects; and declaredly describing the graphical information of each composing object with a plurality of sets of the spatial characteristics expressed by the character strings and the characteristic identifiers corresponding to the spatial characteristics.

In the above steps, a plurality of spatial characteristics of a plurality of composing objects existing in a geographical space are respectively expressed by a set of one spatial characteristic expressed by a character string and a characteristic identifier identifying a type of the spatial characteristic, and graphical information of each composing object is declaredly described with a plurality of sets of the spatial characteristics expressed by the character strings and the characteristic identifiers corresponding to the spatial characteristics.

Therefore, a volume of data required to express the graphical information of the composing objects in a graphic space can be reduced as compared with a volume of image data expressing graphical information of the composing objects. Also, in cases where a user desires to transmit the graphical information of the composing objects from a information providing apparatus to an information terminal apparatus, because the data volume of the graphical information is reduced, the user can transmit the graphical information through a communication network at high speed. Also, even though the communication network is a radio circuit, the geographical information can be reliably transmitted to the information terminal apparatus.

The third object is also achieved by the provision of a geographical information providing system comprising an information terminal apparatus with a communication function and an information providing apparatus for providing geographical information for the information terminal apparatus through a communication network in response to a retrieval request transmitted from the information terminal apparatus, the information providing apparatus comprising:

geographical spatial data storing means for storing pieces of geographical spatial data, which relate to a plurality of composing objects existing in a geographical space, as geographical information;

geographical spatial data retrieving and transforming means for retrieving pieces of particular geographical spatial data relating to one or more particular composing objects from the geographical spatial data storing means according to the retrieval request transmitted from the information terminal apparatus and transforming the particular geographical spatial data into pieces of display geographical spatial data described in a particular describing form such that each piece of display geographical spatial data is expressed by a set of a character string indicating a spatial characteristic of one particular composing object and a characteristic identifier identifying the spatial characteristic; and providing side communicating means for transmitting the retrieval request transmitted from the information terminal apparatus to the geographical spatial data retrieving and transforming means and transmitting the display geographical spatial data obtained in the geographical spatial data retrieving and transforming means to the information terminal apparatus, and the information terminal apparatus comprising:

display geographical spatial data storing means for storing the display geographical spatial data transmitted from the providing side communicating means of the information providing apparatus; and user interface means for receiving the retrieval request from a user and displaying a geographical space map in which the particular composing objects are drawn so as to indicate the spatial characteristics of the particular composing objects according to the display geographical spatial data stored in the display geographical spatial data storing means.

In the above configuration, when pieces of particular geographical spatial data denoting image data are retrieved by the geographical spatial data retrieving and transforming means, the particular geographical spatial data are transformed into pieces of display geographical spatial data described in a particular describing form according to the geographical information describing method. Therefore, each piece of display geographical spatial data is expressed by a set of a character string indicating a spatial characteristic of one particular composing object and a characteristic identifier identifying the spatial characteristic.

Thereafter, the display geographical spatial data transmitted to the information terminal apparatus through the communication network are analyzed by the user interface means, and a geographical space map in which the particular composing objects are drawn so as to indicate the spatial characteristics of the particular composing objects according to the display geographical spatial data is displayed.

Accordingly, because the particular geographical spatial data denoting image data are transformed into the display geographical spatial data according to the geographical information describing method, a volume of the display geographical spatial data is considerably reduced as compared with a volume of the particular geographical spatial data. Therefore, the display geographical spatial data can be transmitted through the communication network at high speed. Also, even though the communication network is a radio circuit, the display geographical spatial data can be reliably transmitted to the information terminal apparatus.

The third object is also achieved by the provision of a geographical information providing system comprising an information terminal apparatus with a communication function and an information providing apparatus for providing geographical information for the information terminal apparatus through a communication network in response to a retrieval request transmitted from the information terminal apparatus, the information providing apparatus comprising:

geographical spatial data storing means for storing pieces of geographical spatial data, which relate to a plurality of target objects existing in a geographical space, as geographical information;

deformed geographical information generating means for retrieving pieces of particular geographical spatial data relating to one or more particular target objects from the geographical spatial data storing means according to the retrieval request transmitted from the information terminal apparatus and generating pieces of deformed geographical spatial data indicating a simplified deformed map as deformed geographical information from the pieces of particular geographical spatial data;

providing side communicating means for transmitting the retrieval request transmitted from the information terminal apparatus to the deformed geographical information generating means and transmitting the pieces of deformed geographical spatial data obtained in the deformed geographical information generating means to the information terminal apparatus, and the information terminal apparatus comprising:

deformed geographical spatial data storing means for storing the pieces of deformed geographical spatial data transmitted from the providing side communicating means of the information providing apparatus; and user interface means for receiving the retrieval request and a display request from a user, editing the pieces of deformed geographical spatial data stored in the deformed geographical spatial data storing means according to the display request to obtain pieces of edited geographical spatial data relating to one or more edited target objects selected from the particular target objects and displaying an edited deformed map in which the edited target objects are drawn according to the pieces of edited geographical spatial data.

In the above configuration, when pieces of particular geographical spatial data are retrieved by the deformed geographical information generating means, pieces of deformed geographical spatial data indicating a simplified deformed map are generated from the particular geographical spatial data. In the simplified deformed map, one or more deformed road areas are drawn with one or more particular target objects. Thereafter, the deformed geographical spatial data are transmitted to the information terminal apparatus and are edited by the user interface means according to a display request input by a user. Therefore, pieces of edited geographical spatial data indicating an edited deformed map are displayed. In the edited deformed map, one or more edited road areas obtained by editing the deformed road areas are drawn with one or more edited target objects selected from the particular target objects Accordingly, the deformed geographical spatial data indicating the simplified deformed map can be transmitted from the information providing apparatus to the information terminal apparatus through the communication network. Also, edited geographical spatial data indicating an edited deformed map can be obtained from the deformed geographical spatial data according to the user's display request, and the edited deformed map suiting the user's taste can be displayed.

BRIEF DESCRIPTION OF THE DRAWINGS

The objects, features and advantages of the present invention will be apparent from the following description taken in conjunction with the accompanying drawings, in which:

FIGS. 4(a) and 4(b) show the operation performed in a road end reshaping unit shown in FIG. 1;

FIG. 4(c) shows a road shape of a road area obtained in the road end reshaping unit;

FIGS. 5(a) and 5(b) show the operation performed in a road length shortening unit shown in FIG. 1;

FIG. 5(c) shows a road shape of a road area obtained in the road length shortening unit;

FIG. 20 shows a road table of road data, a target object table of target object data and a traffic table of traffic data stored in an information storing unit shown in FIG. 19;

FIG. 42 is a flow chart showing an operation performed in a system control unit shown in FIG. 19 when the starting point, the arriving point and the means of transport are input;

FIG. 46 shows data of a road table, data of a target object table, data of a traffic table and data of a retrieval request managing table stored in a deformed map information storing unit shown in FIG. 44;

FIG. 66 shows an example of a plurality of figure tables stored in a geographical spatial data storing unit shown in FIG. 63;

FIG. 68 shows an example of pieces of particular geographical spatial data which are obtained in the geographical spatial data retrieving and transforming unit shown in FIG. 63 and are described in a particular data describing form according to a geographical spatial data describing method;

FIG. 80 shows a design designating image displayed on a display plane of a user interface unit shown in FIG. 72;

FIG. 82(a) shows an example of a plurality of design designating parameters selected from the design designating image shown in FIG. 80 by a user;

FIG. 83(a) shows another example of a plurality of design designating parameters selected from the design designating image shown in FIG. 80 by a user;

FIG. 84(a) shows another example of a plurality of design designating parameters selected from the design designating image shown in FIG. 80 by a user.

DETAILED DESCRIPTION OF THE EMBODIMENTS

Preferred embodiments of a road area extracting apparatus, a deformed map automatic generation system, a map information providing system, a geographical information providing system and a geographical information describing method according to the present invention is described with reference to drawings.

(First Embodiment)

Figure 1:
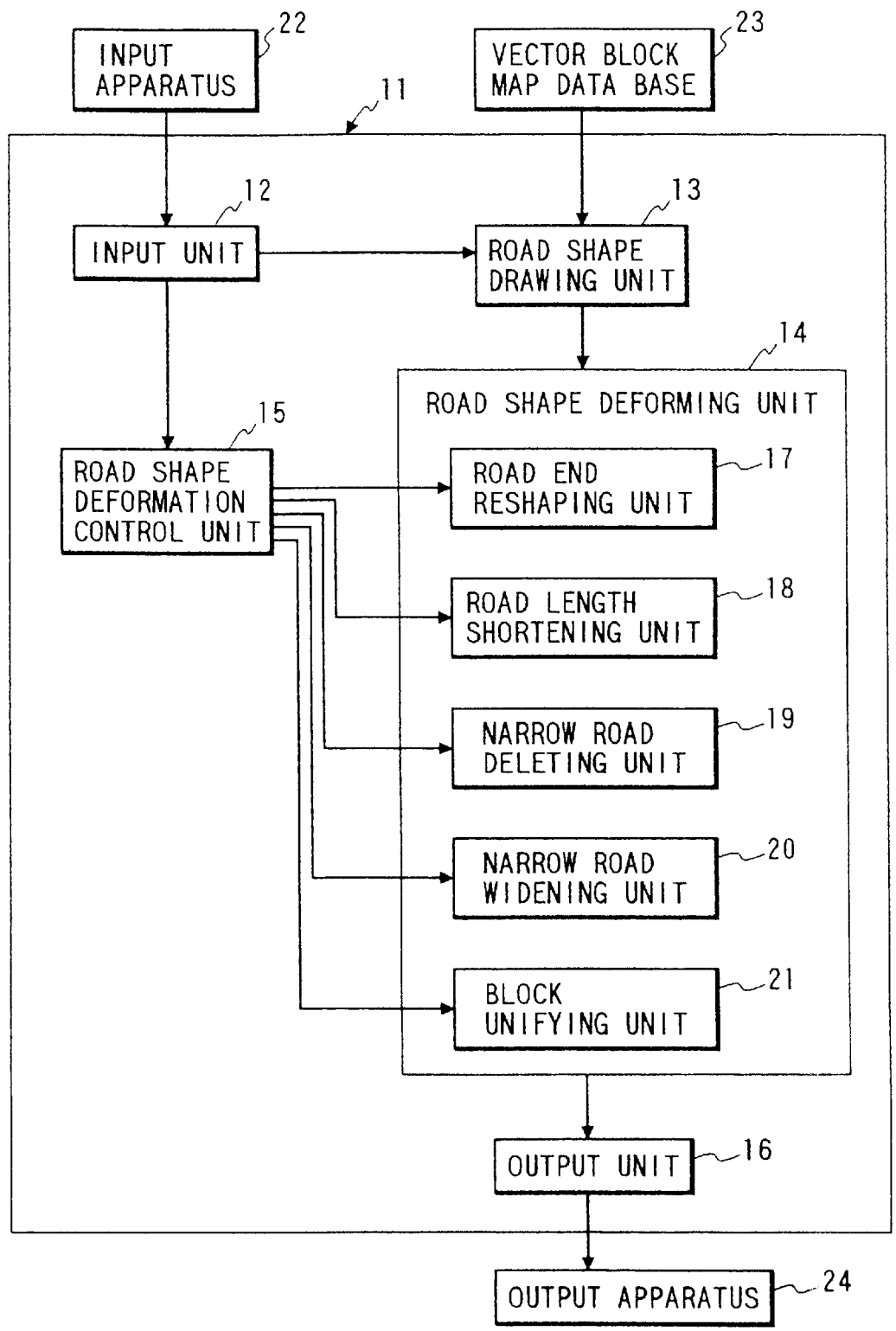
FIG. 1 is a block diagram of a road area extracting apparatus according to a first embodiment of the present invention.

FIG. 1 is a block diagram of a road area extracting apparatus according to a first embodiment of the present invention.

As shown in FIG. 1, a road area extracting apparatus 11 comprises
- an input unit 12 for receiving a user's instruction indicating the designation of an image drawing region and a road deforming method from an input apparatus 22 such as a keyboard;
- a road shape drawing unit 13 for reading out particular vector block information and particular administrative district information corresponding to the image drawing region designated by the user's instruction from a vector block map data base 23, in which pieces of vector block information indicating a large number of block areas and pieces of administrative district information indicating areas of a large number of administrative districts respectively composed of a plurality of blocks are stored, and drawing a shape of each road area existing in the image drawing region according to the particular vector block information and the particular administrative district information;

a road shape deforming unit 14 for deforming the shape of each road area drawn by the road shape drawing unit 13 and obtaining a deformed shape of the road area in the image drawing region;

a road shape deformation control unit 15 for controlling the road shape deforming unit 14 and determining how the road shapes of the road areas are deformed by the road shape deforming unit 14 according to the road deforming method received by the input unit 12; and an output unit 16 for outputting the deformed road shapes of the road areas obtained by the road shape deforming unit 14 to an output apparatus 24 such as a file or a display.

The road shape deforming unit 14 comprises a road end reshaping unit 17 for reshaping a road shape of one road area contacting with a boundary line of the image drawing region to generate a deformed road area map;

a road length shortening unit 18 for shortening a length of one road area contacting with a boundary line of the image drawing region to generate a deformed road area map;

a narrow road deleting unit 19 for deleting an area of a narrow road having a short road width from the road areas to generate a deformed road area map;

a narrow road widening unit 20 for widening a road width of a narrow road to generate a deformed road area map; and a block unifying unit 21 for deleting a plurality of road areas dividing a plurality of block areas placed in each administrative district while leaving a plurality of road areas respectively placed between one pair of administrative districts to unify the divided block areas to a unified block area agreeing with an area of one administrative district and generate a deformed road area map.

Each piece of block information stored in the vector block map data base 23 indicates a line segment row (or a poly-line) surrounding a block area and a position of the line segment row. The line segment row is composed of a plurality of straight line segments connected with each other in series and divide one block area from a road area surrounding the block area.

Figure 2A:
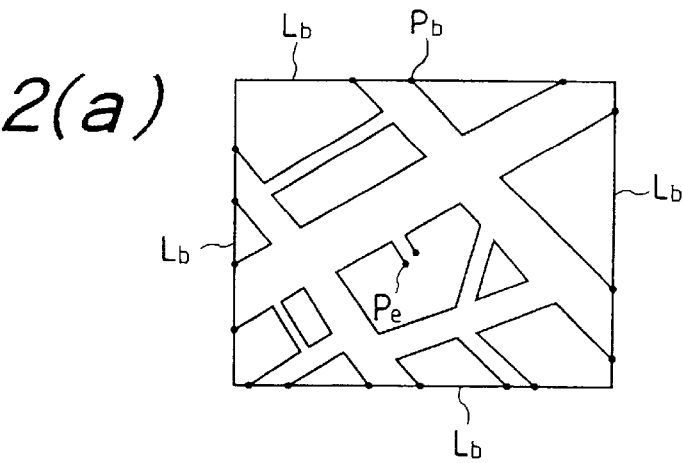
FIG. 2(a) shows a plurality of line segments indicated by particular vector block information read out from a block map shown in FIG. 1.

In the above configuration of the road area extracting apparatus 11, a user indicates an image drawing region and a road deforming method by using the input apparatus 22. In this case, the user input the indication of the image drawing region and the road deforming method to a keyboard according to an interactive data entry method, or the user selects the image drawing region and the road deforming method stored in a file. Thereafter, the input unit 12 instructs the road shape drawing unit 13 to read out particular vector block information and particular administrative district information corresponding to the image drawing region from the vector block map data base 23. Also, the input unit 12 instructs the road shape deformation control unit 15 to control the road shape deforming unit 14 according to the road deforming method. Therefore, the particular vector block information and the particular administrative district information are read out to the road shape drawing unit 13. FIG. 2(a) shows an example of a plurality of line segment rows indicated by the particular vector block information. As shown in FIG. 2(a), a plurality of blocks are divided from a plurality of roads by a plurality of line segment rows, and an area of a road crossing a boundary line Lb of the image drawing region is not determined at the boundary line Lb of the image drawing region. Also, even though a road does not cross the boundary line Lb of the image drawing region, in cases where a line segment row dividing the road from a block has an end point, an area of the road is not determined.

Figure 2B:
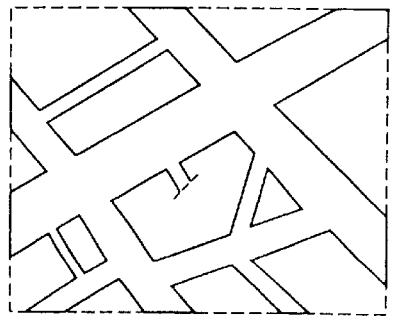
FIG. 2(b) shows an image processed in a road shape drawing unit shown in FIG. 1.
Figure 2C:
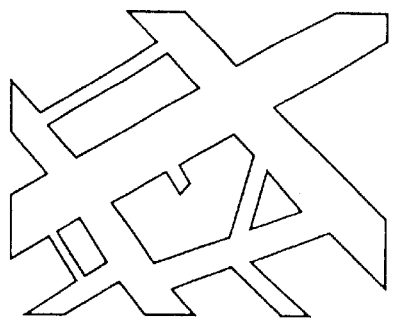
FIG. 2(c) shows and image of a road shape of a road area drawn in the road shape drawing unit.

In the road shape drawing unit 13, a shape of each road area existing in the image drawing area is drawn according to the particular vector block information while determining an area of each road. In detail, a type of line segment row in which one end contacts with the boundary line Lb of the image drawing area is detected, and a point at which one end of a line segment row contacts with the boundary line Lb of the image drawing area is set as a boundary point Pb. Also, another type of line segment row in which one end does not contact with the boundary line Lb of the image drawing area is detected, and a point at which one end of a line segment row does not contact with the boundary line Lb of the image drawing area is set as an end point Pe. In cases where a closed region is formed by a line segment row, the line segment row is not processed. Also, as shown in FIG. 2(b), because a pair of boundary points Pb of a pair of line segment rows dividing a road crossing the boundary line Lb of the image drawing area from a block are placed closest to each other, the pair of boundary points Pb are connected with each other through a connecting line segment. Therefore, an area of the road is determined by the pair of line segment rows and the connecting line segment. Also, because a pair of end points Pe of a pair of line segment rows dividing a road from a block are placed closest to each other, the pair of end points Pe are connected with each other through a connecting line segment. Therefore, an area of the road is determined by the pair of line segment rows and the connecting line segment. Accordingly, as shown in FIG. 2(c), a road area of roads existing in the image drawing area can be automatically drawn according to the particular vector block information.

Figure 3:
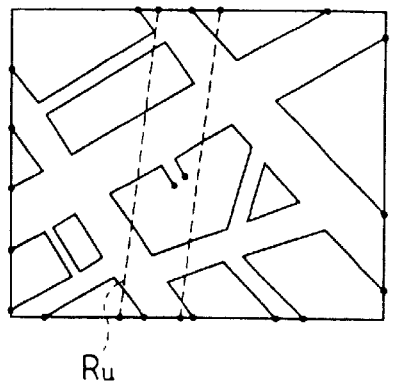
FIG. 3 shows an image of a plurality of blocks and roads including an underground road or a high-level road.

However, as shown in FIG. 3, in cases where blocks and roads indicated by the particular vector block information include a high-level road or an underground road Ru, an normal on-ground road is overlapped with a high-level road or an underground road. In this case, there is a probability that a simple closed region is not formed by a line segment row indicating a high-level road or an underground road or a high-level road or an underground road is indicated by a plurality of line segment rows independent of each other. Therefore, there is a case that a shape of an normal on-ground road at the boundary line Lb cannot be determined even though a pair of boundary points Pb closest to each other are connected with each other. In this case, a shape of a road area cannot be drawn in the road shape drawing unit 13 by using the particular vector block information and the particular administrative district information. To prevent this drawback, in cases where a road area cannot be drawn in the road shape drawing unit 13, an image drawing area is newly input to the input apparatus 22 on condition that any high-level road or any underground road does not cross a boundary line Lb of the new image drawing area.

Thereafter, a road shape of the road area drawn in the road shape drawing unit 13 is transmitted to the road shape deformation control unit 15. In the road shape deformation control unit 15, one of the units 17 to 21 arranged in the road shape deforming unit 14 is selected according to the road deforming method.

In cases where the road deforming method indicates a road end reshaping, an area of each road contacting with the boundary line Lb of the image drawing area is reshaped at its road end in the road end reshaping unit 17. In detail, as shown in FIG. 4(*a*), in cases where an area of a road R1 is indicated by a first line segment row Ls1 having a boundary point Pb1 and a second line segment row Ls2 having a boundary point Pb2, a line Lp perpendicular to the second line segment row Ls2 is drawn from the boundary point Pb1 to an intersection point Pi of the second line segment row Ls2 on condition that the intersection point Pi is placed in the image drawing area. Thereafter, as shown in FIG. 4(*b*), the perpendicular line Lp is added as a line segment row indicating the road R1, and a portion of the line segment row Ls2 placed on an outside region of the perpendicular line Lp is deleted. Therefore, both right-angle corners are formed at an end of an area of the road R1, and one of the right-angle corners is placed on the boundary line Lb. Accordingly, as shown in FIG. 4(*c*), a deformed road area is obtained in the road end reshaping unit 17, and the user can use a deformed road area map in which the road area is reshaped.

In cases where the road deforming method indicates the shortening of a length of a road area, a length of each road area contacting with the boundary line Lb of the image drawing area is shortened in the road length shortening unit 18. In detail, as shown in FIG. 5(*a*), in cases where an area of a road R1 is indicated by a first line segment row Ls1 having a boundary point Pb1 and a second line segment row Ls2 having a boundary point Pb2, a line Lp1 perpendicular to the second line segment row Ls2 is drawn from the boundary point Pb1 to an intersection point Pi1 of the second line segment row Ls2 on condition that the intersection point Pi1 is placed in the image drawing area. Thereafter, the change of a length of the perpendicular line Lp1 is checked while shifting the perpendicular line Lp1 toward the inside of the image drawing area in parallel transition. Thereafter, a corner point Pc, at which the length of the perpendicular line LP1 exceeds a prescribed value, is detected, a midpoint Pm between the boundary point Pb1 and the corner point Pc is set, and a line Lp2 perpendicular to the second line segment row Ls2 is drawn from the midpoint Pm to an intersection point Pi2 of the second line segment row Ls2. Thereafter, as shown in FIG. 5(*b*), the perpendicular line Lp2 is added as a line segment row of the road R1, and a portion of the line segment row Ls2 placed on an outside region of the perpendicular line Lp2 is deleted. Therefore, an end of the area of the road R1 is placed within the boundary line Lb. Accordingly, as shown in FIG. 5(*c*), a deformed road area map indicating a deformed road area is obtained in the road length shortening unit 18. Accordingly, a volume of data required for indicating the road area in the image drawing area can be reduced.

Figure 6:
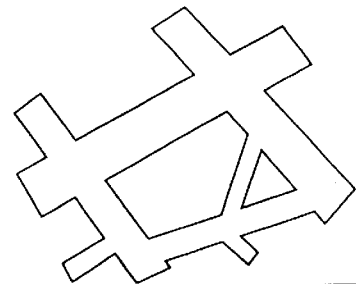
FIG. 6 shows a road shape of a road area obtained in a narrow road deleting unit.

In cases where the user desires to obtain rough information about a shape of a road area in the image displaying region, a road deforming method indicating the deletion of a narrow road area is input, and an area of each narrow road having a short road width is deleted from the road area existing in the image drawing area in the narrow road deleting unit 19. In detail, a pair of line segment rows parallel to each other and closest to each other is judged to indicate an area of a road, and a distance of the pair of line segment rows is examined. In cases where the distance is smaller than a prescribed value, it is judged that the pair of line segment rows indicates an area of a narrow road, and the pair of line segment rows is deleted from the road area in the image drawing area. Accordingly, as shown in FIG. 6, a deformed road area map in which an area of a narrow road is deleted is obtained, and a volume of data required for indicating the road area in the image drawing area can be reduced.

Figure 7:
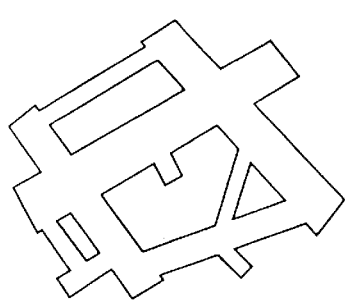
FIG. 7 shows a road shape of a road area obtained in a narrow road widening unit.

In cases where the user desires to obtain detail information about a shape of a road area in the image displaying region, a road deforming method indicating the widening of an area of a narrow road is input, and a width of an area of each narrow road is widened in the narrow road widening unit 20. In detail, a pair of line segment rows parallel to each other and closest to each other is judged to indicate an area of a road, and a distance of the pair of line segment rows is examined. In cases where the distance is smaller than a prescribed value, the pair of line segment rows are moved to be widen a distance between the pair of line segment rows. Accordingly, as shown in FIG. 7, a deformed road area map in which an area of each narrow road is widened is obtained.

Figure 8:
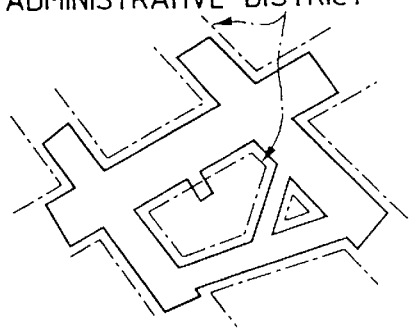
FIG. 8 shows a road shape of a road area obtained in a block unifying unit.

In cases where the road deforming method indicates the unification of areas of a plurality of blocks placed in an administrative district, an operation that areas of a plurality of roads dividing a plurality of blocks placed in each administrative district are deleted and areas of one or more roads placed between each pair of administrative districts are left is performed in the block unifying unit 21. In detail, each administrative district is composed of a plurality of blocks and is surrounded by one or more main roads respectively having a wide width. Also, each block is surrounded by one or more roads respectively having a narrow or wide width. In this embodiment, areas of a plurality of roads diving the blocks are deleted on condition that areas of main roads surrounding each administrative district are left. Accordingly, as shown in FIG. 8, a deformed road area map in which areas of roads dividing the blocks of each administrative district are deleted and each administrative district is divided by the main roads is obtained, and a volume of data required for indicating the road area in the image drawing area can be reduced.

Thereafter, the road shape of the road area deformed in one of the units 17 to 11 is output to the output unit 16, and the road shape of the road area is stored in a file of the output apparatus 24 or is displayed on a display of the output apparatus 24.

Figure 9:
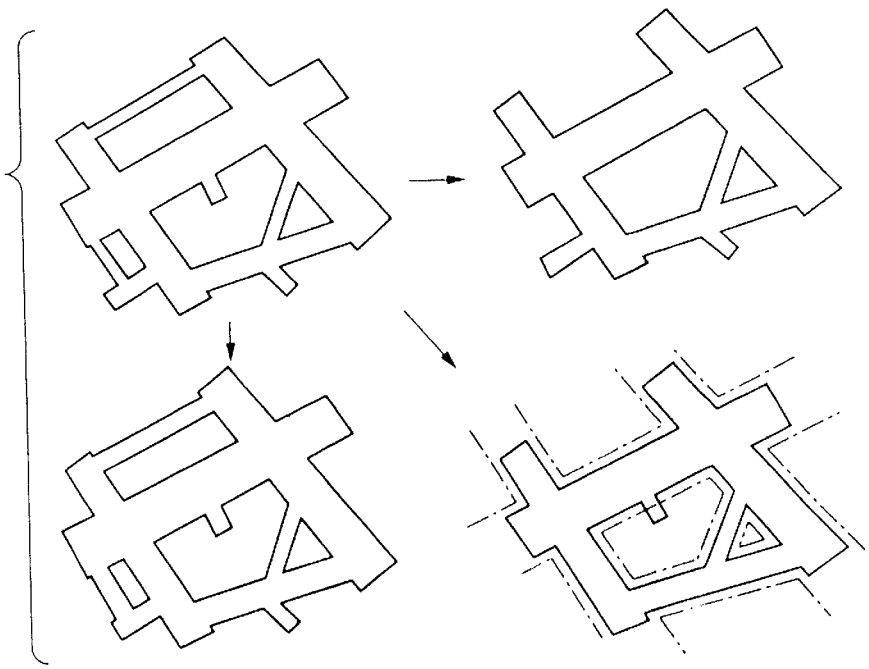
FIG. 9 shows a plurality of road shapes obtained by operating the narrow road deleting unit, the narrow road widening unit and the block unifying unit after the operation of the road length shortening unit.

In this embodiment, one of the units 17 to 21 is operated. However, it is applicable that a plurality of units selected from the units 17 to 11 be operated one after another. For example, as shown in FIG. 9, after the road length shortening unit 18 is operated, the narrow road deleting unit 19, the narrow road widening unit 20 or the block unifying unit 21 is operated. Also, it is applicable that any of the units 17 to 21 be not operated. In this case, a road shape of the road area drawn in the road shape drawing unit 13 is directly output to the output apparatus 24 through the output unit 16.

(Second Embodiment)

A deformed map automatic generation system according to a second embodiment is described.

Figure 10:
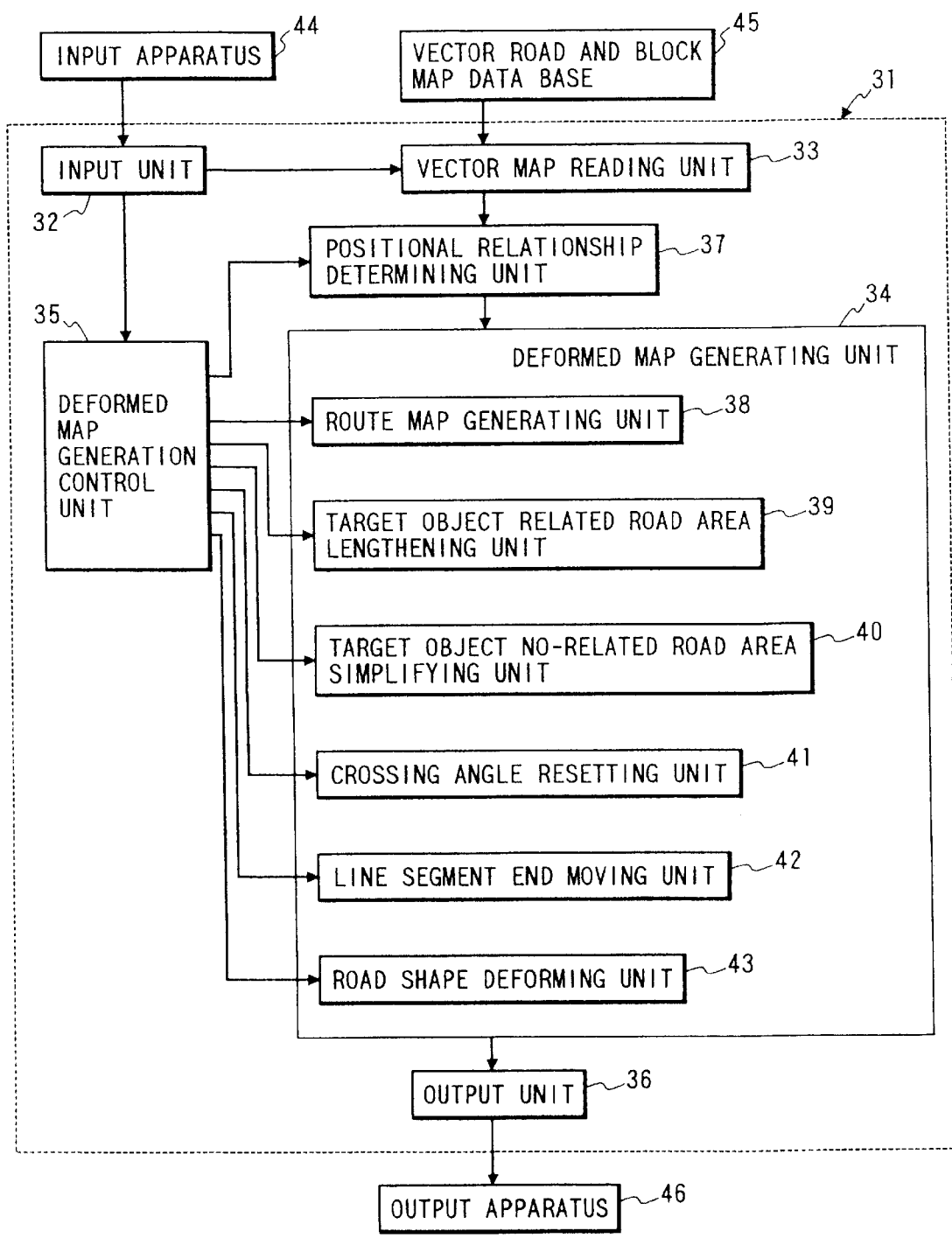
FIG. 10 is a block diagram of a deformed map automatic generation system according to a second embodiment of the present invention.

FIG. 10 is a block diagram of a deformed map automatic generation system according to a second embodiment of the present invention.

As shown in FIG. 10, a deformed map automatic generation system 31 comprises an input unit 32 for receiving pieces of deformed map generating information such as an image drawing region, route information, a positional relationship determining method, road shape deforming information, mesh information (a size of a mesh and a position of the mesh) and deforming angle information from an input apparatus 44 such as a keyboard;

a vector map reading unit 33 for reading out particular map information such as particular road information and particular target object information from a vector road and block map data base 45 in which pieces of map information indicating shapes of a large number of road areas, positions of the road areas and positions of a large number of target objects are stored, the particular map information indicating a particular vector road map corresponding to the image drawing region in which one or more road areas and one or more target objects are drawn;

a positional relationship determining unit 37 for determining a positional relationship between a target object indicated by one piece of particular target object information and a road area indicated by one piece of particular road information for each target object drawn in the particular vector road map according to the positional relationship determining method received by the input unit 32 and generating a positional relationship fixing map, in which the road areas and the target objects drawn in the particular vector road map are drawn while fixing the positional relationships, from the particular vector road map;

a deformed map generating unit 34 for generating a simplified deformed map from the positional relationship fixing map generated by the positional relationship determining unit 37;

a deformed map generation control unit 35 for controlling the positional relationship determining unit 37 and the deformed map generating unit 34 to generate the simplified deformed map according to the deformed map generating information received by the input unit 32; and an output unit 36 for outputting the simplified deformed map obtained by the deformed map generating unit 34 to an output apparatus 46 such as a file or a display.

The road areas and the block areas indicated by the pieces of map information stored in the vector road and block map data base 45 are prepared by using the road area extracting apparatus 11 shown in FIG. 1.

A line dividing a road area from a block area in a map, which is indicated by the map information stored in the vector road and block map data base 45, is indicated by a plurality of straight line segments connected with each other in series, and the line indicated by a row of the straight line segments is called a line segment row.

The deformed map generating unit 34 comprises a route map generating unit 38 for extracting a route area around a route, which is indicated by the route information received by the input unit 32, from the image drawing region of the positional relationship fixing map and generating a route map corresponding to the route area as the simplified deformed map;

a target object related road area lengthening unit 39 for selecting two particular target objects, which are respectively related to the same particular road area drawing in the positional relationship fixing map according to the positional relationships for the particular target objects and overlap each other in the positional relationship fixing map, from among the target objects drawing in the positional relationship fixing map and lengthening the particular road area not to overlap the particular target objects with each other;

a target object no-related road area simplifying unit 40 for selecting a particular road area not related to any target object from among the target objects drawn in the positional relationship fixing map and simplifying the display of the particular road area by thinning out display data of the particular road area;

a crossing angle resetting unit 41 for selecting two particular road areas crossing each other from among the road areas drawn in the positional relationship fixing map and resetting a crossing angle between the particular road areas to a deforming angle according to the deforming angle information received by the input unit 32;

a line segment end moving unit 42 for superimposing a mesh having a plurality of mesh intersections on the positional relationship fixing map generated by the positional relationship determining unit 37 according to the mesh information received by the input unit 32 and moving an end of a line segment written in the positional relationship fixing map to a particular mesh intersection placed closest to the end of the line segment for each of ends of a plurality of line segments; and a road shape deforming unit 43 for superimposing a mesh having a plurality of lateral lines and a plurality of longitudinal lines on the positional relationship fixing map generated by the positional relationship determining unit 37 according to the mesh information received by the input unit 32, detecting a plurality of crossing points, respectively denoting a point at which one line segment of one line segment row drawn in the positional relationship fixing map crosses one lateral or longitudinal line of the mesh, as a group of crossing points for each line segment row and replacing one line segment row passing though one group of crossing points with an approximate line segment row composed of a plurality of straight approximate line segments respectively connecting one pair of crossing points adjacent to each other, for each line segment row drawn in the positional relationship fixing map.

In the above configuration, an operation performed in the deformed map automatic generation system 31 is described.

When a user inputs pieces of deformed map generating information such as an image drawing region, route information, a positional relationship determining method, road shape deforming information, mesh information (a size of a mesh and a position of the mesh) and deforming angle information to the input apparatus 44, the deformed map generating information is sent to the input unit 32. In this case, the user inputs the pieces of deformed map generating information according to an interactive data entry method, or the user selects the pieces of deformed map generating information stored in a file in advance.

Thereafter, the vector map reading unit 33 reads out particular map information indicating a particular vector road map from the vector road and block map data base 45 when the image drawing region is sent to the input unit 32. In the particular map information, road information indicating a road area corresponding to the image drawing region and target object information indicating positions of a plurality of target objects existing in the image drawing region. Thereafter, the particular map information is sent to the positional relationship determining unit 37, and other pieces of deformed map generating information such as route information, a positional relationship determining method, road shape deforming information, mesh information (a size of a mesh and a position of the mesh) and deforming angle information are sent to the deformed map generation control unit 35.

In the deformed map generation control unit 35, the other pieces of deformed map generating information are analyzed, an instruction corresponding to the positional relationship determining method is sent to the positional relationship determining unit 37, an instruction corresponding to the route information is sent to the route map generating unit 38, an instruction corresponding to the road shape deforming information is sent to the target object related road area lengthening unit 39 and the target object no-related road area simplifying unit 40, an instruction corresponding to the mesh information is sent to the line segment end moving unit 42 and the road shape deforming unit 43, and an instruction corresponding to the deforming angle information is sent to the crossing angle resetting unit 41.

Figure 11:
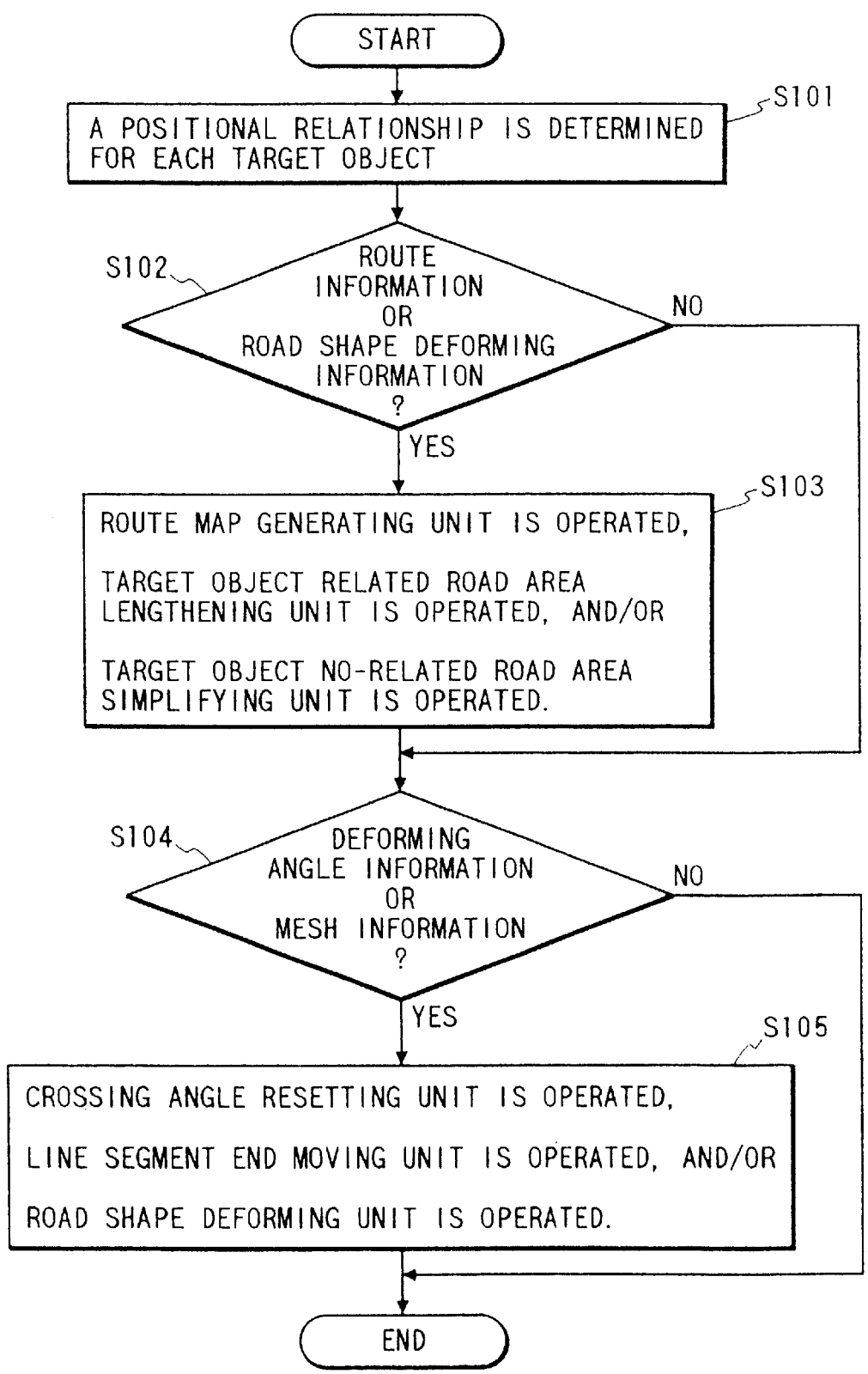
FIG. 11 is a flow chart showing a procedure for generating a simplified deformed map in a positional relationship determining unit and a deformed map generating unit shown in FIG. 10.

FIG. 11 is a flow chart showing a procedure for generating a simplified deformed map from the particular vector road map indicated by the particular map information in the positional relationship determining unit 37 and the deformed map generating unit 34 according to the pieces of deformed map generating information under the control of the deformed map generation control unit 35.

Figure 12:
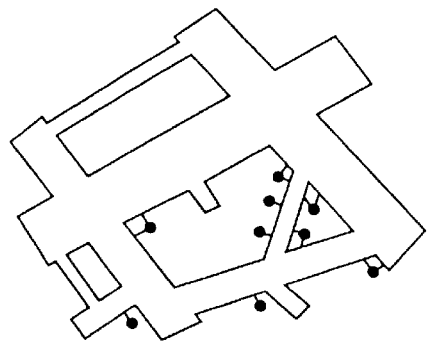
FIG. 12 shows an example of a positional relationship fixing map in which positional relationships among roads and target objects designated by black circles are fixed.

As shown in FIG. 11, in the positional relationship determining unit 37, a positional relationship between a target object indicated by the target object information and a road area indicated by the road information is determined for each of a plurality of target objects, the positional relationships for the target objects are added to the particular map information to fix the positional relationships among the road areas and the target objects, and a positional relationship fixing map is generated (step 101). Therefore, even though the positional relationship fixing map is deformed in the units 38 to 43, the positional relationships are always maintained. In detail, as shown in FIG. 12, a distance between a target object indicated by a black circle and each of roads surrounding the target object is calculated. In cases where one distance corresponding to one road is lower than or equal to a predetermined length, a positional relationship between the target object and the road is added to the particular map information. That is, a relationship between a distance from a starting point of the road to the target object and a distance from an end point of the road to the target object is added to the particular map information. Therefore, even though the road is lengthened by the target object related road area lengthening unit 39, the positional relation of the target object to the road is maintained. Also, information indicating that the target object is placed on which side of the road is added to the particular map information. In cases where the target object is a building, a positional relationship between an entrance of the building and a road facing the entrance of the building is always added to the particular map information. Also, there is a case that the position of the target object is related to a plurality of roads.

Figure 13:
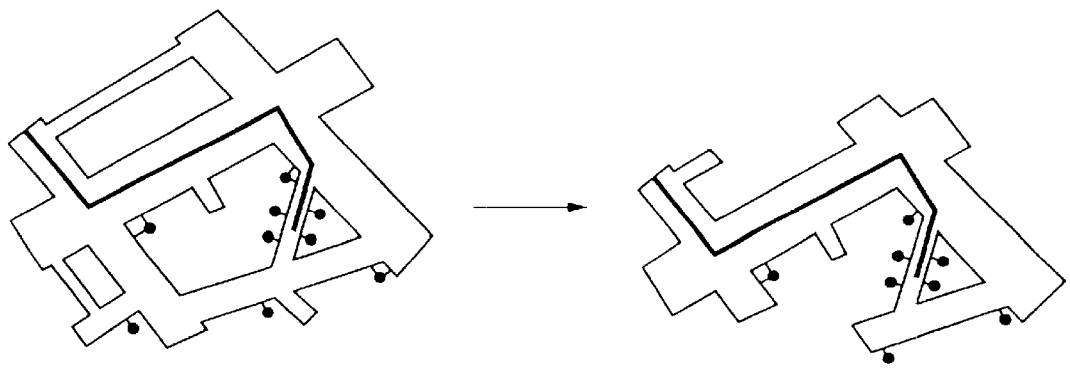
FIG. 13 shows an example of a route map generated from the positional relationship fixing map in a route map generating unit shown in FIG. 10.

Thereafter, as shown in FIG. 11, it is judged by the deformed map generation control unit 35 whether the route information or the road shape deforming information relating to the target object related road area lengthening unit 39 or the target object no-related road area simplifying unit 40 exists in the deformed map generating information (step 102). In cases where any information does not exist, any of the route map generating unit 38, the target object related road area lengthening unit 39 and the target object no-related road area simplifying unit 40 is not operated, and the procedure proceeds to a step 104. In contrast, in cases where information relating to the route map generating unit 38, the target object related road area lengthening unit 39 or the target object no-related road area simplifying unit 40 exists, the route map generating unit 38, the target object related road area lengthening unit 39 or the target object no-related road area simplifying unit 40 is operated (step 103). In this case, there is a case that two of the units 38 to 40 or all units 38 to 40 are operated, and the operation order is not limited. In detail, in the route map generating unit 38, a starting point of a route and an end point of the route are extracted from the route information, and a first circular area of a predetermined diameter (for example, 100 m) with center at the starting point, a second circular area of the predetermined diameter with center at the end point and a third area placed within a predetermined distance (for example, 25 m) from the route are determined. Thereafter, as shown in FIG. 13, a route map corresponding to the first circular area, the second circular area and the third area is generated from the positional relationship fixing map.

Figure 14:
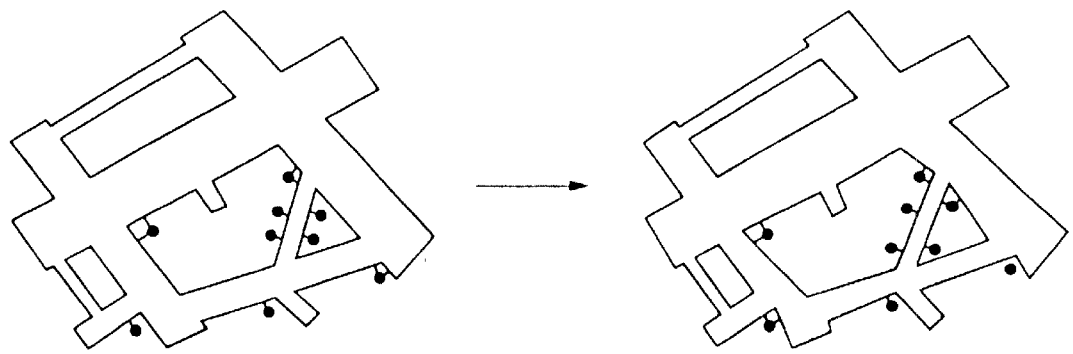
FIG. 14 shows an example of a simplified deformed map generated from the positional relationship fixing map in a target object surrounding area deforming unit shown in FIG. 10.

In the target object related road area lengthening unit 39, two or more particular target objects, which are respectively related to the same particular road area drawing in the positional relationship fixing map according to the positional relationships for the particular target objects and overlap each other in the positional relationship fixing map, are selected from among the target objects drawing in the positional relationship fixing map, and the particular road area is lengthened not to overlap the particular target objects with each other. Therefore, as shown in FIG. 14, an area surrounding the particular target objects is emphasized, so that it is prevented that symbols (that is, black circles) or characters indicating the particular target objects related to the lengthened road overlap each other. In this case, because the particular road area is lengthened, it is required that a road area which is adjacent to the particular road and is not related to any target object is deformed.

Figure 15:
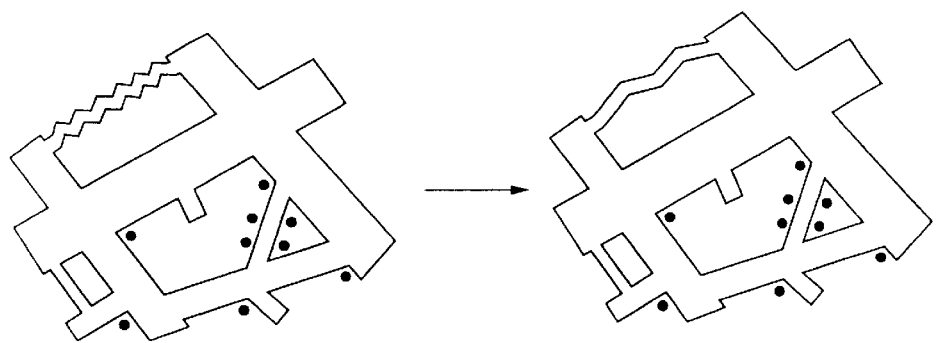
FIG. 15 shows an example of a simplified deformed map generated from the positional relationship fixing map in a no-related area to target object simplifying unit shown in FIG. 10.

In the target object no-related road area simplifying unit 40, a particular road area not related to any target object is selected from among the display target objects drawn in the positional relationship fixing map, and the display of the particular road area is simplified by thinning out data required to display the particular road area. Therefore, as shown in FIG. 15, a simplified map is generated as a simplified deformed map from the positional relationship fixing map.

Thereafter, as shown in FIG. 11, it is judged by the deformed map generation control unit 35 whether the deforming angle information for the crossing angle resetting unit 41, the mesh information for the line segment end moving unit 42 or the mesh information for the road shape deforming unit 43 exists in the deformed map generating information (step 104). In cases where any information does not exist, the procedure is finished. In contrast, in cases where the deforming angle information or the mesh information exists, the crossing angle resetting unit 41, the line segment end moving unit 42 or the road shape deforming unit 43 is operated (step 105).

Figure 16:
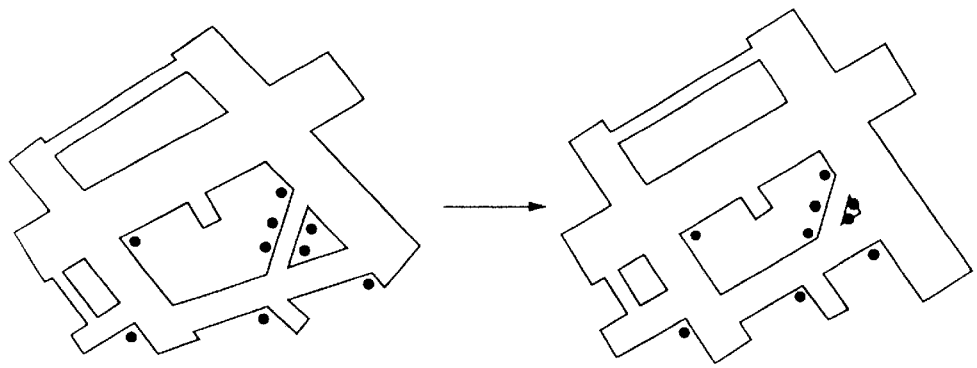
FIG. 16 shows an example of a simplified deformed map generated from the positional relationship fixing map in a crossing angle resetting unit shown in FIG. 10.

In the crossing angle resetting unit 41, two particular road areas crossing each other are selected from among the road areas drawn in the positional relationship fixing map, and a crossing angle between the particular road areas is reset to a deforming angle according to the deforming angle information. In detail, in cases where both ends of a first line segment row of a first road are connected with a second line segment row of a second road and a third line segment row of a third road and a crossing angle between the first and second line segment rows of the first and second roads is reset, a line segment row rotating operation, in which the first line segment row is rotated against the second line segment row around an intersection of the first line segment row and the second line segment row, is performed. In this case, because the first line segment row is disconnected from the third line segment row, a line segment row moving operation, in which the third line segment row is moved to connect the third line segment row with the first line segment row is performed after the line segment row rotating operation. Therefore, as shown in FIG. 16, a crossing angle simplified deformed map is generated as a simplified deformed map from the positional relationship fixing map. In this embodiment, a reset crossing angle can be specified in 1 degree, 5 degrees, 15 degrees or the like.

Figure 17:
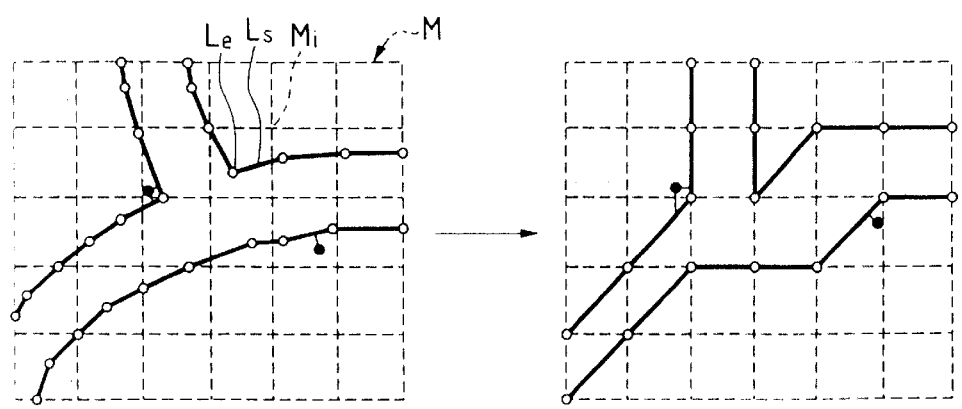
FIG. 17 shows an example of the processing performed in a line segment end moving unit shown in FIG. 10.

In the line segment end moving unit 42, as shown in FIG. 17, a mesh M having a plurality of mesh intersections Mi is superimposed on the positional relationship fixing map generated by the positional relationship determining unit 37 according to the mesh information. Thereafter, an end Le (indicated by a white circle) of each line segment Ls is moved to a particular mesh intersection Mi placed closest to the end Le of the line segment Ls.

Figure 18:
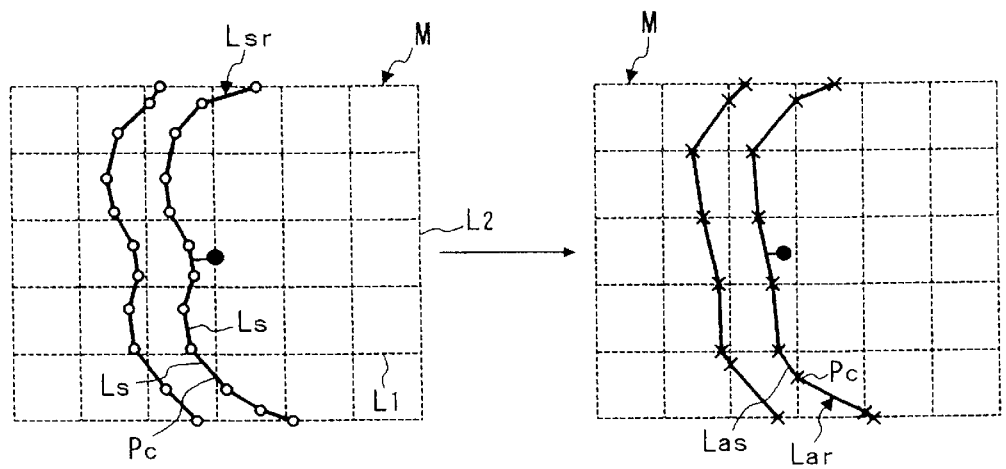
FIG. 18 shows an example of the processing performed in a road shape deforming unit shown in FIG. 10.

In the road shape deforming unit 43, as shown in FIG. 18, a mesh M having a plurality of lateral lines L1 and a plurality of longitudinal lines L2 is superimposed on the positional relationship fixing map generated by the positional relationship determining unit 37 according to the mesh information. Thereafter, a plurality of crossing points Pc, respectively denoting a point at which one line segment Ls of one line segment row Lsr drawn in the positional relationship fixing map crosses one lateral or longitudinal line of the mesh, are detected as a group of crossing points for each line segment row, and one line segment row passing though one group of crossing points is replaced with an approximate line segment row Lar composed of a plurality of straight approximate line segments Las respectively connecting one pair of crossing points Pc adjacent to each other, for each line segment row drawn in the positional relationship fixing map. Therefore, a plurality of road areas indicated by a plurality of approximate line segment rows are indicated in place of a plurality of line segment rows.

After the processing in the deformed map generating unit 34 is finished, a simplified deformed map generated from the positional relationship fixing map in the unit 34 is output to the output apparatus 46 through the output unit 36.

Accordingly, a simplified deformed map for an arbitrary drawing region can be automatically generated in the deformed map automatic generation system 31 from the particular vector road map, which is indicated by the particular map information read out from the vector road and block map data base 45, on condition that the user can easily view the simplified deformed map. Also, because the positional relationships among the target objects and the roads are maintained even though the particular vector road map is deformed, the simplified deformed map can be useful for various purposes. Also, a data volume required to indicate the simplified deformed map is reduced in the target object no-related road area simplifying unit 40, the simplified deformed map can be easily transmitted through a telecommunication line or an internet.

(Third Embodiment)

A map information providing system, in which a simplified deformed map generated in the deformed map automatic generation system 31 is provided, is described according to a third embodiment.

Figure 19:
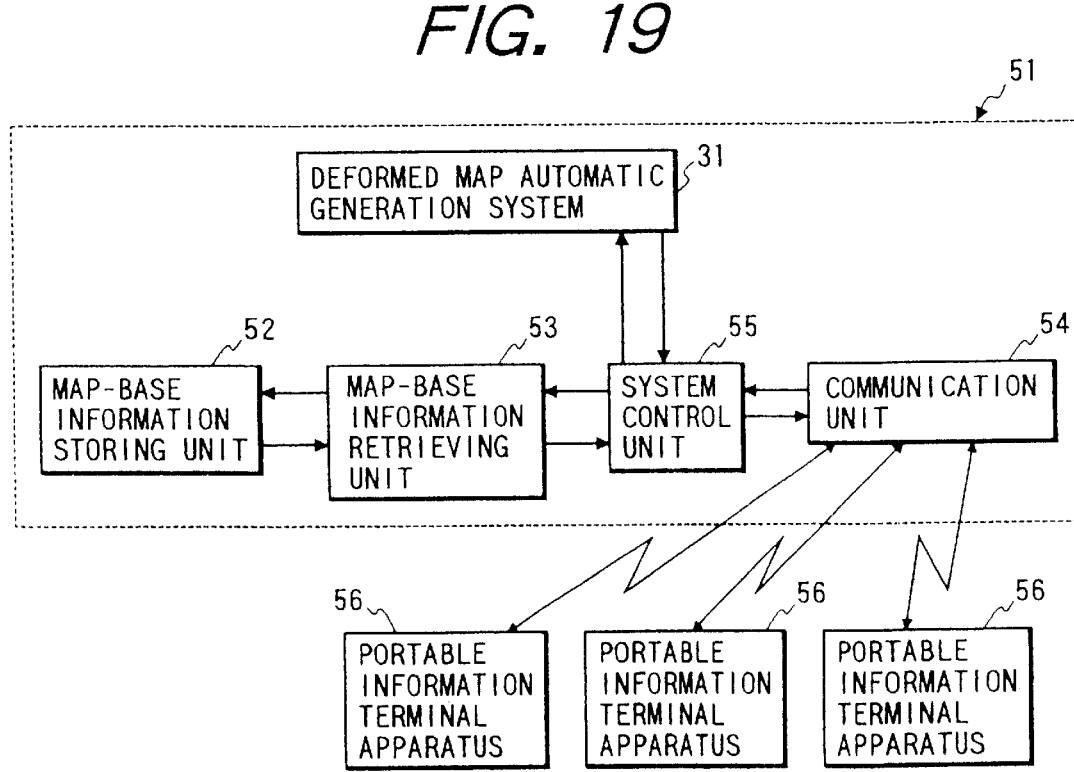
FIG. 19 is a block diagram of a map information providing system communicating with a plurality of portable information terminal apparatuses according to a third embodiment of the present invention.

FIG. 19 is a block diagram of a map information providing system communicating with a plurality of portable information terminal apparatuses according to a third embodiment of the present invention.

As shown in FIG. 19, a map information providing system 51 comprises a map-base information storing unit 52 for storing map-base information with related information composed of road data relating to a plurality of roads, target object data relating to a plurality of target objects and traffic data relating to means of transport;

a map-base information retrieving unit 53 for retrieving particular map-base information and particular related information from the map-base information storing unit 52;

the deformed map automatic generation system 31 for automatically generating a simplified deformed map according to the particular map-base information and the particular related information retrieved by the map-base information retrieving unit 53;

a communicating unit 54 for communicating with a plurality of portable information terminal apparatuses 56 to receive a retrieval request from one portable information terminal apparatus 56 and transmit deformed map information indicating the simplified deformed map generated by the deformed map automatic generation system 31 to the portable information terminal apparatus 56; and a system control unit 55 for generating a retrieval instruction row from the retrieval request received by the communicating unit 54, instructing the map-base information retrieving unit 53 to retrieve the particular map-base information and the particular related information according to the retrieval instruction row, receiving the particular map-base information and the particular related information retrieved by the map-base information retrieving unit 53, instructing the deformed map automatic generation system 31 to generate the deformed map information indicating the simplified deformed map from the particular map-base information and the particular related information and instructing the communicating unit 54 to transmit the deformed map information to the portable information terminal apparatus 56.

As shown in FIG. 20, a road table in which data relating to a plurality of roads drawn on a vector road map is written, a target object table in which data relating to a plurality of target objects is written and a traffic table in which data relating to a plurality of traffic networks is written are stored in the map-base information storing unit 52. The road table is composed of a node sub-table in which a plurality of node positions indicating positions of a plurality of intersections in the roads are written as pieces of point information, an arc sub-table in which data relating to a plurality of arcs respectively placed between two nodes are written as pieces of line information and a region name sub-table in which a plurality of region names related to the nodes and the arcs are written. The node sub-table is composed of a node number field, a longitude field and a latitude field. The arc sub-table is composed of an arc number field, a starting point field in which a plurality of nodes placed at a plurality of starting points are written, an end point field in which a plurality of nodes placed at a plurality of end points are written, and a length field in which lengths of the arcs are written. The region name sub-table is composed of a region name field, a node number row field and an arc number row field. A plurality of intersections (or nodes) and pieces of line information (or arcs) of the roads in the vector road map are written in the region name sub-table in correspondence to data (or region names) arranged on a plurality of mesh intersections.

The target object table is composed of a name field in which a plurality of names of the target objects existing in the vector road map are written, a business category field in which occupations or industry types in the target objects are written, a position information field in which a plurality of positions of the target objects are respectively indicated by a longitude and a latitude, an address field in which a plurality of addresses of the target objects are written, a telephone number field in which a plurality of telephone numbers of the target objects are written, a nearest station field in which a plurality of stations respectively nearest to one of the target objects are written, and a main institution flag field in which a flag set to "on" is written when a corresponding target object is used as a land mark.

The traffic table is composed of a starting station field in which names of a plurality of starting stations are written, an arriving station field in which a name of an arriving station is written for each starting station, a traffic route name field in which a name of a traffic route is written for each pair of starting and arriving stations, an intermediate station field in which names of a plurality of intermediate stations are written for each pair of starting and arriving stations, a necessary time field in which a time required to travel from one starting station to one arriving station is written for each pair of starting and arriving stations, and a fare field in which a fare required to travel from one starting station to one arriving station is written for each pair of starting and arriving stations.

In the above configuration of the map information providing system 51, when a communication request from one portable information terminal apparatus 56 is received in the communicating unit 54, a channel of the map information providing system 51 is connected with the portable information terminal apparatus 56. Thereafter, when a retrieval request is transmitted from the portable information terminal apparatus 56 to the communicating unit 54, the retrieval request is sent to the system control unit 55. In the system control unit 55, the retrieval request is analyzed, a row of retrieval instructions is generated and is sent to the map-base information retrieving unit 53. Therefore, the operation of the map-base information retrieving unit 53 is started, and a retrieval operation in which information stored in the map-base information storing unit 52 is operated.

Figure 21:
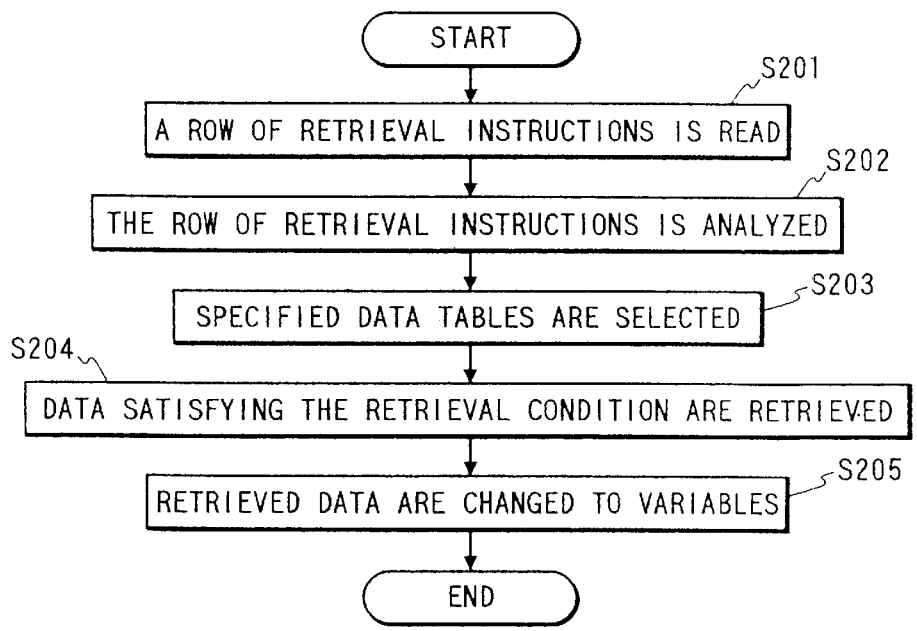
FIG. 21 is a flow chart showing a procedure of a retrieval operation performed in a retrieving unit shown in FIG. 19.

FIG. 21 is a flow chart showing a procedure of a retrieval operation performed in the map-base information retrieving unit 53.

As shown in FIG. 21, the row of retrieval instructions is read in the map-base information retrieving unit 53 (step 201), and the row of retrieval instructions is analyzed (step 202). Therefore, one or more data tables stored in the map-base information storing unit 52 are specified, and a retrieval condition and a variable for a retrieval result (a pointer to a region in which a retrieval result is planned to be stored) are specified.

Thereafter, the specified data tables are selected from a group of the road table, the target object table and the traffic table (step 203), pieces of data satisfying the retrieval condition are retrieved from the specified data tables (step 204), the pieces of retrieved data are changed to variables indicating a retrieval result (step 205), and the retrieval operation is finished. In this case, pieces of road data and pieces of target object data are included in the retrieval result.

The system control unit 55 receives the retrieval result from the map-base information retrieving unit 53 and sends the pieces of road data and the pieces of target object data of the retrieval result to the deformed map automatic generation system 31, and the system control unit 55 instructs the deformed map automatic generation system 31 to generate a simplified deformed map from the pieces of road data and the pieces of target object data. When a simplified deformed map is generated in the deformed map automatic generation system 31 according to the second embodiment, the simplified deformed map is received by the system control unit 55 and is sent to the portable information terminal apparatus 56 through the communicating unit 54.

Figure 22:
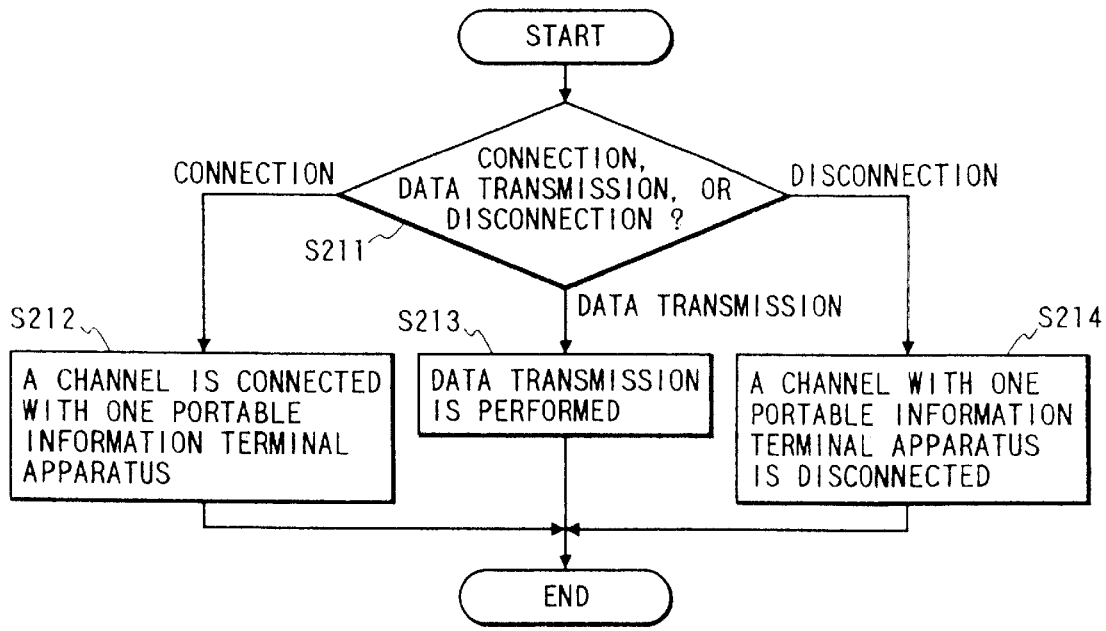
FIG. 22 is a flow chart showing a radio communication performed by a communicating unit shown in FIG. 19.

The communicating unit 54 performs a radio communication between the system control unit 55 and the portable information terminal apparatus 56 according to a procedure shown in FIG. 22.

The communicating unit 54 judges whether a communication request received from the system control unit 55 or the portable information terminal apparatus 56 indicates a connection of a channel, a data transmission through a channel or a disconnection of a channel (step 211). In cases where the communication request indicates a connection of a channel, a channel between the system control unit 55 and the portable information terminal apparatus 56 is connected (step 212). In cases where the communication request indicates a data transmission through a channel, data is transmitted from the system control unit 55 (or the portable information terminal apparatus 56) to the portable information terminal apparatus 56 (or the system control unit 55) through the communicating unit 54 (step 213). In cases where the communication request indicates a disconnection of a channel, a channel between the system control unit 55 and the portable information terminal apparatus 56 is disconnected (step 214).

Figure 23:
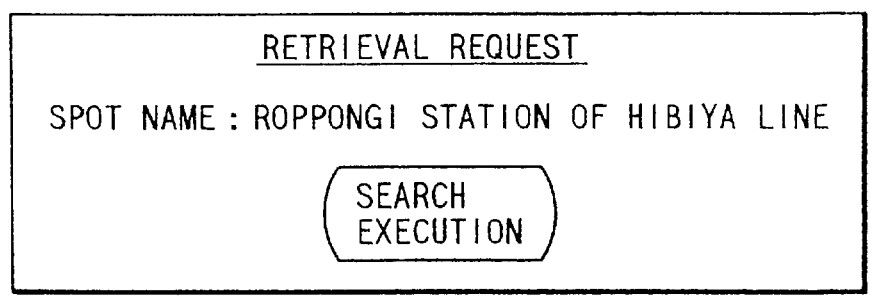
FIG. 23 shows a spot name displayed on a display plane of a portable information terminal apparatus shown in FIG. 19.
Figure 24:
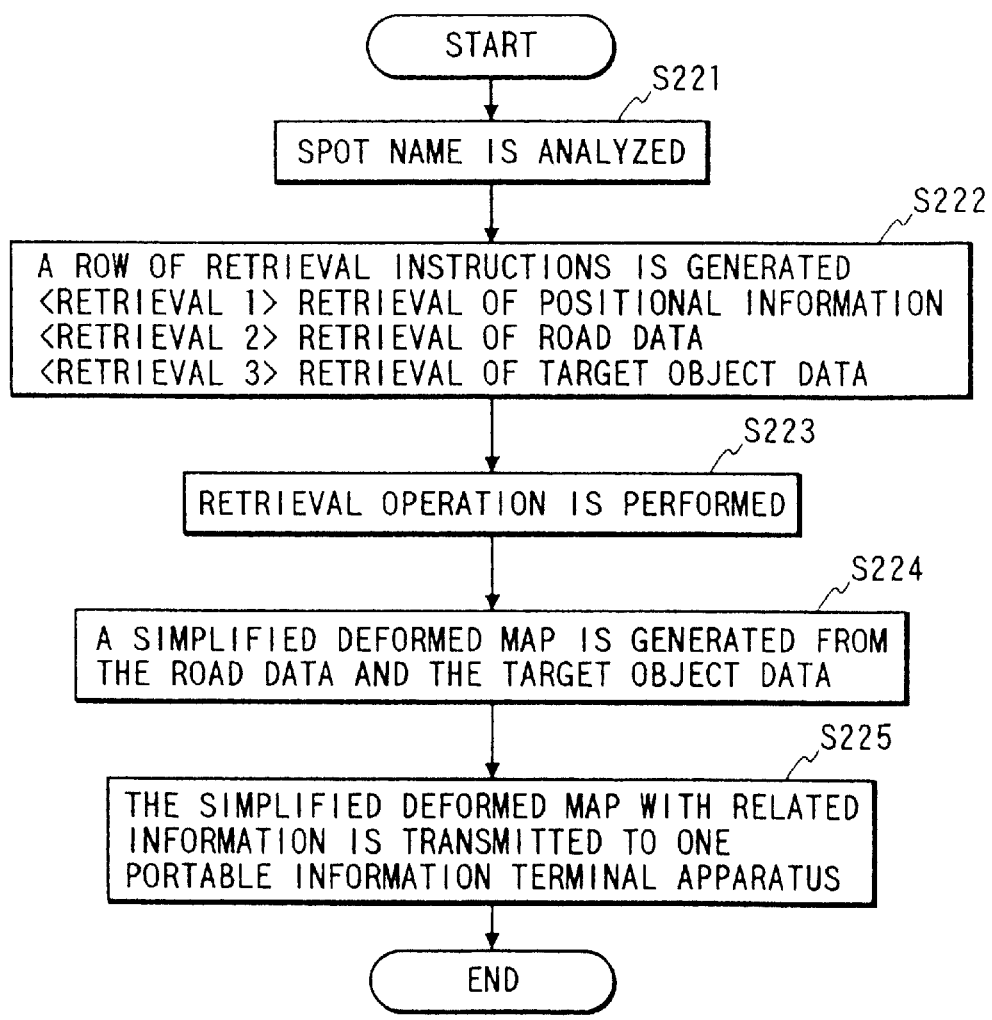
FIG. 24 is a flow chart showing an operation performed in a system control unit shown in FIG. 19 when the spot name is input.
Figures 25, 26:
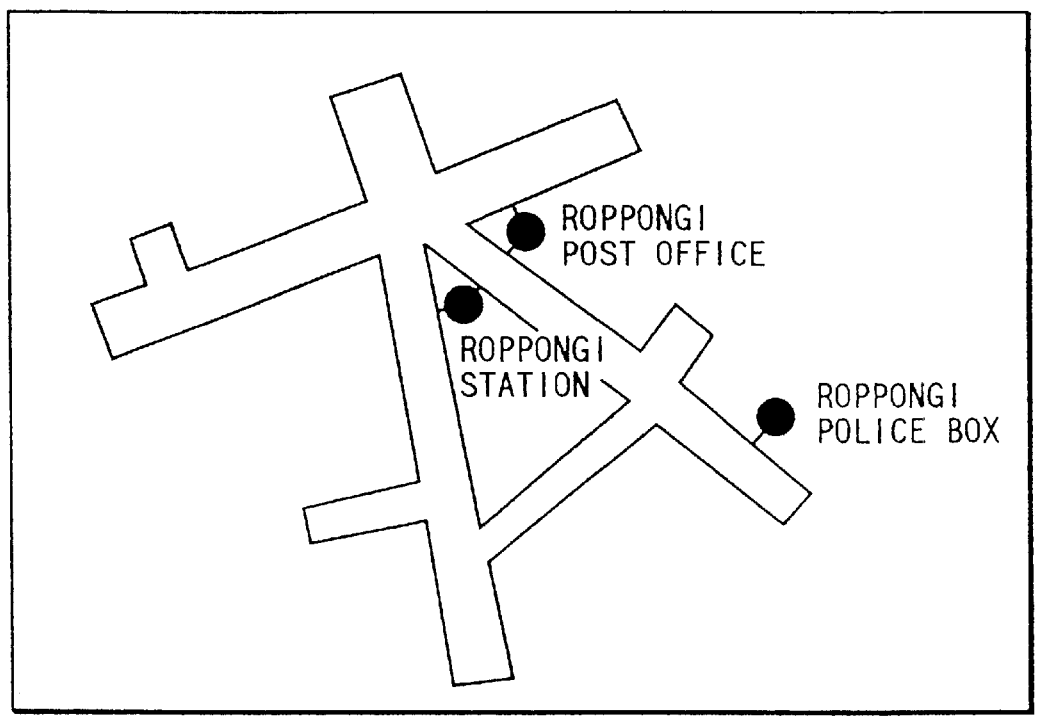
FIG. 25 shows an example of a simplified deformed map with related information displayed on a display plane of a portable information terminal apparatus shown in FIG. 19 when the spot name is input.
FIG. 26 shows a region name displayed on a display plane of a portable information terminal apparatus shown in FIG. 19.

Next, an example of an operation, in which a simplified deformed map with related information is generated and transmitted to one portable information terminal apparatus 56 when an arbitrary spot name input to the portable information terminal apparatus 56 by a user is transmitted to the information providing apparatus 51 as a retrieval request, is described with reference to FIGS. 23, 24 and 25.

In cases where a user desires to obtain a map of an area surrounding a particular spot "the Roppongi Station of the Hibiya Line" while indicating names of one or more main institutions according to related information, the user inputs a spot name "Roppongi Station of Hibiya Line" to one portable information terminal apparatus 56. Therefore, as shown in FIG. 23, the spot name is displayed on a display plane of the portable information terminal apparatus 56. Thereafter, the system control unit 55 receives a retrieval request including the spot name sent from the portable information terminal apparatus 56 through the communicating unit 54, and the system control unit 55 controls the map-base information retrieving unit 53 and the deformed map automatic generation system 31 according to a procedure shown in FIG. 24.

When the system control unit 55 receives the retrieval request including the spot name, the spot name of the retrieval request is analyzed in the system control unit 55 (step 221), and a row of three retrieval instructions is generated (step 222). A first retrieval instruction indicates the retrieval of positional information of the spot name "Roppongi Station of Hibiya Line" from the target object table. A second retrieval instruction indicates the retrieval of road data, which corresponds to a circular area of a predetermined diameter (for example, 1000 m) with center at a station place indicated by the positional information, from the road table. A third retrieval instruction indicates the retrieval of target object data indicating a plurality of main institutions placed in the circular area of the road data from the target object table.

The row of the retrieval instructions is sent to the map-base information retrieving unit 53, and a retrieval operation is performed (step 223). Therefore, the positional information of the spot name and target object data are retrieved from the target object table, and road data is retrieved from the road table. Thereafter, the target object data and the road data are sent to the deformed map automatic generation system 31, and the system control unit 55 receives a simplified deformed map generated in the system 31 (step 224). In the simplified deformed map, an area surrounding the Roppongi Station of the Hibiya Line is drawn. Also, positions of one or more main institutions are indicated as positions of target objects, and names of the main institutions are drawn as related information. Thereafter, the simplified deformed map with the related information is transmitted to the portable information terminal apparatus 56 through the communicating unit 54 (step 225). Therefore, the generation of the simplified deformed map and the transmission of the simplified deformed map and the related information are completed. As shown in FIG. 25, the simplified deformed map with the related information is displayed on the display plane of the portable information terminal apparatus 56 with the related information.

Figure 27:
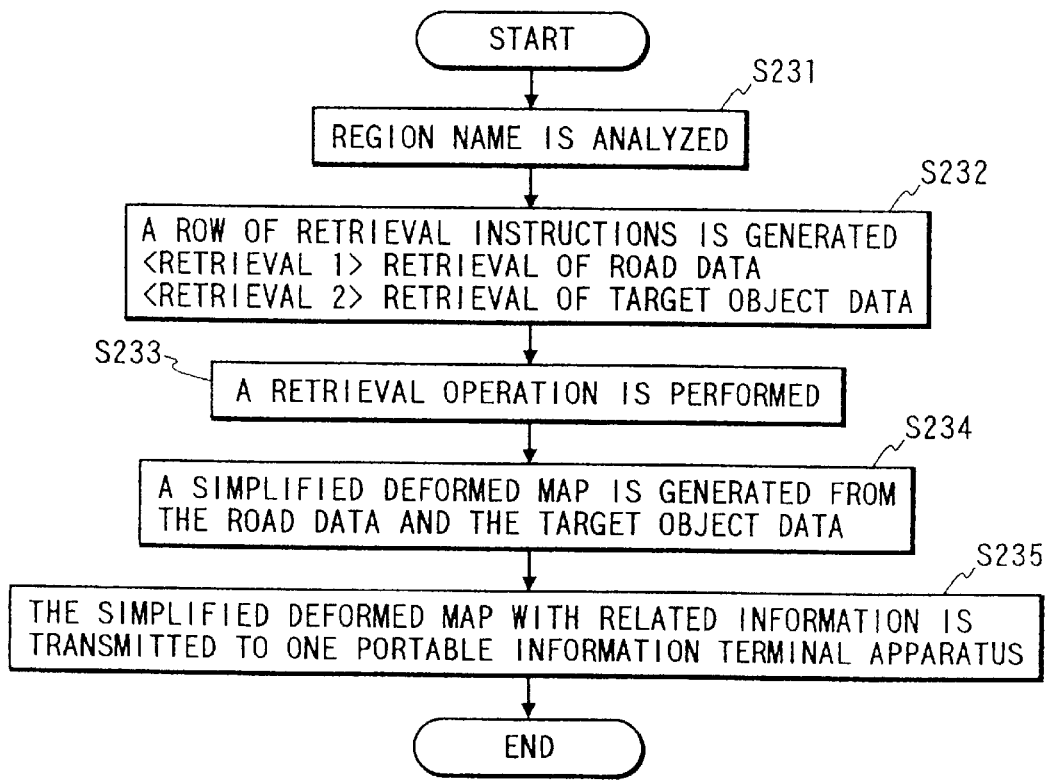
FIG. 27 is a flow chart showing an operation performed in a system control unit shown in FIG. 19 when the region name is input.
Figure 28:
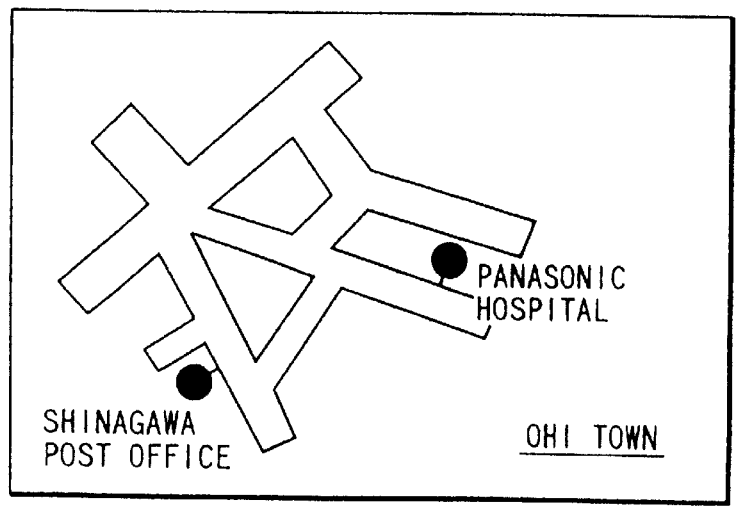
FIG. 28 shows an example of a simplified deformed map with related information displayed on a display plane of a portable information terminal apparatus shown in FIG. 19 when the region name is input.

Next, an example of an operation, in which a simplified deformed map with related information is generated and transmitted to one portable information terminal apparatus 56 when an arbitrary region name input to the portable information terminal apparatus 56 by a user is transmitted to the information providing apparatus 51 as a retrieval request, is described with reference to FIGS. 26, 27 and 28.

In cases where a user desires to obtain a map of the Ohi town in which names of one or more main institutions are indicated as related information, the user inputs a region name "Ohi town" to one portable information terminal apparatus 56. Therefore, as shown in FIG. 26, the region name is displayed on a display plane of the portable information terminal apparatus 56. Thereafter, the system control unit 55 receives a retrieval request including the region name transmitted from the portable information terminal apparatus 56 through the communicating unit 54, and the system control unit 55 controls the map-base information retrieving unit 53 and the deformed map automatic generation system 31 according to a procedure shown in FIG. 27.

When the system control unit 55 receives the retrieval request including the region name, the region name of the retrieval request is analyzed in the system control unit 55 (step 231), and a row of two retrieval instructions is generated (step 232). A first retrieval instruction indicates the retrieval of road data corresponding to a particular area indicated by the region name of the region name sub-table from the road table. A second retrieval instruction indicates the retrieval of target object data indicating a plurality of main institutions placed in the particular area from the target object table.

The row of the retrieval instructions is sent to the map-base information retrieving unit 53, and a retrieval operation is performed (step 233). Thereafter, the system control unit 55 receives a simplified deformed map generated in the deformed map automatic generation system 31 (step 234). In the simplified deformed map, a plurality of roads and one or more main institutions in the Ohi town are drawn. Also, names of the main institutions are drawn as related information. Thereafter, the simplified deformed map with the related information is transmitted to the portable information terminal apparatus 56 through the communicating unit 54 (step 235). Therefore, as shown in FIG. 28, the simplified deformed map with the related information is displayed on the display plane of the portable information terminal apparatus 56 with the related information.

Figure 29:
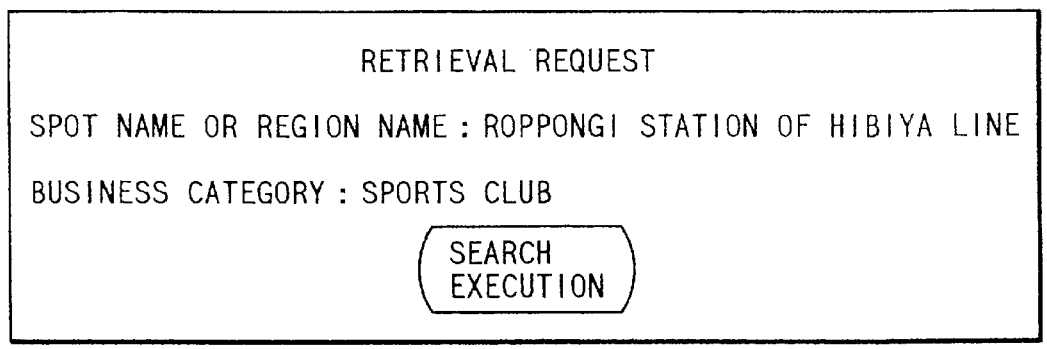
FIG. 29 shows a spot name or a region name and a category of business displayed on a display plane of a portable information terminal apparatus shown in FIG. 19.
Figure 30:
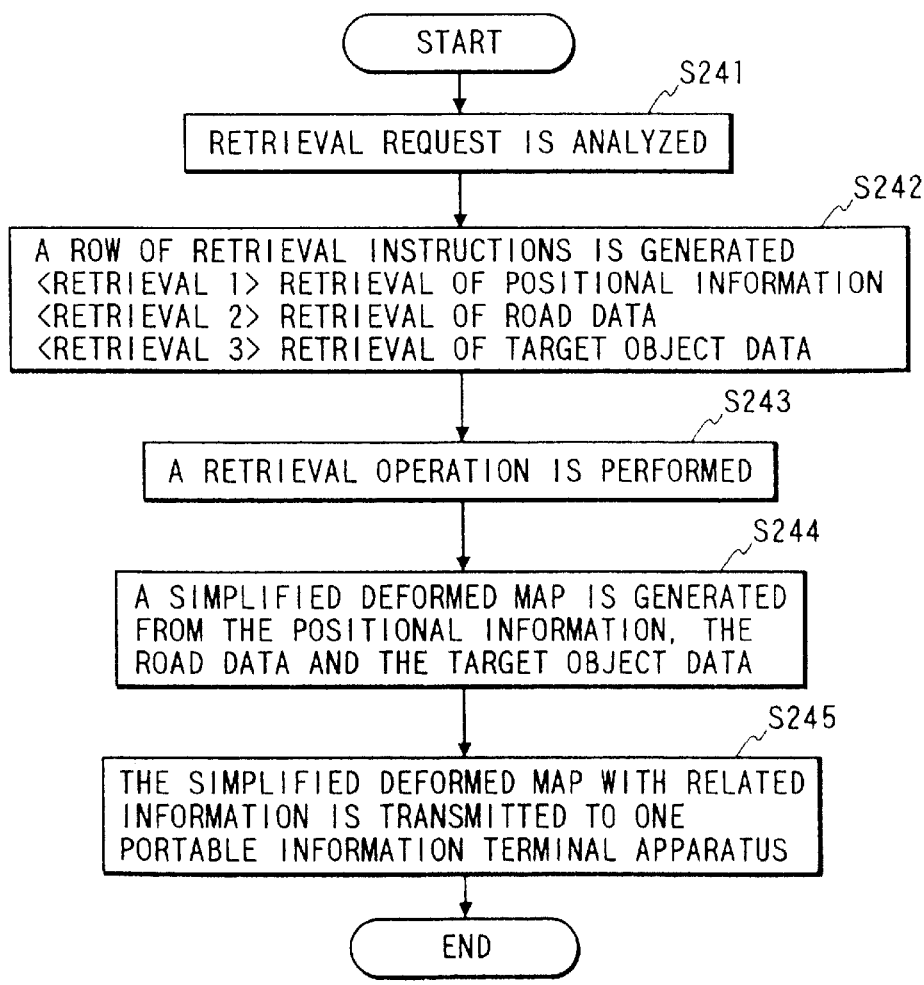
FIG. 30 is a flow chart showing an operation performed in a system control unit shown in FIG. 19 when the spot name or the region name and the category of business are input.
Figures 31, 32:
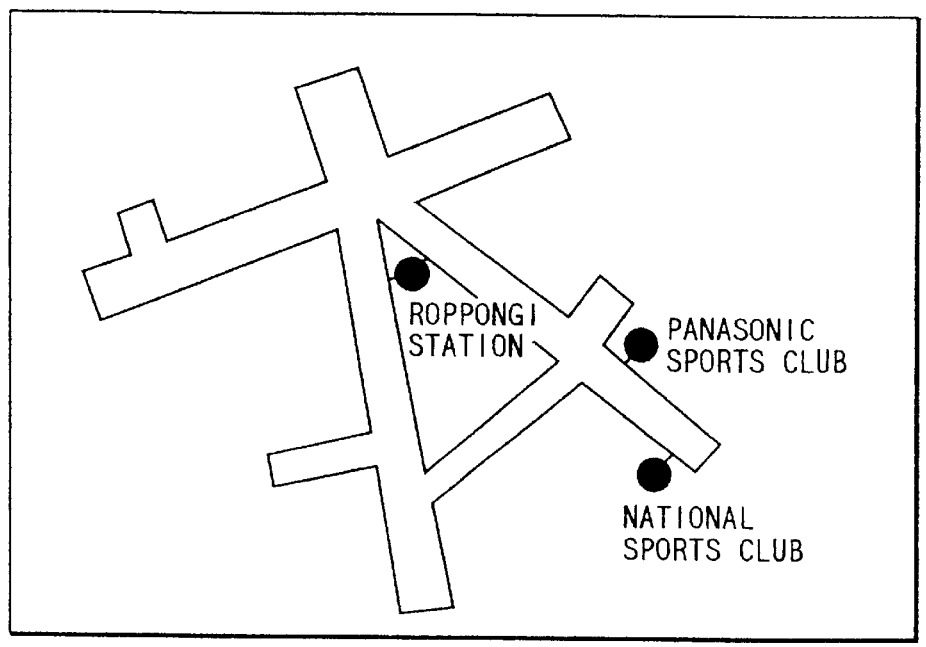
FIG. 31 shows an example of a simplified deformed map with related information displayed on a display plane of a portable information terminal apparatus shown in FIG. 19 when the spot name or the region name and the category of business are input.
FIG. 32 shows an address record displayed on a display plane of a portable information terminal apparatus shown in FIG. 19.

Next, an example of an operation, in which a simplified deformed map with related information is generated and transmitted to one portable information terminal apparatus 56 when an arbitrary spot name (or an arbitrary region name) and a category of business input to the portable information terminal apparatus 56 by a user are transmitted to the information providing apparatus 51 as a retrieval request, is described with reference to FIGS. 29, 30 and 31.

In cases where a user desires to obtain a map of an area surrounding the Roppongi Station of the Hibiya Line in which names of one or more sports clubs are drawn at positions of the sports clubs as related information, the user inputs a spot name "Roppongi Station of Hibiya Line" and a category of business "sports club" to one portable information terminal apparatus 56. Therefore, as shown in FIG. 29, the spot name and the category of business are displayed on a display plane of the portable information terminal apparatus 56. Thereafter, the system control unit 55 receives a retrieval request including the spot name and the category of business sent from the portable information terminal apparatus 56 through the communicating unit 54, and the system control unit 55 controls the map-base information retrieving unit 53 and the deformed map automatic generation system 31 according to a procedure shown in FIG. 30.

When the system control unit 55 receives the retrieval request including the spot name and the category of business, the spot name and the category of business in the retrieval request are analyzed in the system control unit 55 (step 241), and a row of three retrieval instructions is generated (step 242). A first retrieval instruction indicates the retrieval of positional information of a target object identified by the spot name "Roppongi Station of Hibiya Line" from the target object table. A second retrieval instruction indicates the retrieval of road data, which corresponds to a circular area of a predetermined diameter (for example, 1000 m) with center at a station place indicated by the positional information, from the road table. A third retrieval instruction indicates the retrieval of target object data of one or more target objects relating to the sports club placed in the circular area of the road data from the target object table.

The row of the retrieval instructions is sent to the map-base information retrieving unit 53, and a retrieval operation is performed (step 243). Thereafter, the system control unit 55 receives a simplified deformed map generated in the deformed map automatic generation system 31 (step 244). In the simplified deformed map, an area surrounding the Roppongi Station of the Hibiya Line is drawn. Also, positions of one or more sports clubs are indicated as positions of target objects, and names of the sports club are drawn as related information. Thereafter, the simplified deformed map with the related information is transmitted to the portable information terminal apparatus 56 through the communicating unit 54 (step 245). Therefore, as shown in FIG. 31, the simplified deformed map with the related information is displayed on the display plane of the portable information terminal apparatus 56 with the related information.

Figure 33:
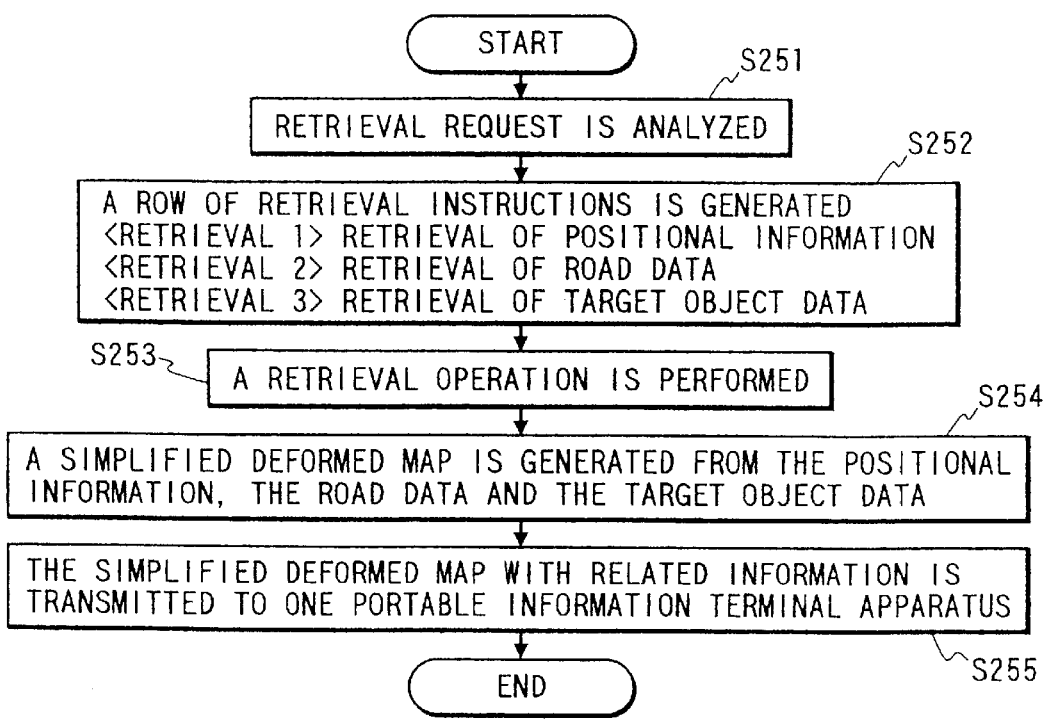
FIG. 33 is a flow chart showing an operation performed in a system control unit shown in FIG. 19 when the address record is input.
Figure 34:
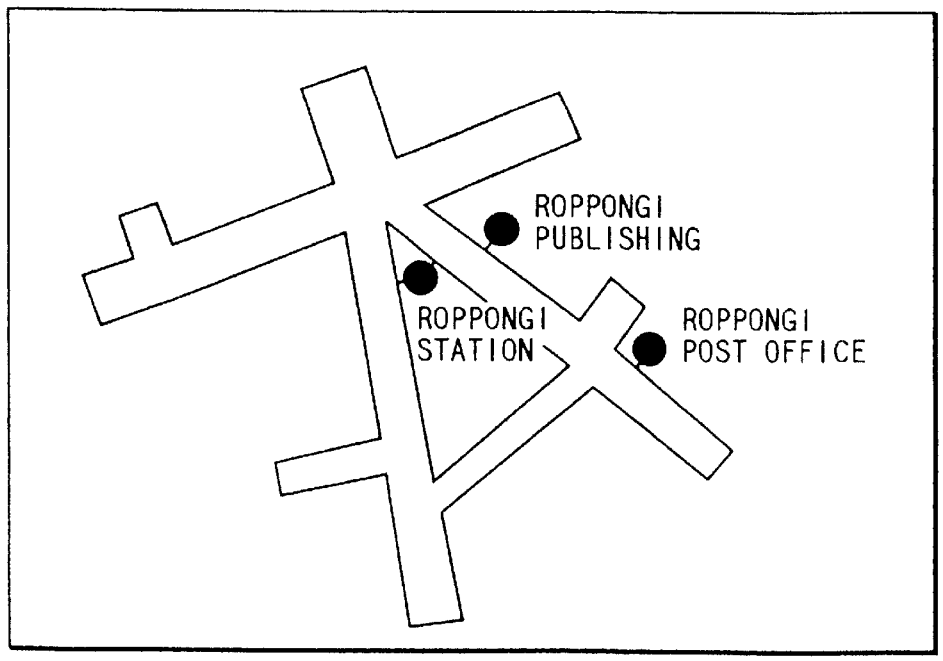
FIG. 34 shows an example of a simplified deformed map with related information displayed on a display plane of a portable information terminal apparatus shown in FIG. 19 when the address record is input.

Next, an operation, in which a map of an area surrounding a particular target object specified by an input telephone number is generated and transmitted to one portable information terminal apparatus 56 with related information attached to the simplified deformed map when the telephone number input to the portable information terminal apparatus 56 by a user is transmitted to the information providing apparatus 51 as a retrieval request, is described with reference to FIGS. 32, 33 and 34.

In cases where one portable information terminal apparatus 56 has a function for managing a plurality of address records, a user can obtain a telephone number of a target object (or a company). Therefore, when a user desires to obtain a map of an area surrounding the Roppongi Publishing Company in which a name of the Roppongi Publishing Company and names of one or more main institutions are drawn as related information, the user inputs a telephone number of the Roppongi Publishing Company to one portable information terminal apparatus 56. Therefore, as shown in FIG. 32, the name of the Roppongi Publishing Company, its address and the telephone number are displayed on a display plane of the portable information terminal apparatus 56. Thereafter, the system control unit 55 receives a retrieval request including the telephone number sent from the portable information terminal apparatus 56 through the communicating unit 54, and the system control unit 55 controls the map-base information retrieving unit 53 and the deformed map automatic generation system 31 according to a procedure shown in FIG. 33.

When the system control unit 55 receives the retrieval request including the telephone number, the telephone number in the retrieval request is analyzed in the system control unit 55 (step 251), and a row of three retrieval instructions is generated (step 252). A first retrieval instruction indicates the retrieval of positional information of a particular target object (or the Roppongi Publishing Company) identified by the telephone number from the target object table. A second retrieval instruction indicates the retrieval of road data, which corresponds to a circular area of a predetermined diameter (for example, 1000 m) with center at the particular target object, from the road table. A third retrieval instruction indicates the retrieval of target object data of one or more main institutions placed in the circular area of the road data from the target object table.

The row of the retrieval instructions is sent to the map-base information retrieving unit 53, and a retrieval operation is performed (step 253). Thereafter, the system control unit 55 receives a simplified deformed map generated in the deformed map automatic generation system 31 (step 254). In the simplified deformed map, an area surrounding the Roppongi Publishing Company is drawn. Also, the position of the Roppongi Publishing Company and the positions of the main institutions are indicated as the positions of the target objects, and names of the target objects are drawn as related information. Thereafter, the simplified deformed map with the related information is transmitted to the portable information terminal apparatus 56 through the communicating unit 54 (step 255). Therefore, as shown in FIG. 34, the simplified deformed map with the related information is displayed on the display plane of the portable information terminal apparatus 56 with the related information.

In this example, the telephone number is input and transmitted to the map information providing system 51. However it is applicable that an address or a target object name such as an institution name, a corporation name and a personal name be input in place of the telephone number.

Figure 35:
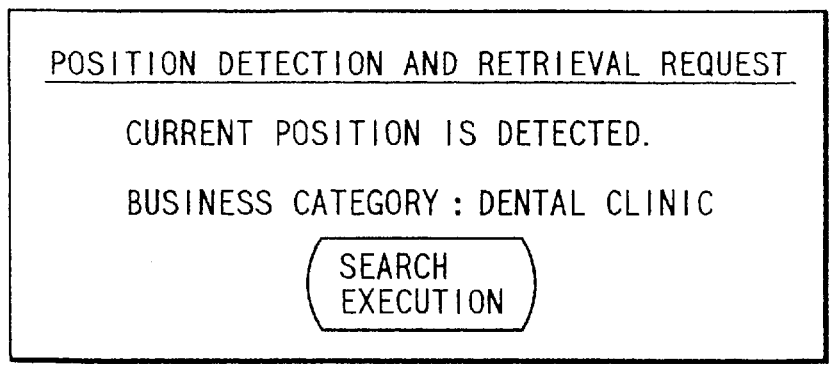
FIG. 35 shows a category of business displayed on a display plane of a portable information terminal apparatus shown in FIG. 19.
Figure 36:
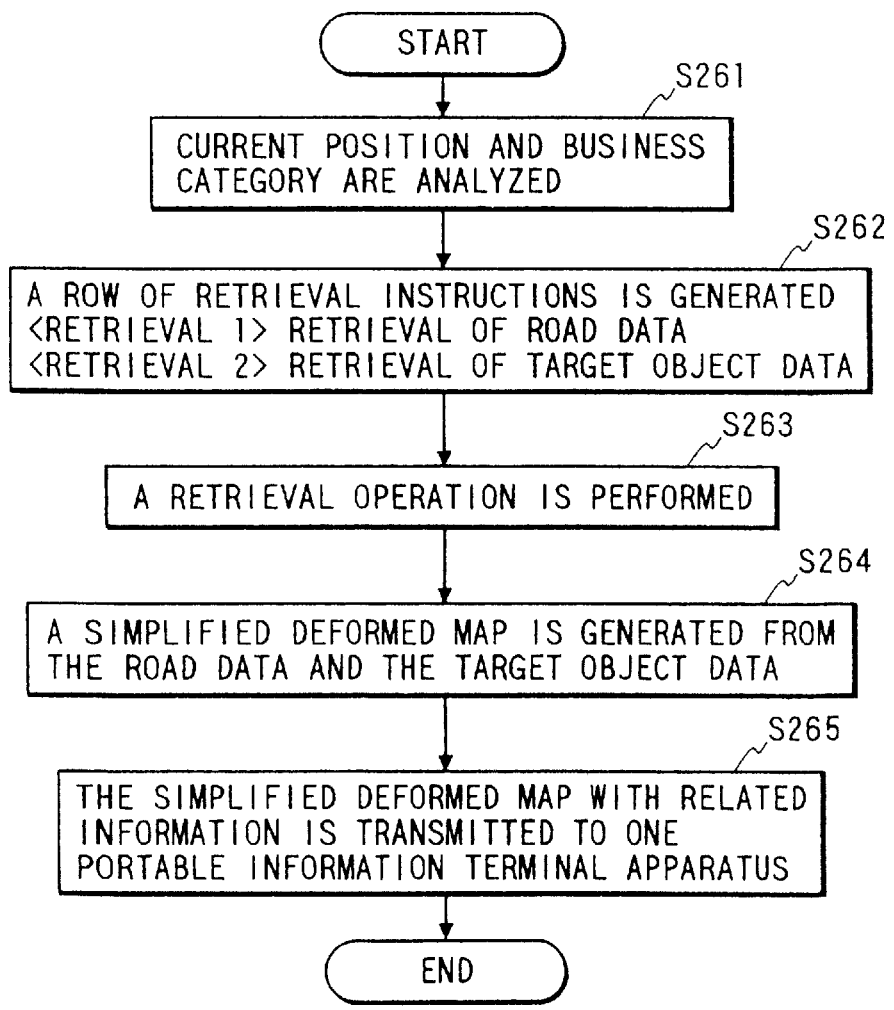
FIG. 36 is a flow chart showing an operation performed in a system control unit shown in FIG. 19 when the category of business and a current position are input.
Figure 37:
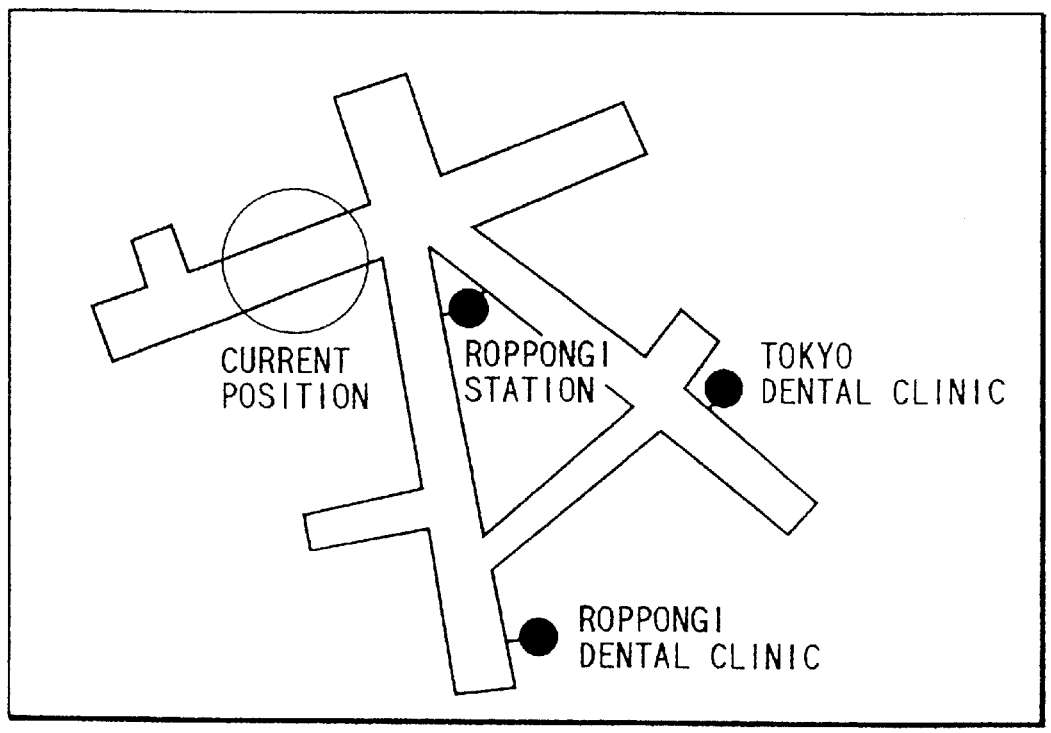
FIG. 37 shows an example of a simplified deformed map with related information displayed on a display plane of a portable information terminal apparatus shown in FIG. 19 when the category of business and a current position are input.

Next, an operation, in which a map of an area surrounding a current position is generated and transmitted to one portable information terminal apparatus 56 with related information attached to the simplified deformed map when the current position input to the portable information terminal apparatus 56 by a user is transmitted to the information providing apparatus 51 as a retrieval request, is described with reference to FIGS. 35, 36 and 37.

In cases where one portable information terminal apparatus 56 has a function for measuring its current position by using a global positioning system or the like, a user can easily obtain the current position. Therefore, when a user desires to obtain a map of an area surrounding a current position in which a position of a dental clinic is indicated as a particular target object and a name of the dental clinic and names of one or more main institutions are drawn as related information, the user obtains a current position indicated by a current longitude and a current latitude, and the user inputs the current position and a particular category of business "dental clinic" to one portable information terminal apparatus 56. Therefore, as shown in FIG. 35, current position receiving information and the particular category of business are displayed on a display plane of the portable information terminal apparatus 56. Thereafter, the system control unit 55 receives a retrieval request including the current position and the particular category of business sent from the portable information terminal apparatus 56 through the communicating unit 54, and the system control unit 55 controls the map-base information retrieving unit 53 and the deformed map automatic generation system 31 according to a procedure shown in FIG. 36.

When the system control unit 55 receives the retrieval request including the current position and the particular category of business, the current position and the particular category of business in the retrieval request are analyzed in the system control unit 55 (step 261), and a row of two retrieval instructions is generated (step 252). A first retrieval instruction indicates the retrieval of road data, which corresponds to a circular area of a predetermined diameter (for example, 1000 m) with center at the current position, from the road table. A second retrieval instruction indicates the retrieval of target object data relating to a target object identified by the particular category of business placed in the circular area of the road data from the target object table.

The row of the retrieval instructions is sent to the map-base information retrieving unit 53, and a retrieval operation is performed (step 263). Thereafter, the system control unit 55 receives a simplified deformed map generated in the deformed map automatic generation system 31 (step 254). In the simplified deformed map, an area surrounding the current position is drawn. Also, a circular symbol indicating the current position, a character string denoting "current position", a name of a dental clinic and names of one or more main institutions are drawn as related information. Thereafter, the simplified deformed map with the related information is transmitted to the portable information terminal apparatus 56 through the communicating unit 54 (step 265). Therefore, as shown in FIG. 37, the simplified deformed map with the related information is displayed on the display plane of the portable information terminal apparatus 56 with the related information.

Figure 38:
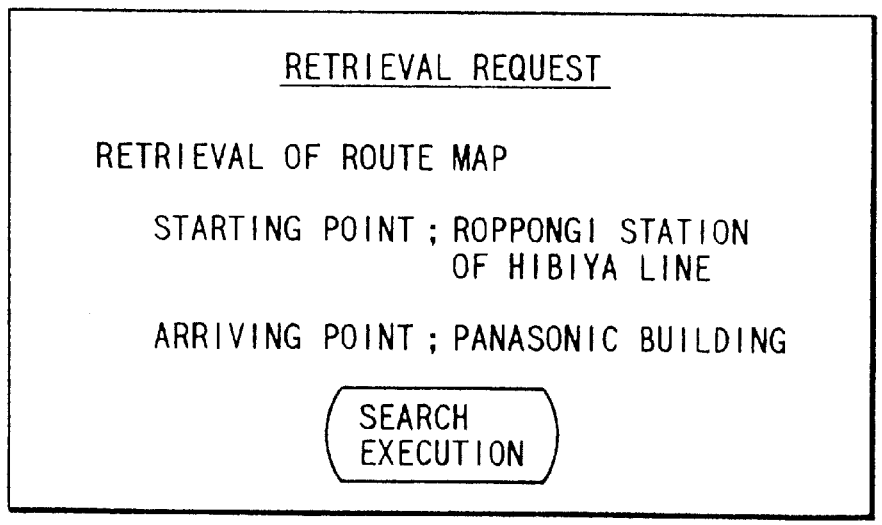
FIG. 38 shows a starting point and an arriving point displayed on a display plane of a portable information terminal apparatus shown in FIG. 19.
Figure 39:
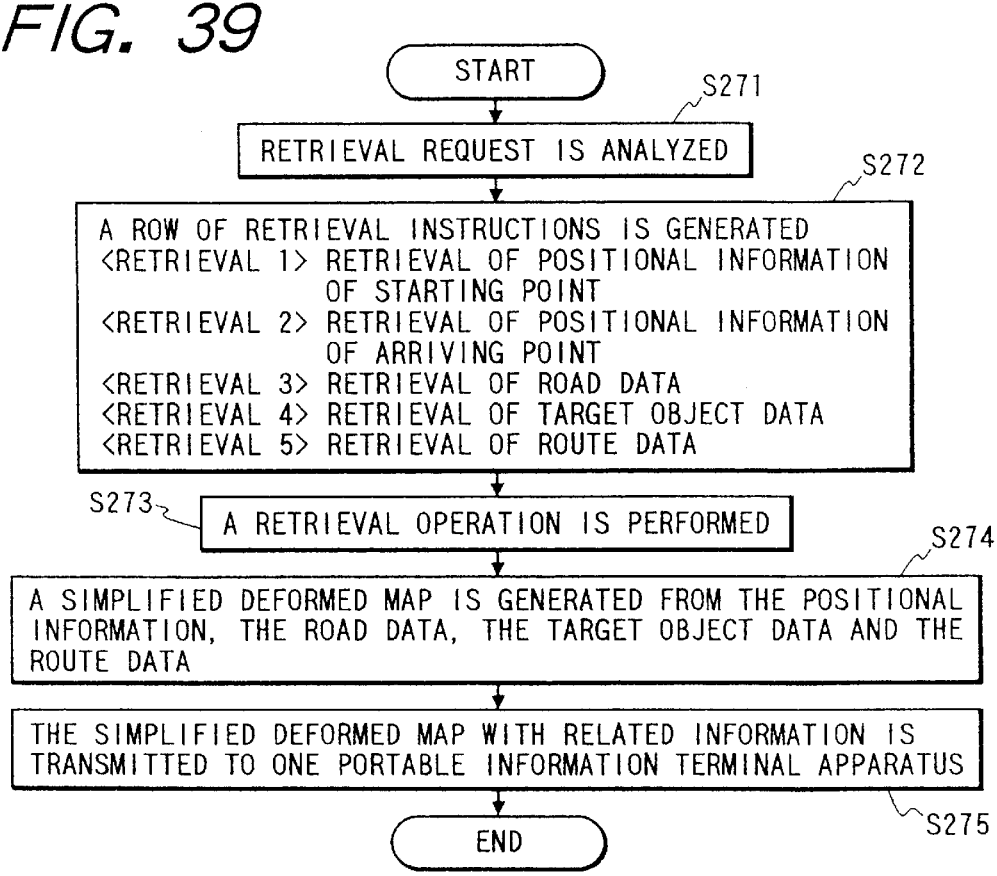
FIG. 39 is a flow chart showing an operation performed in a system control unit shown in FIG. 19 when the starting point and the arriving point are input.
Figure 40:
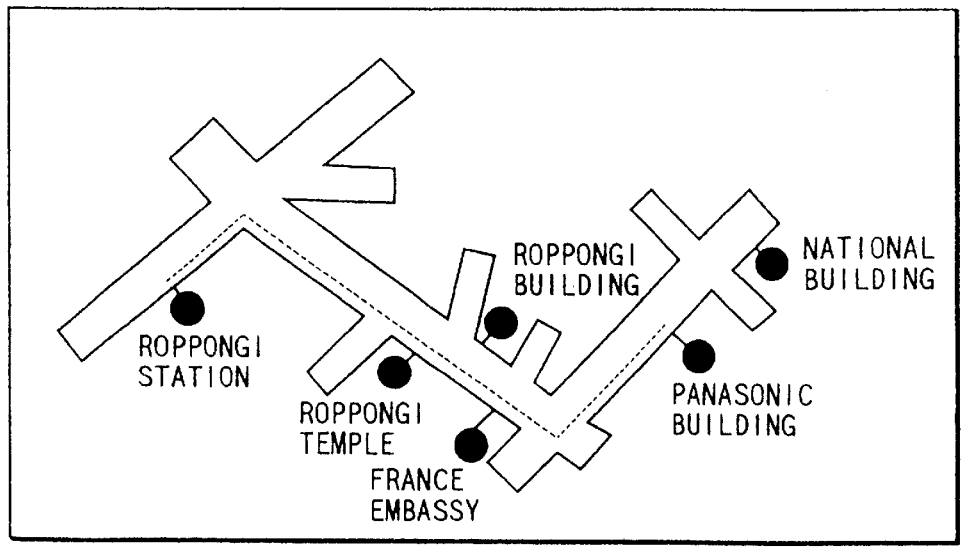
FIG. 40 shows an example of a simplified deformed map with related information displayed on a display plane of a portable information terminal apparatus shown in FIG. 19 when the starting point and the arriving point are input.

Next, an example of an operation, in which a simplified deformed map with related information is generated and transmitted to one portable information terminal apparatus 56 when a name of a starting point and a name of an arriving point to the portable information terminal apparatus 56 by a user are transmitted to the information providing apparatus 51 as a retrieval request, is described with reference to FIGS. 38, 39 and 40.

In cases where a user desires to obtain a map in which a name of a starting point, a name of an arriving point and an optimum route from the starting point to the arriving point are drawn as related information, the user inputs a name "Roppongi Station of Hibiya Line" of the starting point and the name "Panasonic Building" of the arriving point to one portable information terminal apparatus 56. Therefore, as shown in FIG. 38, the name of the starting point and the name of the arriving point are displayed on a display plane of the portable information terminal apparatus 56. Thereafter, the system control unit 55 receives a retrieval request including the name of the starting point and the name of the arriving point sent from the portable information terminal apparatus 56 through the communicating unit 54, and the system control unit 55 controls the map-base information retrieving unit 53 and the deformed map automatic generation system 31 according to a procedure shown in FIG. 39.

When the system control unit 55 receives the retrieval request including the name of the starting point and the name of the arriving point, the name of the starting point and the name of the arriving point in the retrieval request are analyzed in the system control unit 55 (step 271), and a row of five retrieval instructions is generated (step 272). A first retrieval instruction indicates the retrieval of first positional information of the starting point identified by the name "Roppongi Station of Hibiya Line" from the target object table. A second retrieval instruction indicates the retrieval of second positional information of the arriving point identified by the name "Panasonic Building" from the target object table. A third retrieval instruction indicates the retrieval of road data of roads existing in a rectangular area, in which the starting point indicated by the first positional information and the arriving point indicated by the second positional information are positioned, from the road data table. A fourth retrieval instruction indicates the retrieval of target object data of one or more main institutions placed in the rectangular area of the road data from the target object table. A fifth retrieval instruction indicates the retrieval of route data, which indicates an optimum route from the starting point indicated by the first positional information to the arriving point indicated by the second positional information, from the road table.

The row of the retrieval instructions is sent to the map-base information retrieving unit 53, and a retrieval operation is performed (step 273). Thereafter, the system control unit 55 receives a simplified deformed map generated in the deformed map automatic generation system 31 (step 274). In the simplified deformed map, roads in the squared area including the starting point and the arriving point are drawn. Also, the name of the starting point, the name of the arriving point, names of one or more main institutions are drawn as related information. Thereafter, the simplified deformed map with the related information is transmitted to the portable information terminal apparatus 56 through the communicating unit 54 (step 275). Therefore, as shown in FIG. 40, the simplified deformed map with the related information is displayed on the display plane of the portable information terminal apparatus 56 with the related information.

Figures 41, 43:
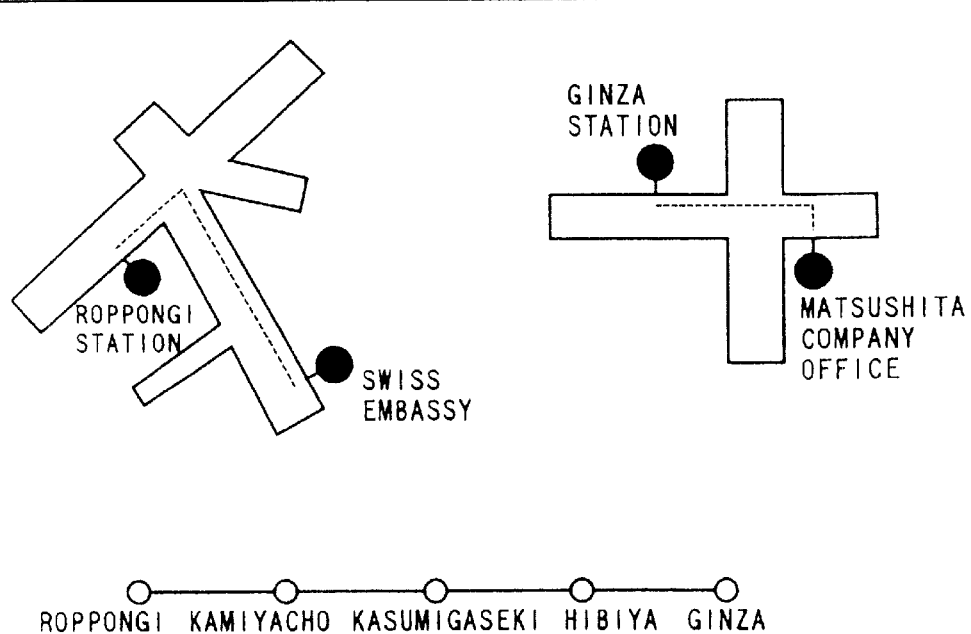
FIG. 41 shows a starting point, an arriving point and means of transport displayed on a display plane of a portable information terminal apparatus shown in FIG. 19.
FIG. 43 shows an example of a simplified deformed map with related information displayed on a display plane of a portable information terminal apparatus shown in FIG. 19 when the starting point, the arriving point and the means of transport are input.

Next, an example of an operation, in which a simplified deformed map with related information is generated and transmitted to one portable information terminal apparatus 56 when a name of a starting point, a name of an arriving point and one or more means of transport including walking input to the portable information terminal apparatus 56 by a user are transmitted to the information providing apparatus 51 as a retrieval request, is described with reference to FIGS. 41, 42 and 43.

In cases where a user desires to obtain a map in which a name of a starting point, a name of an arriving point, an optimum route from the starting point to the arriving point and names of a plurality of passing stations are drawn as related information, the user inputs a name "Swiss Embassy" of the starting point, the name "Matsushita Company Office" of the arriving point and means of transport "walking", "subway train" and "bus" to one portable information terminal apparatus 56. Therefore, as shown in FIG. 41, the name of the starting point, the name of the arriving point and the means of transport "walking", "subway train" and "bus" are displayed on a display plane of the portable information terminal apparatus 56. Thereafter, the system control unit 55 receives a retrieval request including the name of the starting point, the name of the arriving point and the means of transport sent from the portable information terminal apparatus 56 through the communicating unit 54, and the system control unit 55 controls the map-base information retrieving unit 53 and the deformed map automatic generation system 31 according to a procedure shown in FIG. 42.

When the system control unit 55 receives the retrieval request including the name of the starting point, the name of the arriving point and the means of transport, the name of the starting point, the name of the arriving point and the means of transport in the retrieval request are analyzed in the system control unit 55 (step 271), and a row of eleventh retrieval instructions is generated (step 272). A first retrieval instruction indicates the retrieval of first positional information of the starting point from the target object table. A second retrieval instruction indicates the retrieval of second positional information of the arriving point from the target object table. A third retrieval instruction indicates the retrieval of third positional information of a first station nearest to the starting point from the target object table. A fourth retrieval instruction indicates the retrieval of fourth positional information of a second station nearest to the arriving point from the target object table. A fifth retrieval instruction indicates the retrieval of first road data of roads existing in a first rectangular area, in which the starting point indicated by the first positional information and the first nearest station indicated by the third positional information are positioned, from the road data table. A sixth retrieval instruction indicates the retrieval of second road data of roads existing in a second rectangular area, in which the arriving point indicated by the second positional information and the second nearest station indicated by the fourth positional information are positioned, from the road data table. A seventh retrieval instruction indicates the retrieval of target object data of one or more main institutions placed in the first rectangular area of the road data from the target object table. An eighth retrieval instruction indicates the retrieval of target object data of one or more main institutions placed in the second rectangular area of the road data from the target object table. A ninth retrieval instruction indicates the retrieval of first route data, which indicates a subway route from the starting point indicated by the first positional information to the arriving point indicated by the second positional information, from the traffic table. A tenth retrieval instruction indicates the retrieval of second route data, which indicates a first walking route from the starting point indicated by the first positional information to the first nearest station indicated by the third positional information, from the road table. An eleventh retrieval instruction indicates the retrieval of third route data, which indicates a second walking route from the second nearest station indicated by the fourth positional information to the arriving point indicated by the second positional information, from the road table.

The row of the retrieval instructions is sent to the map-base information retrieving unit 53, and a retrieval operation is performed (step 283). Thereafter, the system control unit 55 receives a simplified deformed map generated in the 11deformed map automatic generation system 31 (step 284). In the simplified deformed map, a first road map of the first squared area including the starting point and the first station nearest to the starting point and a second road map of the second squared area including the arriving point and the second station nearest to the arriving point are drawn. Also, the name of the starting point, the name of the arriving point, names of the nearest stations, the first and second walking routes and names of one or more main institutions are drawn as related information. Also, names of passing stations relating to the subway route are drawn in the passing order as related information. Thereafter, the simplified deformed map with the related information is transmitted to the portable information terminal apparatus 56 through the communicating unit 54 (step 275). Therefore, as shown in FIG. 43, the simplified deformed map with the related information is displayed on the display plane of the portable information terminal apparatus 56 with the related information.

Accordingly, because the simplified deformed map is generated in the deformed map automatic generation system 31, a volume of data required for the simplified deformed map can be made small. Therefore, the simplified deformed map can be easily and reliably transmitted to the portable information terminal apparatus 56 even though a data capacity of the portable information terminal apparatus 56 is small. Also, because the deformed map is simplified, the user can easily view the map shown on the display plane of the portable information terminal apparatus 56 even though a size of the display plane is small, and the user can easily realize an interesting target object or a route.

(Fourth Embodiment)

In this embodiment, a retrieval instruction generated in the system control unit 55 in the past is reused, and the particular map-base information and the particular related information retrieved from the map-base information storing unit 52 in the past is reused. Therefore, the generation of deformed map information can be efficiently performed, and the transmission of deformed map information can be efficiently performed.

Figure 44:
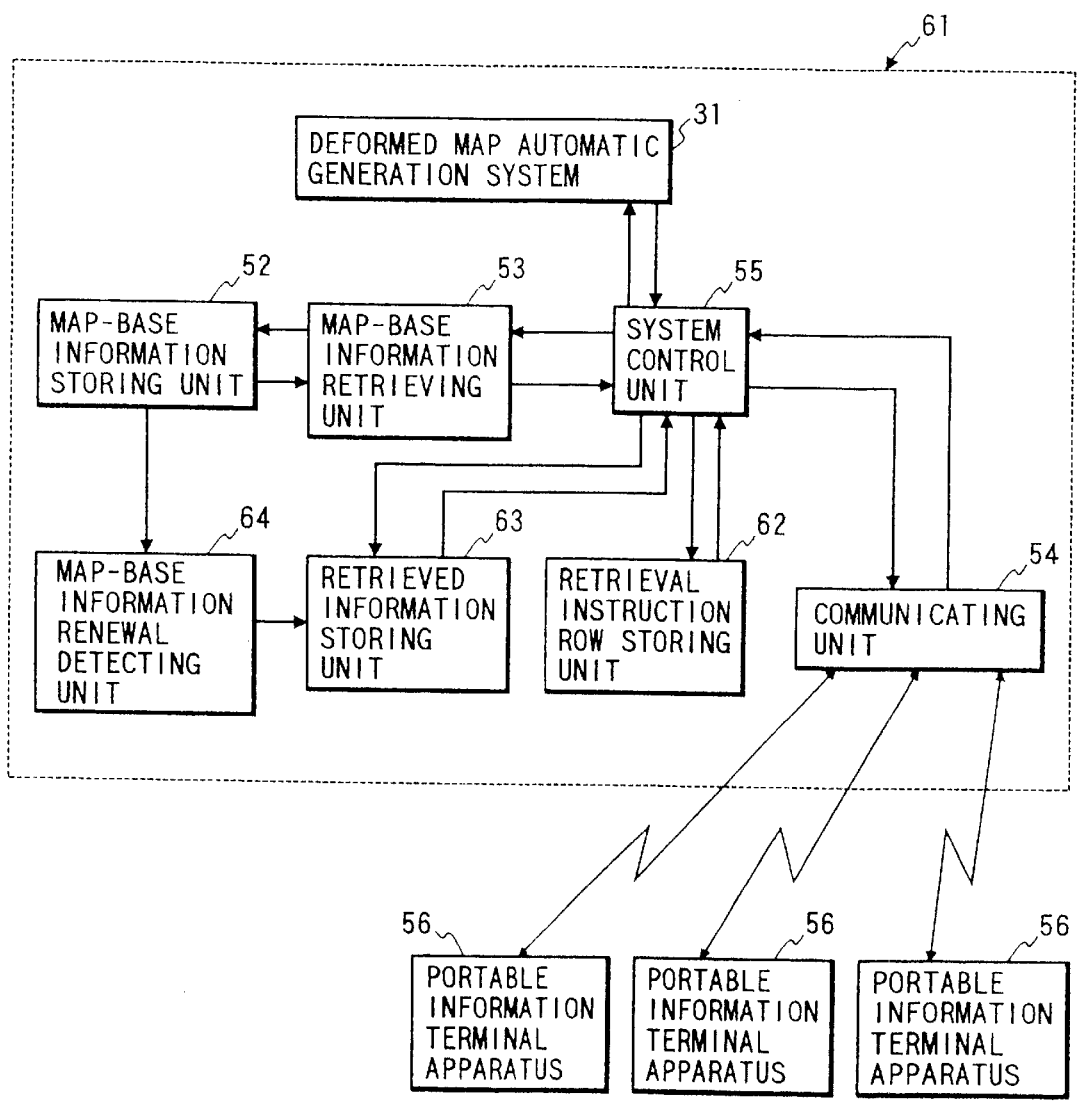
FIG. 44 is a block diagram of a map information providing system communicating with a plurality of portable information terminal apparatuses according to a fourth embodiment of the present invention.

FIG. 44 is a block diagram of a map information providing system communicating with a plurality of portable information terminal apparatuses according to a fourth embodiment of the present invention.

As shown in FIG. 44, a map information providing system 61 comprises the map-base information storing unit 52, the map-base information retrieving unit 53, the deformed map automatic generation system 31, the communicating unit 54, the system control unit 55, a retrieval instruction row storing unit 62 for storing a row of retrieval instructions generated in the system control unit 55 in the past in response to a retrieval request;

a retrieved information storing unit 63 for storing pieces of particular map-base information and pieces of particular related information retrieved from the map-base information storing unit 52 by the map-base information retrieving unit 53; and a map-base information renewal detecting unit 64 for detecting the renewal of a piece of specific map-base information or a piece of specific related information stored in the map-base information storing unit 52 and instructing the retrieved information storing unit 63 to renew a piece of particular map-base information or a piece of particular related information agreeing with the piece of specific map-base information or the piece of specific related information in synchronization with the renewal of the specific map-base information or the piece of specific related information.

Figures 45, 47:
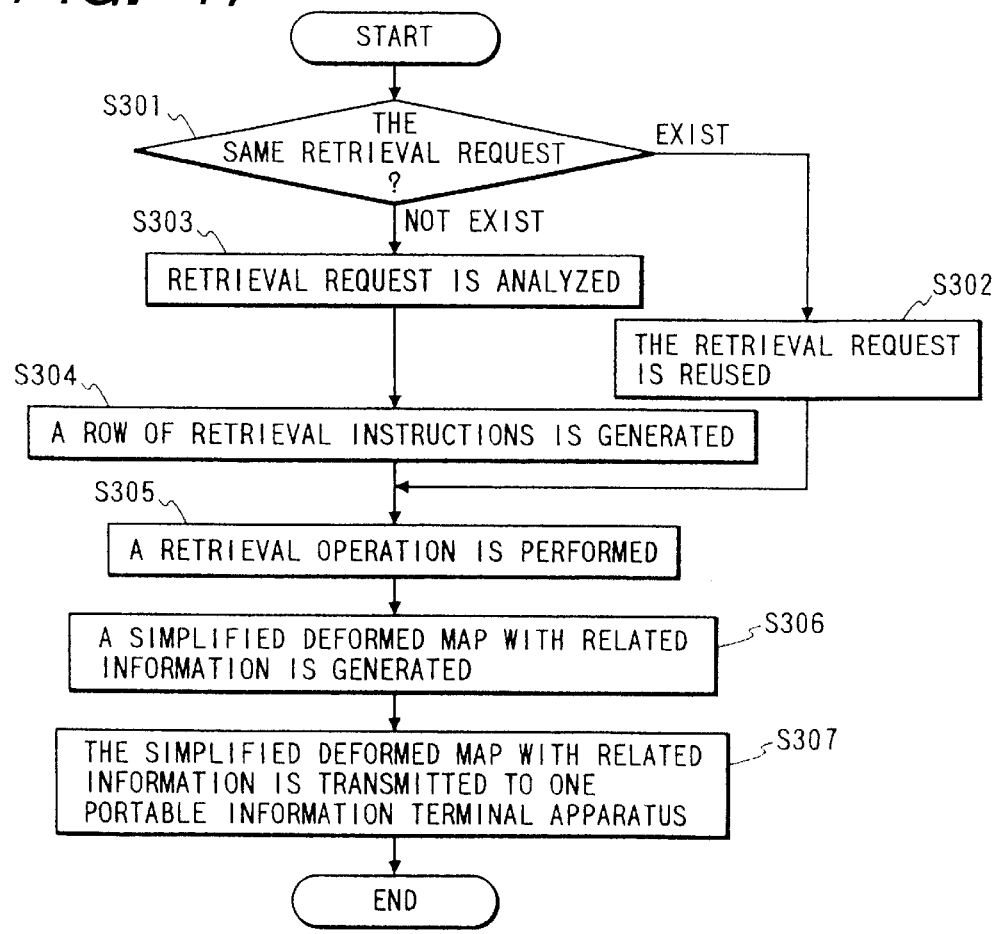
FIG. 45 shows data of a retrieval instruction row table stored in a retrieval instruction row storing unit shown in FIG. 44.
FIG. 47 is a flow chart showing an operation in which a retrieval instruction generated in the past is reused.

As shown in FIG. 45, a retrieval instruction row storing table is set in the retrieval instruction row storing unit 62, and the retrieval instruction row storing table is composed of a retrieval request field, in which a plurality of retrieval requests respectively transmitted from one portable information terminal apparatus 56 are written, and a retrieval instruction row field in which a row of retrieval instructions generated by the system control unit 55 from one retrieval request is written for each retrieval request.

As shown in FIG. 46, in the deformed map information storing unit 63, the pieces of particular map-base information and the pieces of particular related information retrieved from the map-base information storing unit 52 are classified into road data written in a road table, target object data written in a target object table and a traffic data written in a traffic table for each simplified deformed map. Also, the relationship between one retrieval request and a group of the road, target object and traffic tables for one simplified deformed map is written in a retrieval request managing table of the deformed map information storing unit 63 for each retrieval request.

In the above configuration of the map information providing system 61, an operation in which a retrieval instruction generated in the system control unit 55 in the past is reused in the system control unit 55 is described with reference to FIG. 47.

When a particular retrieval request is transmitted from one portable terminal apparatus 56 to the map information providing system 61, it is judged by the system control unit 55 whether or not the same retrieval request as the particular retrieval request is stored in the retrieval instruction row storing unit 62 (step 301). In cases where the same retrieval request as the particular retrieval request is stored, the retrieval instruction stored in the retrieval instruction row storing unit 62 is reused (step 302). In contrast, in cases where the same retrieval request as the particular retrieval request is not stored, the particular retrieval request is analyzed (step 303), and a row of retrieval instructions is generated (step 304). Thereafter, the row of retrieval instructions is sent to the map-base information retrieving unit 53, and a retrieval operation is performed to retrieve particular map-base information from the map-base information storing unit 52 (step 305). Thereafter, particular road data and particular target object data included in the particular map-base information are sent from the system control unit 55 to the deformed map automatic generation system 31, a simplified deformed map with related information is generated in the system 31, and the simplified deformed map with related information is received (step 306). Thereafter, the simplified deformed map with related information is transmitted to the portable information terminal apparatus 56 through the communicating unit 54 (step 307).

Figure 48:
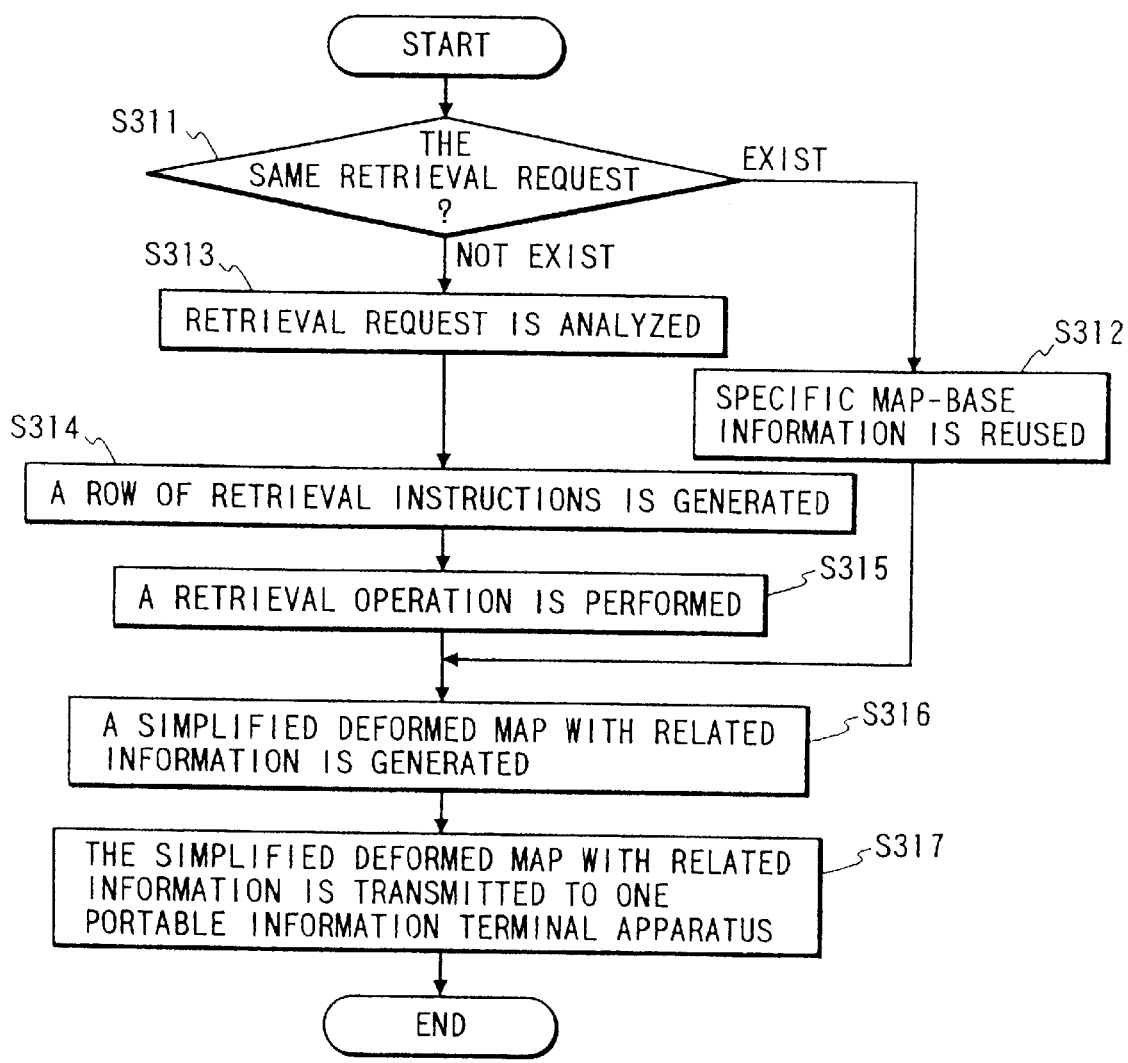
FIG. 48 is a flow chart showing an operation in which deformed map information generated in the past is reused.

Next, an operation in which the particular map-base information and the particular related information retrieved from the map-base information storing unit 52 in the past and stored in the retrieved information storing unit 63 is reused by the system control unit 55 is described with reference to FIG. 48.

When a particular retrieval request is transmitted from one portable terminal apparatus 56 to the map information providing system 61, it is judged by the system control unit 55 whether or not the same retrieval request as the particular retrieval request is listed in the retrieval request managing table of the deformed map information storing unit 63 (step 311). In cases where the same retrieval request as the particular retrieval request is listed, a piece of specific map-base information and a piece of specific related information corresponding to the particular retrieval request are specified by referring to the retrieval request managing table and are reused to generate a simplified deformed map with related information in the system 31 (step 312). In contrast, in cases where the same retrieval request as the particular retrieval request is not listed, the particular retrieval request is analyzed (step 313), and a row of retrieval instructions is generated (step 314). Thereafter, the row of retrieval instructions is sent to the map-base information retrieving unit 53, and a retrieval operation is performed to retrieve a piece of specific map-base information and a piece of specific related information from the map-base information storing unit 52 (step 315). Thereafter, particular road data and particular target object data included in the piece of specific map-base information and the piece of unit 55 to the deformed map automatic generation system 31, a simplified deformed map with related information is generated in the system 31, and the simplified deformed map with related information is received (step 316). Thereafter, the simplified deformed map with related information is transmitted to the portable information terminal apparatus 56 through the communicating unit 54 (step 317).

Also, in cases where it takes a lot of time to perform a retrieval operation corresponding to the particular retrieval request, a radio communication between the portable information terminal apparatus 56 and the map information providing system 61 is temporarily disconnected by the system control unit 55. When the retrieval operation is completed, the radio communication is again connected, and the deformed map information indicating the simplified deformed map is transmitted to the portable information terminal apparatus 56.

Figure 49:
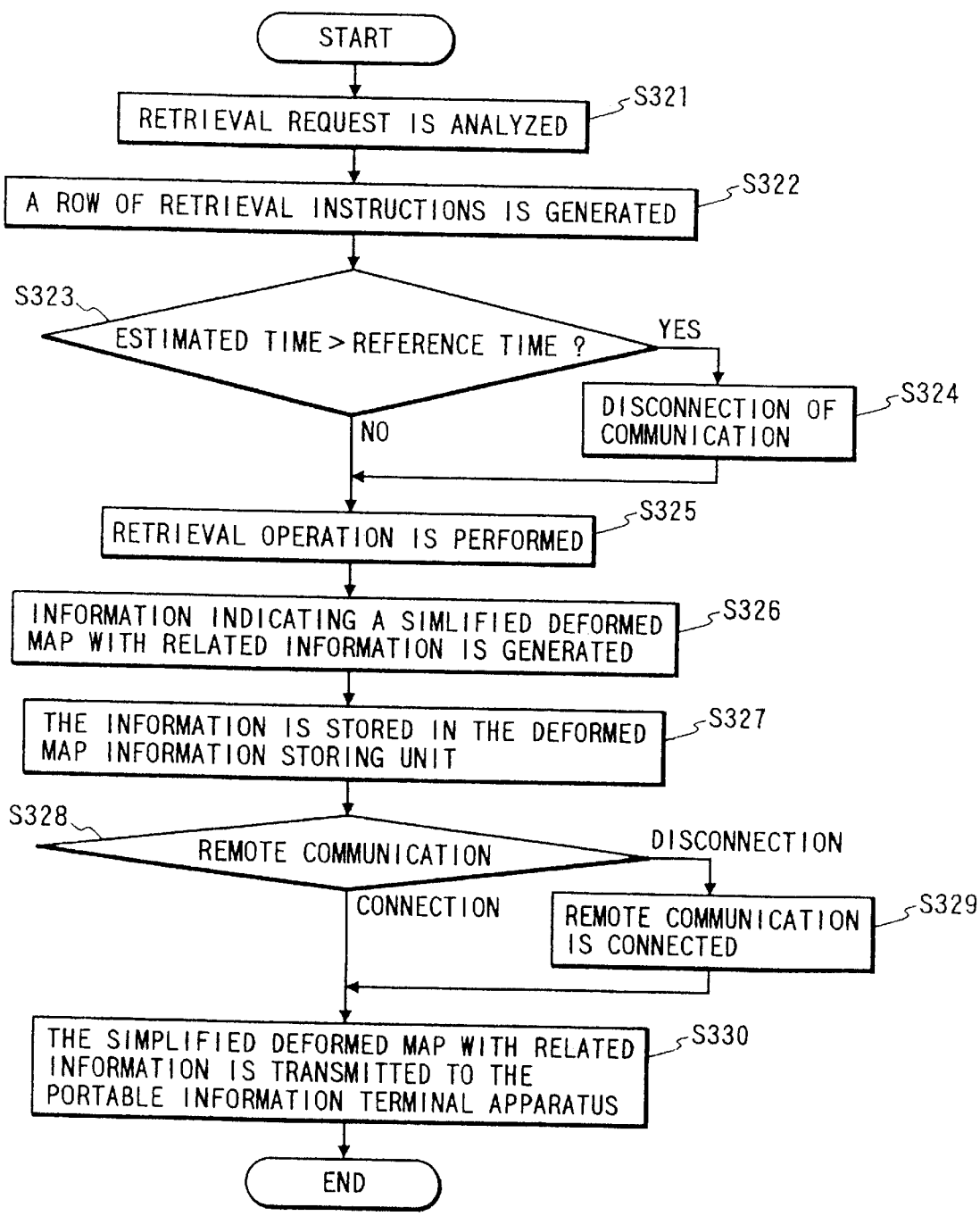
FIG. 49 is a flow chart showing an operation performed in a map information providing system shown in FIG. 44 in cases where it takes a lot of time to perform a retrieval operation.

FIG. 49 is a flow chart showing an operation performed in the map information providing system 61 in cases where it takes a lot of time to perform a retrieval operation.

As shown in FIG. 49, when a particular retrieval request is transmitted from one portable terminal apparatus 56 to the map information providing system 61, the particular retrieval request is analyzed in the system control unit 55 (step 321), a row of retrieval instructions is generated (step 322), the row of retrieval instructions and the particular retrieval request are stored in the retrieval instruction row storing unit 62, and a time required to generate a simplified deformed map with related information according to the row of retrieval instructions is estimated in the system control unit 55. Thereafter, it is judged by the system control unit 55 whether or not the estimated time is longer than a reference time (step 323). In cases where the estimated time is longer than the reference time, the system control unit 55 instructs to the communicating unit 54 to disconnect a remote communication between the portable information terminal apparatus 56 and the map information providing system 61 (step 324). Therefore, the remote communication is disconnected. Thereafter, the row of retrieval instructions is sent to the map-base information retrieving unit 53, and a retrieval operation is performed (step 325). In contrast, in cases where the estimated time is not longer than the reference time, the step 325 is performed without disconnecting the radio communication. Thereafter, particular map-base information retrieved from the map-base information storing unit 52 is sent to the deformed map automatic generation system 31, and deformed map information indicating a simplified deformed map and related information attached to the simplified deformed map are sent from the system 31 to the system control unit 55 (step 326). Thereafter, the deformed map information and the related information are stored in the deformed map information storing unit 63 (step 327). Thereafter, it is judged by the system control unit 55 whether or not the remote communication between the portable information terminal apparatus 56 and the map information providing system 61 is disconnected (step 328). In cases where the remote communication is disconnected, the system control unit 55 instructs the communicating unit 54 to connect the remote communication, and the remote communication between the portable information terminal apparatus 56 and the map information providing system 61 is connected (step 329). Thereafter, the simplified deformed map with the related information is transmitted to the portable information terminal apparatus 56 (step 330). In contrast, in cases where the remote communication is connected, the step 330 is performed.

Figure 50:
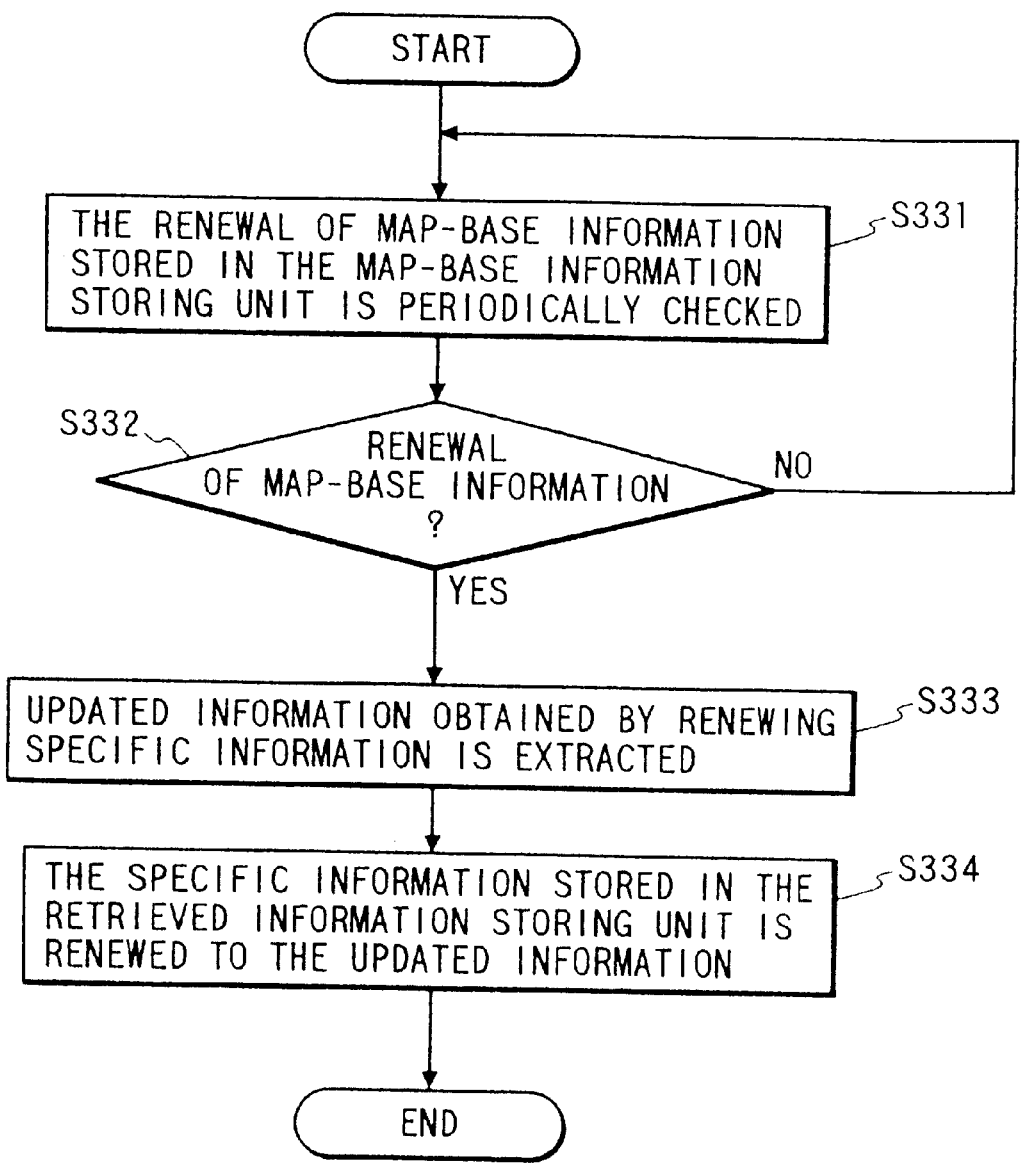
FIG. 50 is a flow chart showing an operation performed in an information renewal detecting unit shown in FIG. 44.

FIG. 50 is a flow chart showing an operation performed in the map-base information renewal detecting unit 64.

As shown in FIG. 50, the map-base information renewal detecting unit 64 periodically checks whether or not the renewal of a piece of map-base information or a piece of related information stored in the map-base information storing unit 52 is performed (step 331), and it is judged whether or not a piece of map-base information or a piece of related information is renewed (step 332). In cases where a piece of specific information stored in the map-base information storing unit 52 is renewed to a piece of updated information and the renewal of the specific information is detected, the piece of updated information is extracted (step 333). Thereafter, the piece of specific information stored in the retrieved information storing unit 63 is renewed to the piece of updated information under the control of the map-base information renewal detecting unit 64 in synchronization with the renewal of the specific information performed in the map-base information storing unit 52 (step 334).

Accordingly, in the map information providing system 61, a time required to generate and provide the simplified deformed map with the related information for the portable information terminal apparatus 56 can be shortened. Therefore, the provision of the simplified deformed map with the related information can be efficiently performed.

(Fifth Embodiment)

A deformed map automatic generation system according to a fifth embodiment is described.

Figure 51:
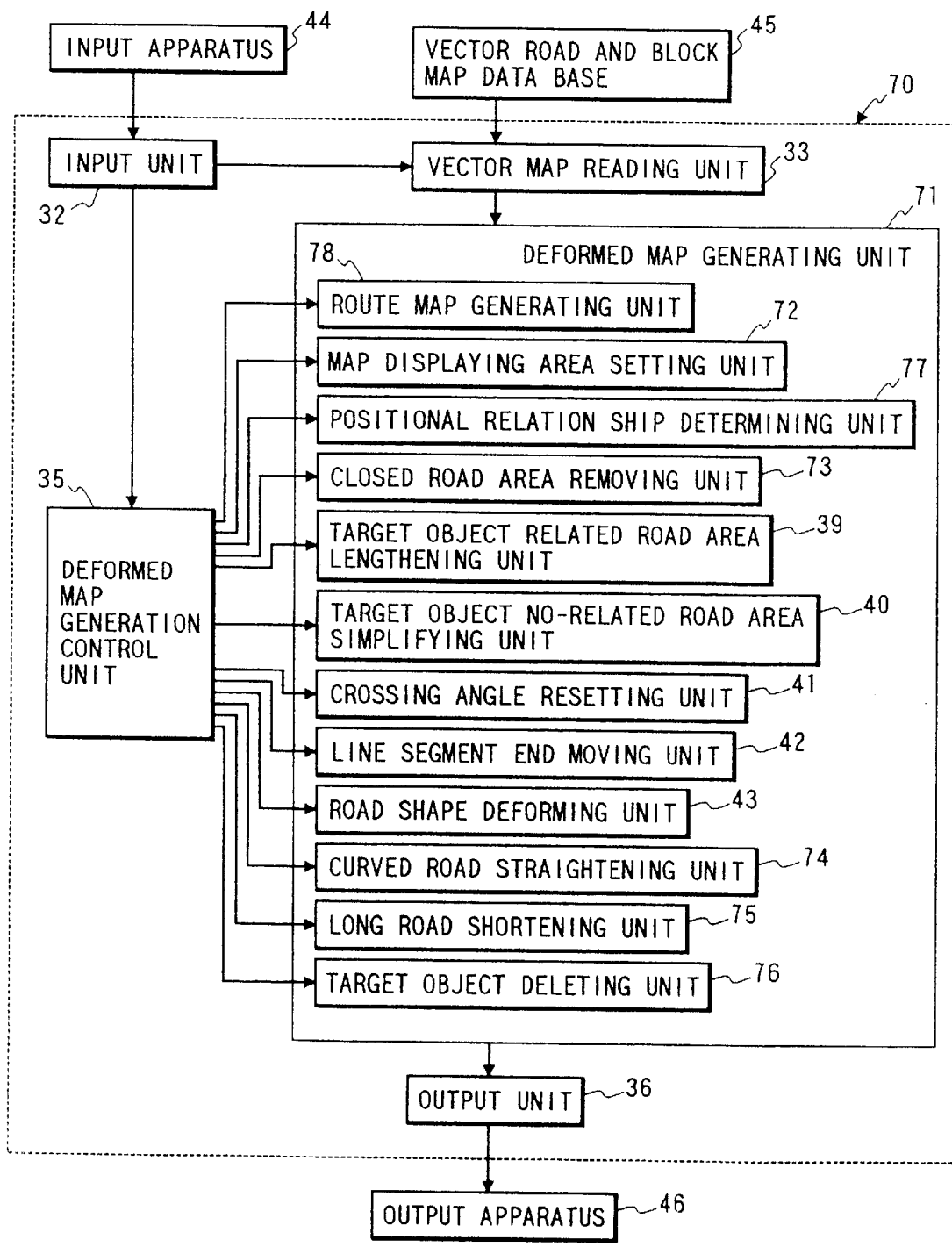
FIG. 51 is a block diagram of a deformed map automatic generation system according to a fifth embodiment of the present invention.

FIG. 51 is a block diagram of a deformed map automatic generation system according to a fifth embodiment of the present invention.

As shown in FIG. 51, a deformed map automatic generation system 70 comprises the input unit 32 for receiving deformed map generating information such as a specified type of a deformed map desired by a user, an image drawing region, route information, a positional relationship determining method, road shape deforming information, mesh information, deforming angle information, a specified point and a reduced scale for the deformed map from an input apparatus 22 such as a keyboard; the vector map reading unit 33;

a deformed map generating unit 71 for generating a deformed map from the particular vector road map which is indicated by the particular map information read out by the vector map reading unit 33;

the deformed map generation control unit 35 for controlling the deformed map generating unit 71 to generate the deformed map according to the road shape deforming information received by the input unit 32; and the output unit 16.

The deformed map generating unit 71 comprises a route map generating unit 78 for extracting a route area around a route, which is indicated by the route information received by the input unit 32, from the image drawing region of the particular vector road map and generating a route map corresponding to the route area as the deformed map, a map displaying area setting unit 72 for counting the number of target objects placed around the specified point received by the input unit 32 in the particular vector road map, cutting out an area around the specific point on condition that the number of target objects is a prescribed value, automatically setting the cut-out area as a displaying area and generating a deformed map corresponding to the displaying area, a positional relationship determining unit 77 for determining a positional relationship between a target object indicated by one piece of particular target object information and a road area indicated by one piece of particular road information in the deformed map generated in the route map generating unit 78 or the map displaying area setting unit 72 for each target object according to the positional relationship determining method received by the input unit 32 to generate a positional relationship fixing map from the deformed map;

a closed road area removing unit 73 for selecting a closed road area having a size smaller than a predetermined size from among the road areas of the positional relationship fixing map generated by the positional relationship determining unit 77 and removing the closed road area from the positional relationship fixing map, the target object related road area lengthening unit 39, the target object no-related road area simplifying unit 40, the crossing angle resetting unit 41, the line segment end moving unit 42, the road shape deforming unit 43, a curved road straightening unit 74 for selecting a particular road area indicating a road curved at an angle smaller than a predetermined angle from among the road areas of a deformed map generated in one of the units 73, 39, 40, 41, 42 and 43 and straightening the particular road area to change the curved road to a straightened road, a long road shortening unit 75 for selecting a particular road area indicating a straight road longer than a prescribed length from among the road areas of a deformed map generated in one of the units 73, 39, 40, 41, 42, 43 and 74 and deforming the particular road area to shorten the straight road, and a target object deleting unit 76 for deleting one or more target objects to prevent the overlapping of a plurality of target objects when the deformed map is scaled down.

In the above configuration, when pieces of deformed map generating information such as a specified type of a deformed map desired by a user, an image drawing region, route information, a positional relationship determining method, road shape deforming information, mesh information, deforming angle information, a specified point and a reduced scale for the deformed map are received in the input unit 32, particular map information indicating a particular vector road map for the image drawing region is read out by the vector map reading unit 33, and the deformed map generating unit 71 is operated under the control of the deformed map generation control unit 35 in the same manner as in the second embodiment.

Figure 52:
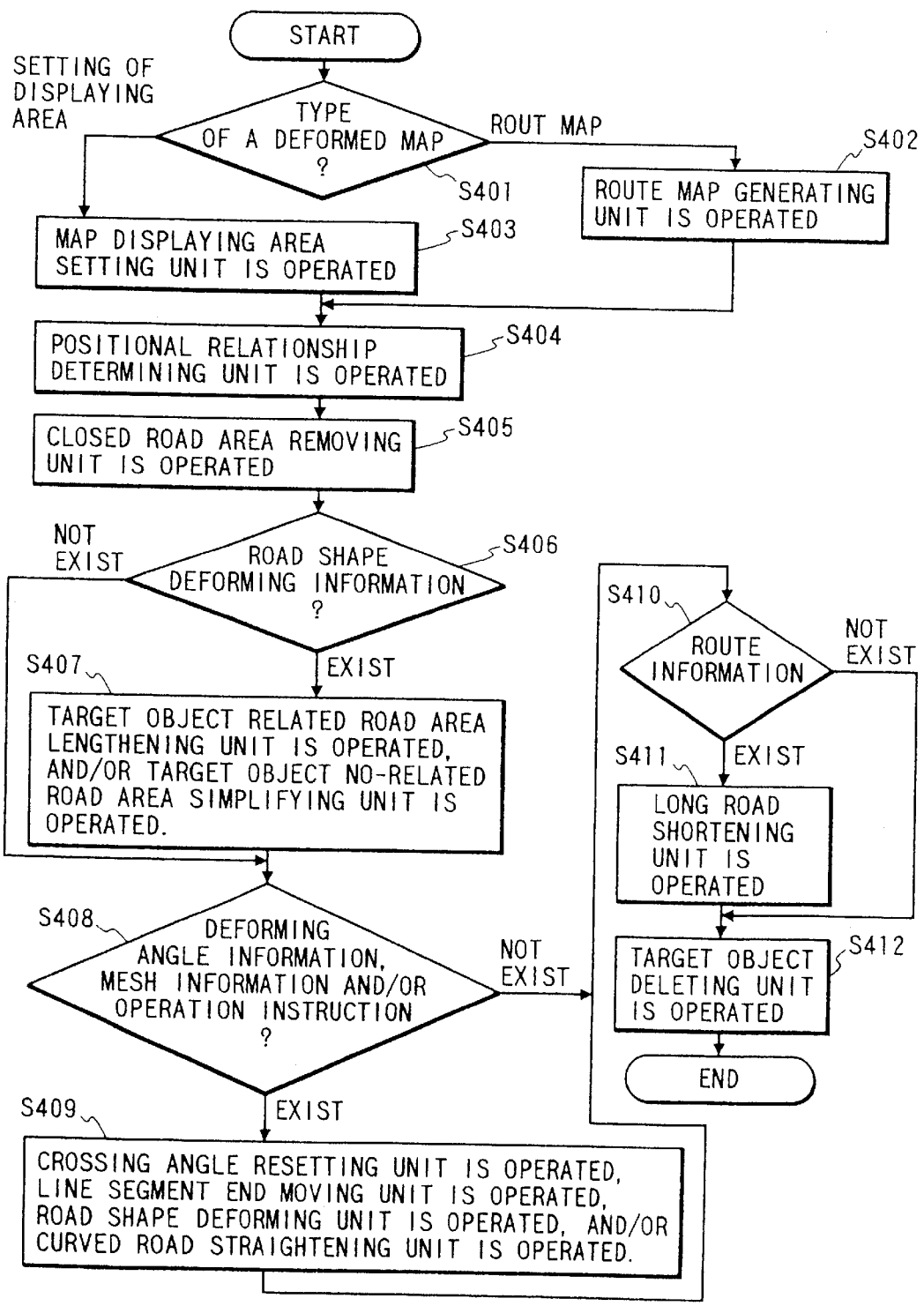
FIG. 52 is a flow chart showing a broad operation performed in a deformed map generating unit shown in FIG. 51.

FIG. 52 is a flow chart showing a broad operation performed in the deformed map generating unit 71 under the control of the deformed map generation control unit 35.

As shown in FIG. 52, a specified type of a deformed map desired by a user is extracted from the deformed map generating information, and it is judged by the deformed map generation control unit 35 whether the specified type of the deformed map indicates the setting of a displaying area or the generation of a route map (step 401). In cases where the specified type of the deformed map indicates the generation of a route map, the route map generating unit 78 is operated in the same manner as in the route map generating unit 38 of the second embodiment, and a route map corresponding to an area along a route indicated by the route information is generated (step 402).

Figure 53A:
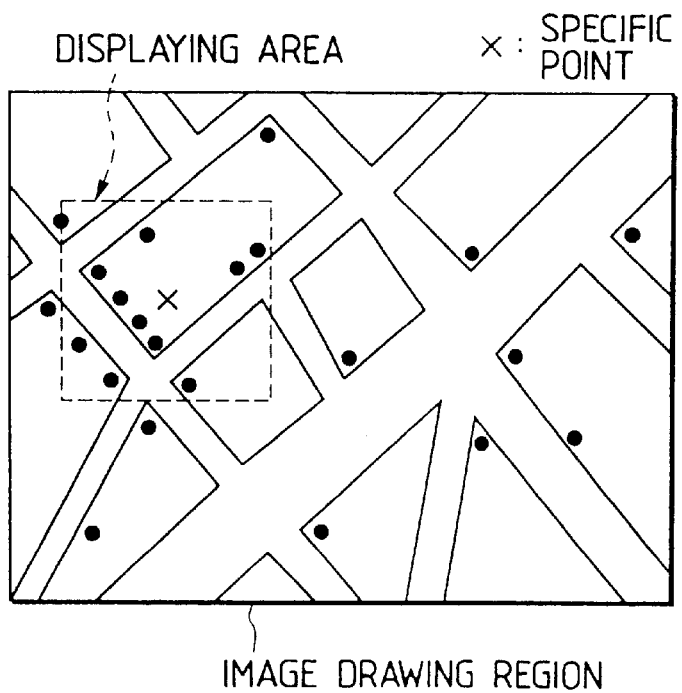
FIG. 53(a) shows a small displaying area cut out from an image drawing region by a map displaying area setting unit shown in FIG. 51.
Figure 53B:
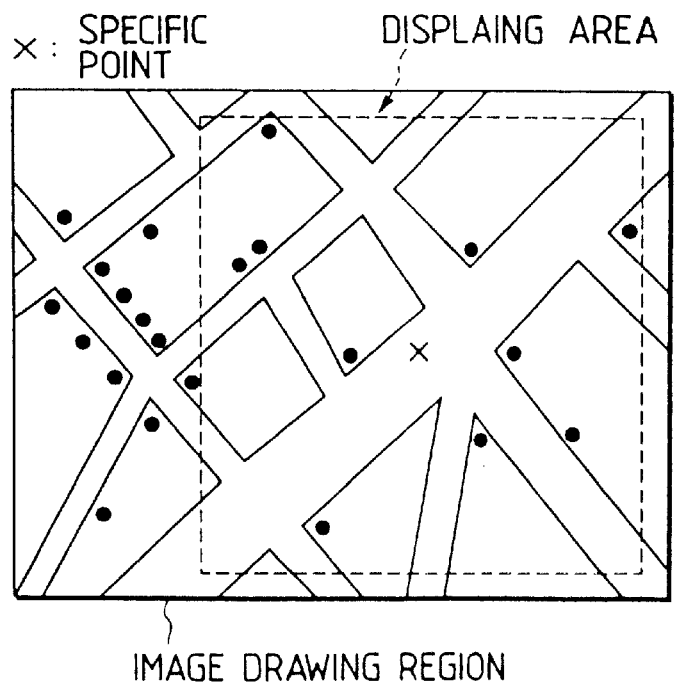
FIG. 53(b) shows a large displaying area cut out from an image drawing region by a map displaying area setting unit shown in FIG. 51.

In contrast, in cases where the specified type of the deformed map indicates the setting of a displaying area, the map displaying area setting unit 72 is operated. Therefore, the number of target objects placed around the specified point received by the input unit 32 in the particular vector road map is counted, an area around the specific point is cut out from the image drawing region on condition that the number of target objects is a prescribed value, the cut-out area is automatically set as a displaying area, and a deformed map corresponding to the displaying area is generated (step 403). For example, as shown in FIG. 53(*a*), because many target objects are densely arranged around the specified point, a small displaying area is cut out from the image drawing region. Also, as shown in FIG. 53(*b*), because a plurality of target objects are sparsely scattered around the specified point, a large displaying area is cut out from the image drawing region.

Figure 54:
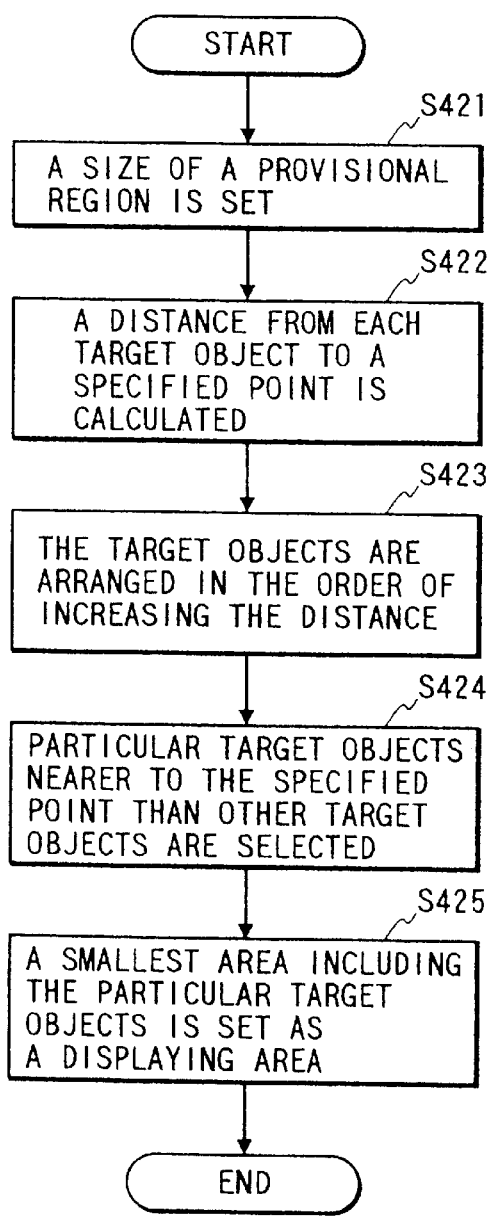
FIG. 54 is a flow chart showing an operation performed in a map displaying area setting unit shown in FIG. 51.

FIG. 54 is a flow chart showing an operation performed in the map displaying area setting unit 72.

As shown in FIG. 54, a size of a provisional region is set by inputting the size to the input unit 32 (step 421). The provisional region is treated as the image drawing region. Thereafter, a distance from one target object to the specified point is calculated for each target object existing in the provisional region (step 422). Thereafter, the target objects are arranged in the order of increasing the distance and are numbered in the arranged order (step 423). Thereafter, a predetermined number of particular target objects numbered by lower numbers are selected from the target objects (step 424). Therefore, the particular target objects arranged nearer to the specified point than other target objects are selected. Thereafter, a smallest area in which the particular target objects are arranged is set as a displaying area cut out from the provisional region (or the image drawing region) (step 425).

Returning to FIG. 52, after the step 402 or the step 403 is performed, the positional relationship determining unit 77 is operated in the same manner as the positional relationship determining unit 37 of the second embodiment (step 404). Thereafter, the closed road area removing unit 73 is operated, and a closed road area surrounded by one line segment row is removed from the deformed map in cases where a size of the closed road area is smaller than a predetermined size (step 405).

Figure 55:
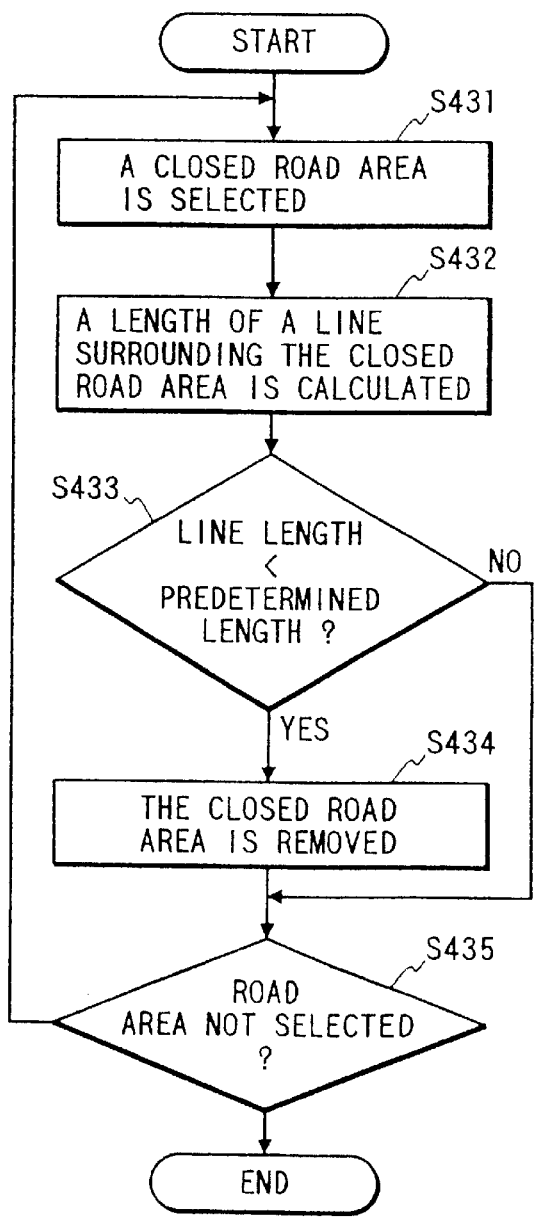
FIG. 55 is a flow chart showing an operation performed in a closed road region removing unit shown in FIG. 51.
Figure 56:
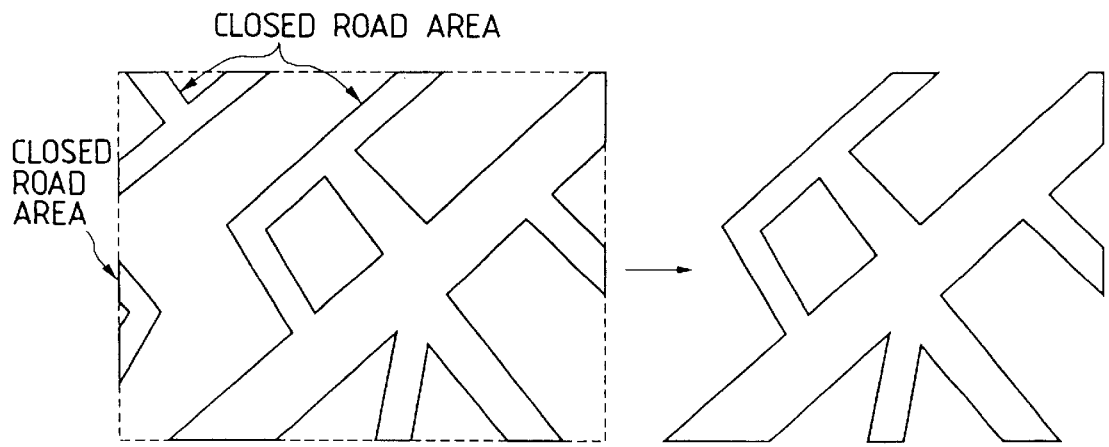
FIG. 56 shows an example of a deformed map and a processed deformed map in which a road region is removed.

FIG. 55 is a flow chart showing an operation performed in the closed road area removing unit 73, and FIG. 56 shows an example of the deformed map and a processed deformed map in which a road area is removed.

As shown in FIGS. 55 and 56, a road area surrounded by one line segment row (or a road area drawn with a single stroke of the brush) is selected as a closed road area from a group of road areas (step 431). Thereafter, a length of the line segment row surrounding the closed road area is calculated (step 432). Thereafter, it is judged whether or not the length of the line segment row surrounding the closed road area is shorter than a predetermined length (step 433). In cases where the length of the line segment row is shorter than a predetermined length, it is assumed that a size of the closed road area is smaller than a predetermined size, and the closed road area is removed from the deformed map (step 434). Thereafter, it is judged whether or not another closed road area not selected in the step 431 exists in the deformed map (step 435). In cases where another closed road area not selected in the step 431 exists, the steps 431 to 434 are repeated. In contrast, in cases where another closed road area not selected in the step 431 does not exist, the operation of the closed road area removing unit 73 is finished.

Returning to FIG. 52, after the step 405 is performed, it is judged by the deformed map generation control unit 35 whether the road shape deforming information relating to the target object related road area lengthening unit 39 or the target object no-related road area simplifying unit 40 exists in the deformed map generating information (step 406). In cases where any information does not exist, either the target object related road area lengthening unit 39 or the target object no-related road area simplifying unit 40 is not operated, and a procedure proceeds to a step 408. In contrast, in cases where information relating to the target object related road area lengthening unit 39 or the target object no-related road area simplifying unit 40 exists, the target object related road area lengthening unit 39 or the target object no-related road area simplifying unit 40 is operated in the same manner as in the second embodiment (step 407).

Thereafter, it is judged by the deformed map generation control unit 35 whether the deforming angle information for the crossing angle resetting unit 41, the mesh information for the line segment end moving unit 42, the mesh information for the road shape deforming unit 43 or an operation instruction for the curved road straightening unit 74 exists in the deformed map generating information (step 408). In cases where any information or instruction does not exist, the procedure proceeds to a step 410. In contrast, in cases where the deforming angle information, the mesh information or the operation instruction exists, the crossing angle resetting unit 41, the line segment end moving unit 42, the road shape deforming unit 43 or the curved road straightening unit 74 is operated (step 409). The operation of the crossing angle resetting unit 41, the line segment end moving unit 42 or the road shape deforming unit 43 is performed in the same manner as in the second embodiment. When the curved road straightening unit 74 is operated, an area of a road curved at an angle smaller than a predetermined angle is straightened.

Figure 58:
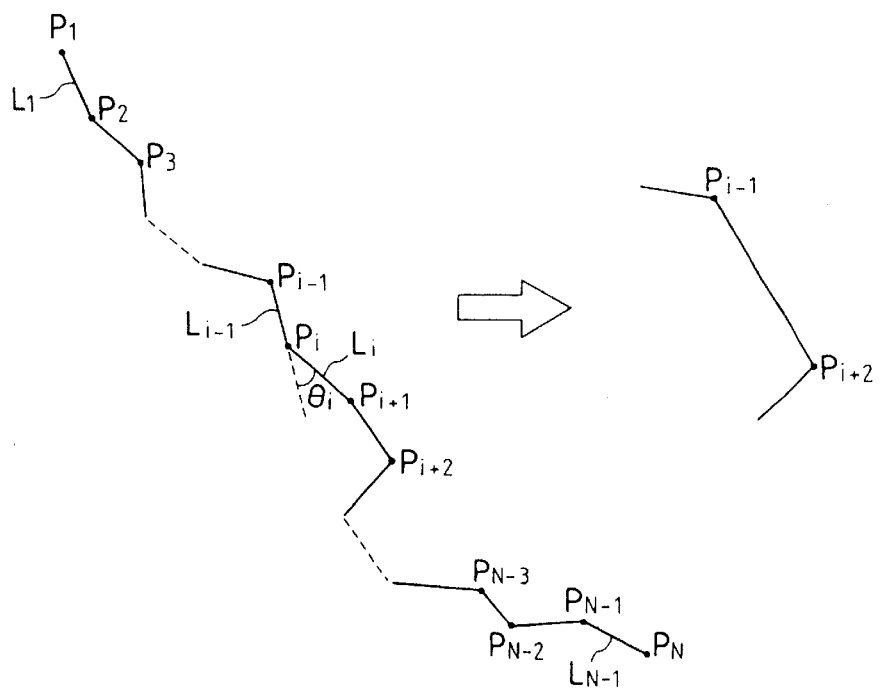
FIG. 58 shows how to strengthen an area of a curved road in the curved road straightening unit.
Figure 57:
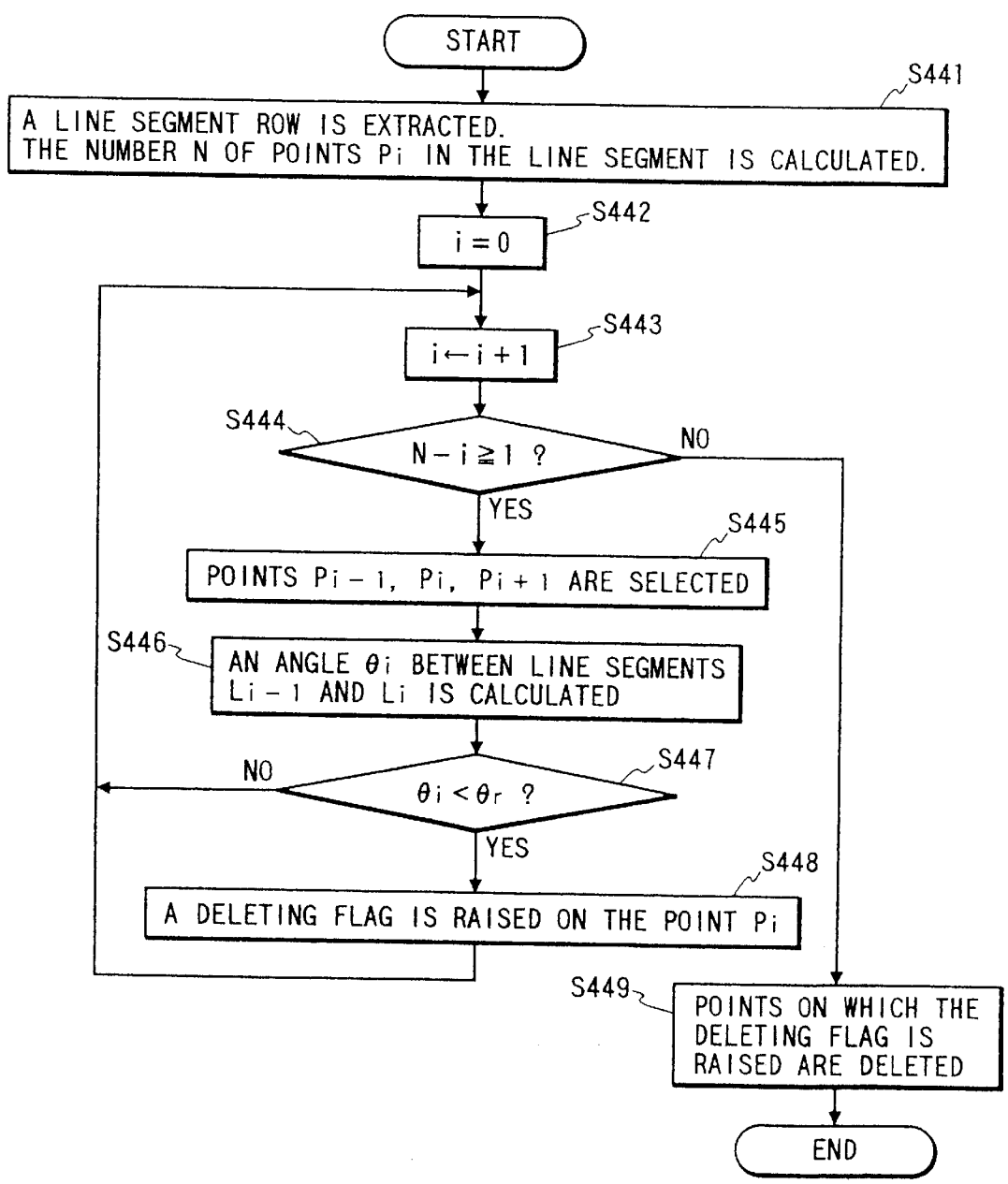
FIG. 57 is a flow chart showing an operation performed in a curved road straightening unit shown in FIG. 51.

FIG. 57 is a flow chart showing an operation performed in the curved road straightening unit 74, and FIG. 58 shows how to strengthen an area of a curved road.

As shown in FIGS. 57 and 58, a line segment row composed of (N−1) line segments Li (i=1,2, - - - ,N, N≧3) is extracted from the deformed map, and the number N of points Pi placed at ends of the line segments in the line segment row is calculated (step 441). Each pair of line segments adjacent to each other in the line segment row are connected with each other at one point, a top point P1 of a top line segment L1 is not connected with any line segment, and an end point $P_N$ of a final line segment $L_{N-1}$ is not connected with any line segment. Thereafter, a counting value i of a counter is initially set to 0 (step 442), the counting value i is incremented (i←i+1) (step 443), and it is judged whether or not a value N−i is equal to or higher than 1 (step 444). In cases where N−i≧1 is satisfied, because three points Pi−1, Pi and Pi+1 exist, the points Pi−1, Pi and Pi+1 are selected (step 445). Thereafter, an angle θi between the line segments Li−1 and Li corresponding to the selected points Pi−1, Pi and Pi+1 is calculated (step 446). Thereafter, it is judged whether or not the angle θi is smaller than a reference angle θr (step 447). In cases where the angle θi is smaller than the reference angle θr, it is planned that the point Pi is deleted and the line segments Li−1 and Li are replaced with a straight line segment. Therefore, a deleting flag is raised on the point Pi (step 448). In contrast, in cases where the angle θi is not smaller than the reference angle θr, any flag is not raised on the point Pi to leave a corner between the line segments Li−1 and Li, and the procedure returns to the step 443. Therefore, in cases where it is judged in the step 444 that N−i≧1 is not satisfied, the judgement for the angles θ1 to $θ_{N-1}$ is finished. Therefore, one or more points on which the deleting flag is raised are deleted (step 449), and a plurality of remaining points not deleted are connected with one or more straight line segments to draw a net line segment row.

Returning to FIG. 52, after the step 409 is performed, it is judged whether or not the route information is included in the deformed map generating information (step 410). In cases where the route information is included, because a route map in which a route indicated by the route information is drawn is generated in the step 402, it is advantageous that a part of the route passing a long straight road is shortened to easily realize the route. Therefore, the long road shortening unit 75 is operated, and an area of a road longer than a predetermined length is shortened (step 411).

Figure 59:
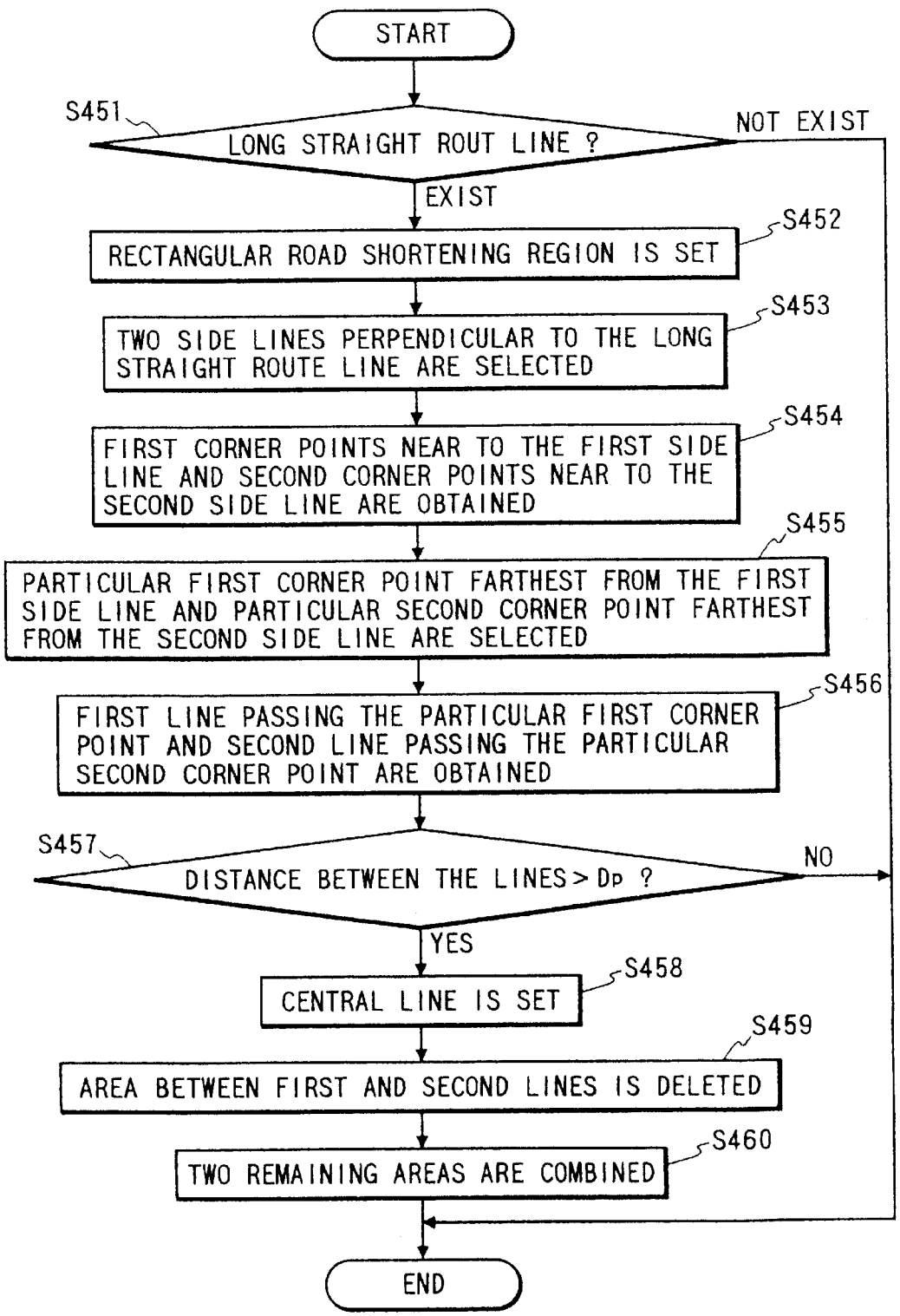
FIG. 59 is a flow chart showing an operation performed in a long road shortening unit shown in FIG. 51.

FIG. 59 is a flow chart showing an operation performed in the long road shortening unit 75, and FIGS. 60(a), 60(b), 60(c) and 60(d) show how to shorten an area of a road longer than a predetermined length.

Figure 60A:
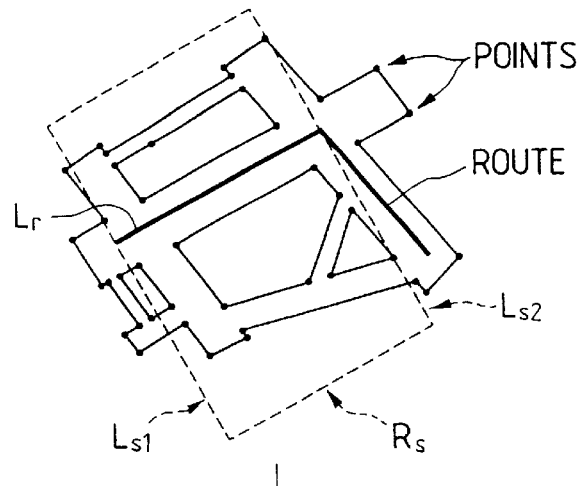
FIGS. 60(a), 60(b), 60(c) and 60(d) show how to shorten an area of a road longer than a predetermined length in the long road shortening unit.
Figure 60B:
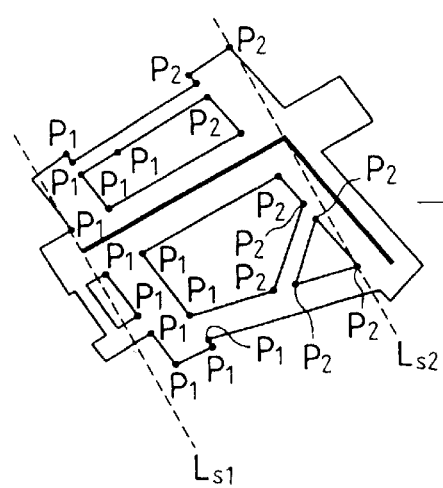

As shown in FIG. 59, it is judged whether or not the route has a straight route line Lr of which a length is longer than a predetermined length (step 451). In cases where the route does not have any straight route line Lr, because the shortening of the road along the route is not required, the procedure is ended. In contrast, as shown in FIG. 60(a), in cases where the route has a straight route line Lr of which a length is longer than the predetermined length, a rectangular road shortening region Rs in which the straight route line Lr is arranged is set (step 452). In this case, the rectangular road shortening region Rs is treated as a candidate for an area to be made small. A first side line Ls1 and a second side line Ls2 of the rectangular road shortening region Rs are perpendicular to the straight route line Lr. Thereafter, the side lines Ls1 and Ls2 are selected (step 453), and all corner points of one or more roads placed in the rectangular road shortening region Rs are extracted. Thereafter, as shown in FIG. 60(b), the corner points are classified into a plurality of first corner points P1 nearer to the first side line Ls1 and a plurality of second corner points P2 nearer to the second side line Ls2 (step 454). Thereafter, a particular first corner point P1 farthest from the first side line Ls1 is selected from the first corner points P1, and a particular second corner point P2 farthest from the second side line Ls2 is selected from the second corner points P2 (step 455).

Figure 60C:
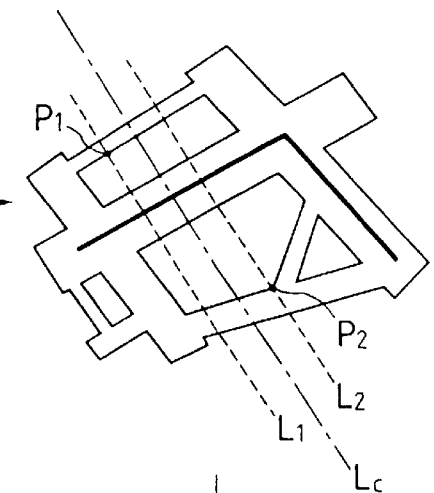
Figure 60D:
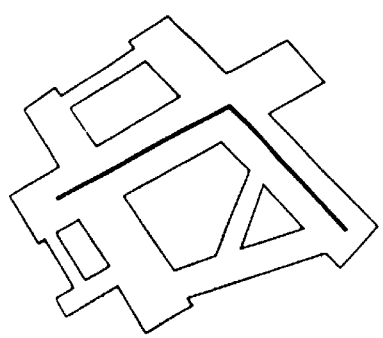

Thereafter, a first line, which is parallel to the first side line Ls1 and passes through the particular first corner point P1, is set as a first particular line L1, and a second line, which is parallel to the second side line Ls2 and passes through the particular second corner point P2, is set as a second particular line L2 (step 456). Thereafter, it is judged whether or not a distance between the first and second particular lines L1 and L2 is longer than a predetermined distance Dp (step 457). In cases where the distance is not longer than the predetermined distance Dp, because the shortening of the road along the route is not required, the procedure is ended. In contrast, in cases where the distance is longer than the predetermined distance Dp, as shown in FIG. 60(c), a central line Lc between the first and second particular lines L1 and L2 is set (step 458), an area of the route map positioned between the first and second particular lines L1 and L2 newly determined is deleted from the route map (step 459), and two remaining areas of the route map are combined by moving the first and second particular lines L1 and L2 to the central line Lc (step 460). Therefore, as shown in FIG. 60(d), a shortened route map is generated.

Returning to FIG. 52, in cases where the route information is not included in the step 410, the long road shortening unit 75 is not operated, and the procedure proceeds to a step 412.

In the step 412, the target object deleting unit 76 is operated, and one or more target objects set to lower priority are deleted to prevent the overlapping of a plurality of target objects when the deformed map is scaled down.

Figure 61:
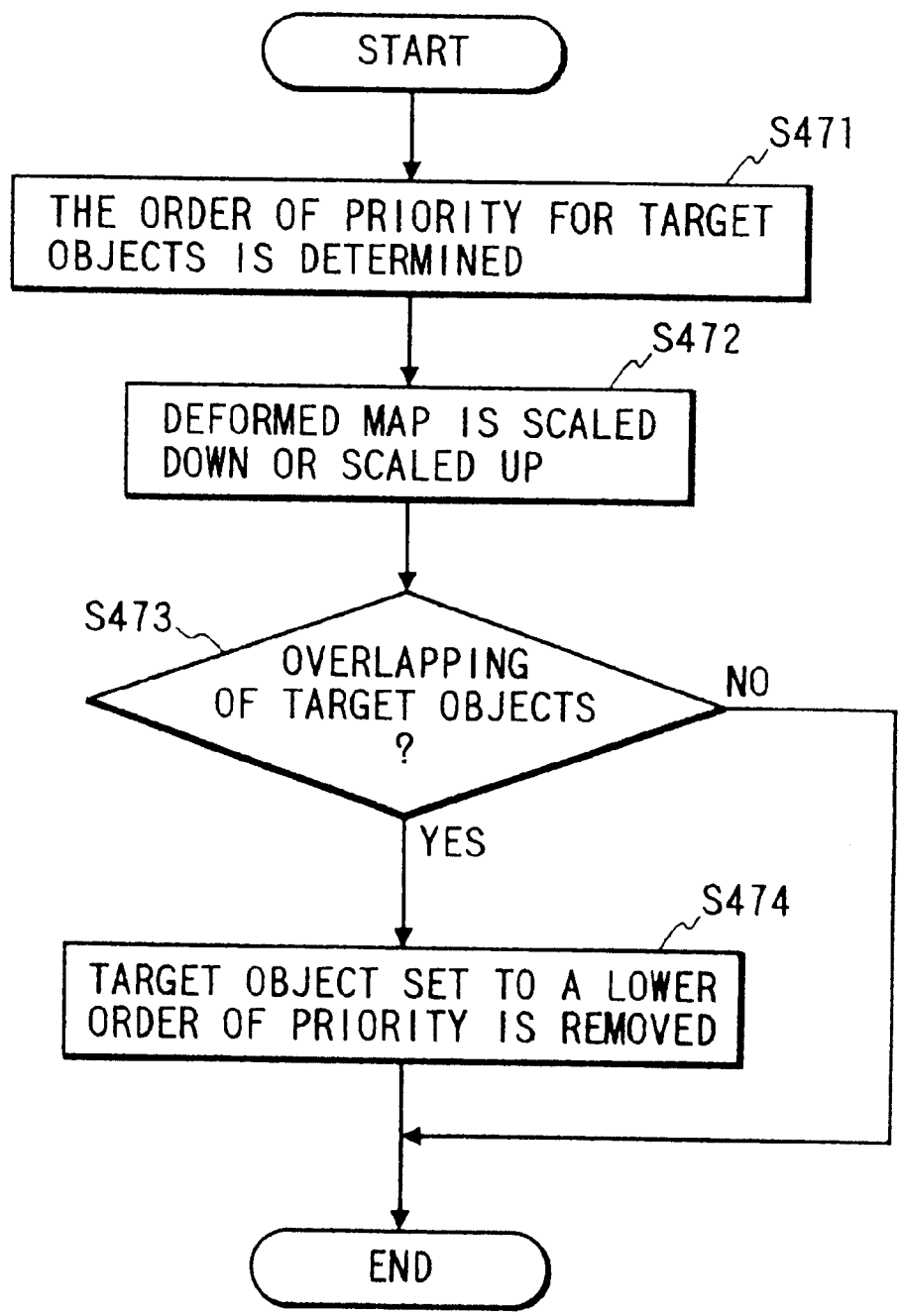
FIG. 61 is a flow chart showing an operation performed in a target object deleting unit shown in FIG. 51.
Figure 62A:
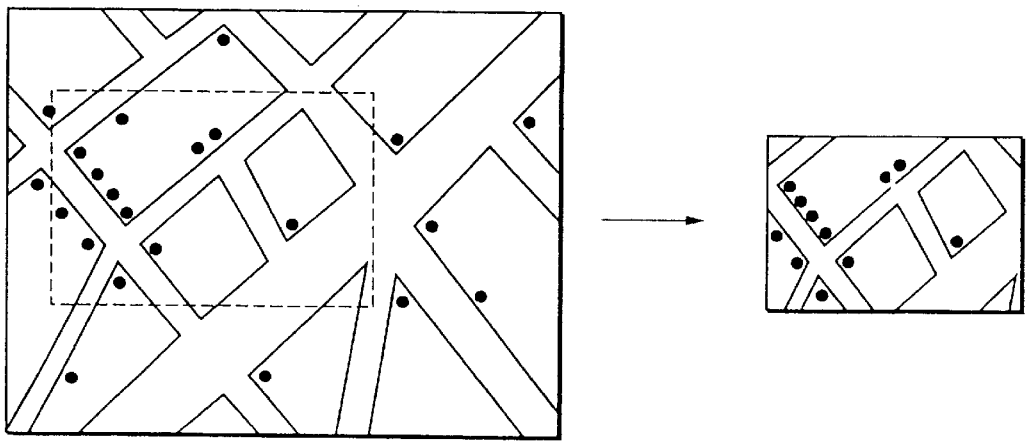
FIG. 62(a) shows an example of a deformed map and a scaled down map in which any target object is not deleted.
Figure 62B:
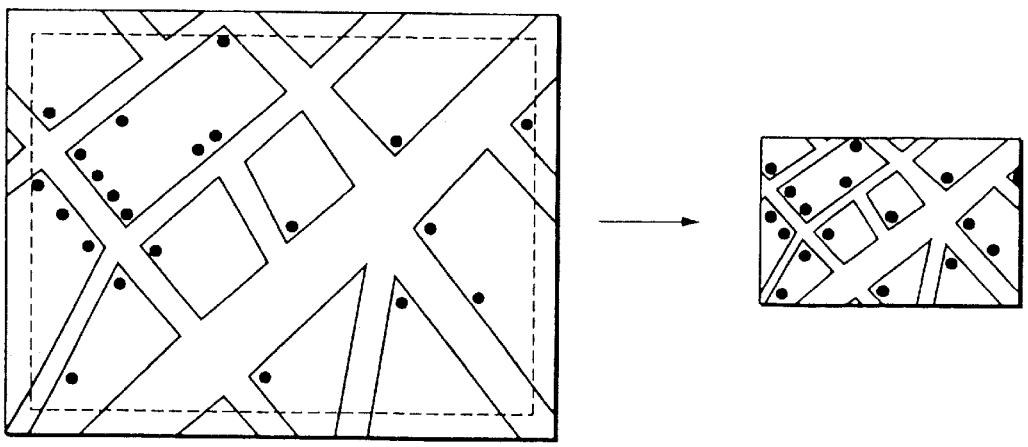
FIG. 62(b) shows an example of a deformed map and a scaled down map in which a plurality of target object are deleted.

FIG. 61 is a flow chart showing an operation performed in the target object deleting unit 76, FIG. 62(a) shows an example of the deformed map and a scaled down map in which any target object is not deleted, and FIG. 62(b) shows an example of the deformed map and a scaled down map in which a plurality of target objects are deleted.

As shown in FIG. 61, the order of priority is determined for a group of target objects drawn in the deformed map according to a displaying priority (step 471). Thereafter, the deformed map is scaled down or scaled up (step 472).

Thereafter, it is checked whether or not a symbol (or a black circle) of a first target object overlaps with a symbol of a second target object (step 473). In cases where the symbol of the first target object overlaps with the symbol of the second target object, as shown in FIG. 62(b), one target object set to a lower order of priority is selected from the first and second target objects and is removed (step 474). In contrast, in cases where the symbol of the first target object does not overlap with the symbol of the second target object, as shown in FIG. 62(a), any target object is not deleted.

Therefore, even though the deformed map is scaled down, there is no probability that one target object overlaps with another target object.

Accordingly, the particular vector road map corresponding to the image drawing region can be changed to a deformed map which is easily viewed by the user. Also, because a volume of particular map information indicating the particular vector road map can be reduced, the deformed map can be easily transmitted according to a radio communication.

Also, the deformed map generating apparatus 70 according to the fifth embodiment is useful for the map information providing system according to the third or fourth embodiment.

In the fifth embodiment, the positional relationship determining unit 77 is arranged in the deformed map generating unit 71 and is operated after the map displaying area setting unit 72 or the route map generating unit 78 is operated. However, it is applicable that the positional relationship determining unit 77 be arranged outside the deformed map generating unit 71 and be operated before the deformed map generating unit 71 is operated.

(Sixth Embodiment)

A geographical information providing system and a geographical information describing method according to a sixth embodiment is described.

Figure 63:
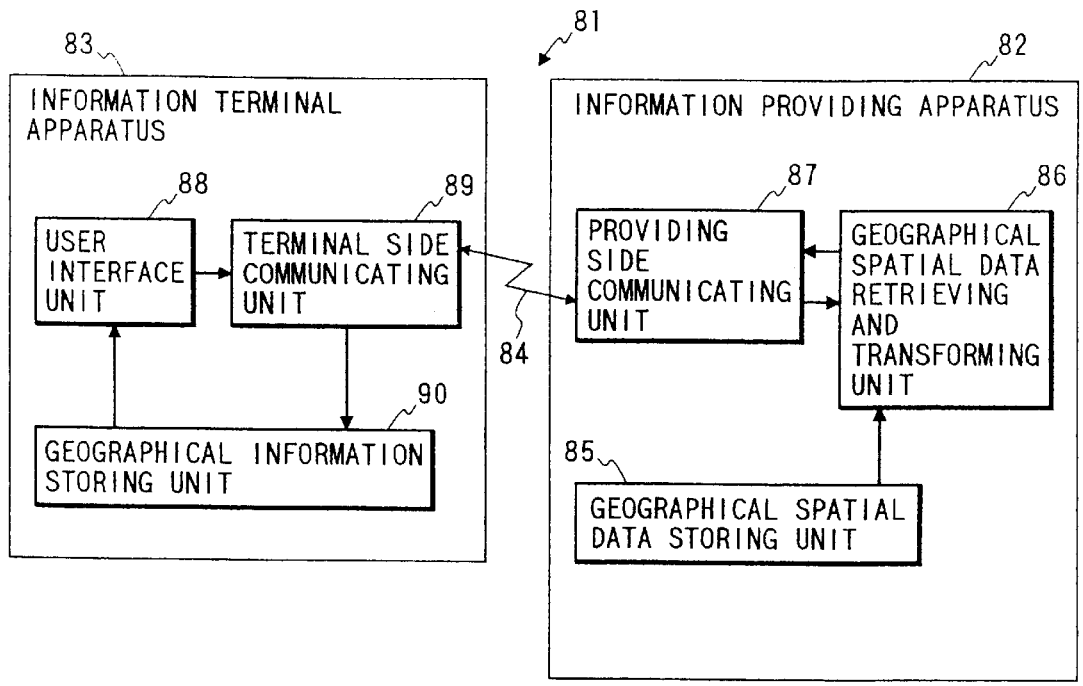
FIG. 63 is a block diagram of a geographical information providing system according to a sixth embodiment of the present invention.

FIG. 63 is a block diagram of a geographical information providing system according to a sixth embodiment of the present invention.

As shown in FIG. 63, a geographical information providing system 81 comprises an information providing apparatus 82 for providing pieces of geographical spatial data (geographical information) for a user, and an information terminal apparatus 83, used as a retrieval means on a user's side, for transmitting an information retrieval request to the information providing apparatus 82 to retrieve the geographical spatial data and receiving the geographical spatial data from the information providing apparatus 82 through a communication network 84.

The information providing apparatus 82 comprises:
- a geographical spatial data storing unit 85 for storing pieces of geographical spatial data;
- a geographical spatial data retrieving and transforming unit 86 for retrieving particular geographical spatial data denoting image data of a map from the geographical spatial data storing unit 85 according to the information retrieval request and transforming the particular geographical spatial data denoting image data into pieces of particular geographical spatial data described in a particular data describing form according to a geographical spatial data describing method to reduce a data volume of the pieces of particular geographical spatial data; and
- a providing side communicating unit 87 for receiving the information retrieval request from the information terminal apparatus 83 and transmitting the particular geographical spatial data described according to the geographical spatial data describing method by the geographical spatial data retrieving and transforming unit 86 to the information terminal apparatus 83.

The information terminal apparatus 83 comprises:
- a user interface unit 88 for receiving the information retrieval request from the user and displaying a map indicated by the particular geographical spatial data which is transmitted from the information providing apparatus 82 according to the information retrieval request;
- a terminal side communicating unit 89 for transmitting the information retrieval request received in the user interface unit 88 to the information providing apparatus 82 and receiving the particular geographical spatial data from the providing side communicating unit 87 of the information providing apparatus 82; and
- a geographical information storing unit 90 for storing the particular geographical spatial data transmitted from the information providing apparatus 82.

Figure 64:
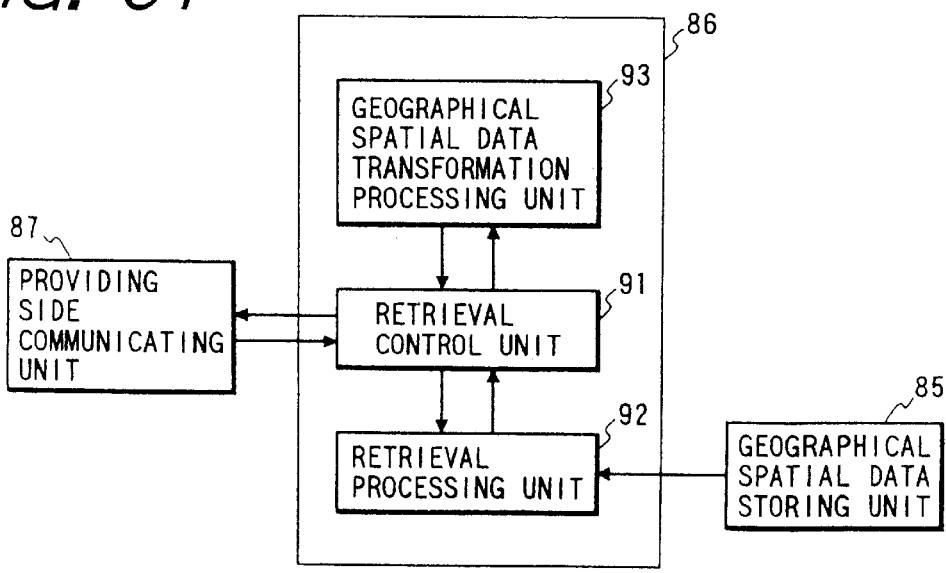
FIG. 64 is a block diagram of a geographical spatial data retrieving and transforming unit shown in FIG. 63.

As shown in FIG. 64, the geographical spatial data retrieving and transforming unit 86 comprises:
- a retrieval control unit 91 for controlling the retrieval of the particular geographical spatial data according to the information retrieval request;
- a retrieval processing unit 92 for retrieving the particular geographical spatial data from the geographical spatial data storing unit 85 under the control of the retrieval control unit 91; and
- a geographical spatial data transformation processing unit 93 for describing the particular geographical spatial data retrieved by the retrieval processing unit 92 in a particular data form according to the geographical spatial data describing method under the control of the retrieval control unit 91.

The pieces of geographical spatial data stored in the geographical spatial data storing unit 85 denote image data relating to a plurality of composing objects in a geographical space such as nature on earth, artificial objects (building, road, railway, farm and the like), a boundary and the like. In the geographical spatial data retrieving and transforming unit 86, the pieces of geographical spatial data are transformed into pieces of geographical spatial data described in a particular data describing form according to a geographical spatial data describing method. That is, a plurality of composing objects existing in the geographical space are determined, and a plurality of spatial characteristics of one composing object are recognized for each composing object, and each piece of geographical spatial data indicating one spatial characteristic of one combining object is expressed as a set of the spatial characteristic and a character identifier identifying a type of the spatial characteristic. The composing objects, of which the spatial characteristics are indicated by the geographical spatial data described in the particular data describing form, are generally expressed on a two-dimensional map.

Figure 65:
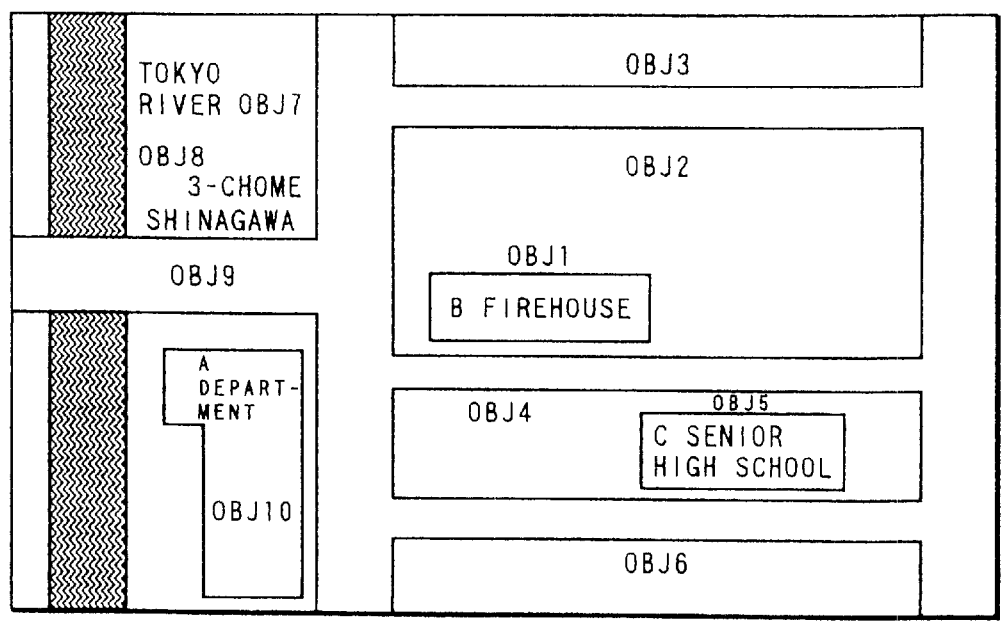
FIG. 65 shows an example of a two-dimensional map displayed in the geographical information providing system shown in FIG. 63.

FIG. 65 shows an example of a two-dimensional map indicating a plurality of composing objects in a geographical space. As shown in FIG. 65, a plurality of nature and artificial objects Obj1 to Obj10 are drawn as composing objects in the map.

Figures of the composing objects in a map are classified into a road figure indicating a road, an institution figure indicating an institution (or a building), a water group figure indicating sea, a river, a lake and a waterway the like. Therefore, as shown in FIG. 66, a plurality of figure tables such as a road figure table, an institution FIG. table, a water group figure table and the like are hierarchically arranged in the geographical spatial data storing unit 85. Also, an institution information table is arranged in the geographical spatial data storing unit 85 to manage various institutions drawn in the map.

Each figure table is composed of a node sub-table in which node positions of a plurality of figures such as a road, an institution, a waterway and the like are written as point information and an arc sub-table in which a plurality of arcs respectively placed between two nodes indicating two figures are written as line information. The node sub-table has a node number field in which the numbers of the nodes are written, a latitude field in which a latitude of each node is written and a longitude field in which a longitude of each node is written. The arc sub-table has an arc number field in which the numbers of the arcs are written, a starting point field in which one node placed at a starting point of each arc is written, an ending point field in which one node placed at an ending point of each arc is written and a length field in which a length of each arc is written. The institution information table has an institution name field in which names of a plurality of institutions are written, an institution type field in which types of institutions are written, a representative point field in which a position (a latitude and a longitude) of a representative point of each institute is written, an address field in which an address of each institute is written, a zip code field in which a zip code of the address of each institute is written, a telephone number field in which a telephone number of each institute is written, a self-governing body field in which a self-governing body administering each institute is written, and a time depending data field in which a time depending data relating to each institute is written.

In the above configuration of the geographical information providing system 81, the information providing apparatus 82 is connected with the information terminal apparatus 83 through a radio communication path when a communication request transmitted from the information terminal apparatus 83 is received by the providing side communicating unit 87. Thereafter, when a user inputs a spot name "B firehouse" to the user interface unit 88, a retrieval request indicating the retrieval of a particular spot "B firehouse" is transmitted from the information terminal apparatus 83 to the geographical spatial data retrieving and transforming unit 86 through the providing side communicating unit 87.

Thereafter, the retrieval request is analyzed in the retrieval control unit 91 of the geographical spatial data retrieving and transforming unit 86, a retrieval instruction row is generated from the retrieval request, and the retrieval control unit 91 instructs the retrieval processing unit 92 to perform a retrieval operation according to the retrieval instruction row. Therefore, in the retrieval processing unit 92, a plurality of retrieval instructions of the retrieval instruction row are analyzed, and one figure table from which particular geographical spatial data is retrieved, a retrieval condition and a storing region in which the particular geographical spatial data is planned to be stored are specified. Thereafter, particular geographical spatial data satisfying the retrieval condition is retrieved from the specified figure table of the geographical spatial data storing unit 85. In this embodiment, pieces of geographical spatial data corresponding to a particular 1000 meters square area surrounding the particular spot "B firehouse" are, for example, retrieved as the particular geographical spatial data from the geographical spatial data storing unit 85. Thereafter, the particular geographical spatial data is transmitted to the geographical spatial data transformation processing unit 93, and a data describing type of the particular geographical spatial data retrieved by the retrieval processing unit 92 is transformed, and the particular geographical spatial data are described in a particular data describing form according to the geographical spatial data describing method under the control of the retrieval control unit 91. Therefore, a data volume of the particular geographical spatial data is reduced and become suitable for the data transmission through the communication network 84. Thereafter, the particular geographical spatial data described in the particular data describing form according to the geographical spatial data describing method are transmitted to the information terminal apparatus 83 through the communicating units 87 and 89.

A geographical spatial data retrieving operation and a data describing type transforming operation performed in the geographical spatial data storing unit 85 are described in detail with reference to FIG. 67.

Figure 67:
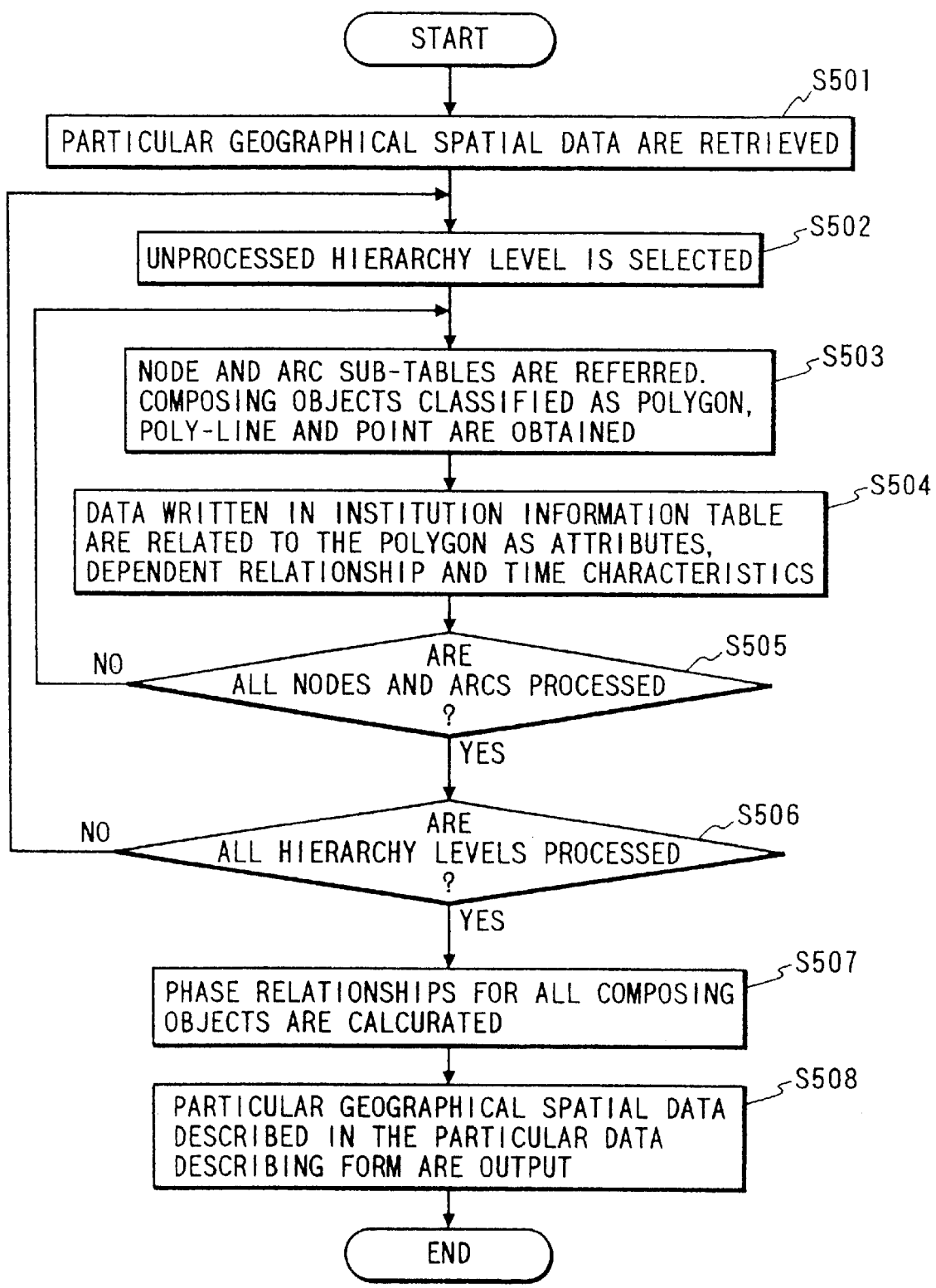
FIG. 67 is a flow chart showing a geographical information retrieving operation and a data describing type transforming operation performed in a geographical spatial data retrieving and transforming unit shown in FIG. 63.

As shown in FIG. 67, the retrieval request is analyzed, and a row of a plurality of retrieval instruction is generated in the retrieval control unit 91. Thereafter, the retrieval processing unit 92 retrieves pieces of particular geographical spatial data from the geographical spatial data storing unit 85 according to the retrieval instructions (step 501). In cases where the retrieval request indicates a particular spot "B firehouse", the particular spot "B firehouse" is retrieved from the institution name field of the institution information table of the geographical spatial data storing unit 85, and a particular 1000 meters square area surrounding the particular spot "B firehouse" is set as a retrieval range. Thereafter, an unprocessed hierarchy level is selected as a processing hierarchy level from a plurality of hierarchy levels of a specified figure table (step 502). Thereafter, a node sub-table and an arc sub-table of the specified figure table are referred one by one, and pieces of node and arc data placed in the retrieval range are extracted as pieces of particular geographical spatial data. Thereafter, a plurality of arcs forming a closed area are classified as a composing object of which a shape is called a polygon, a plurality of arcs arranged in series without forming any closed area are classified as a composing object of which a shape is called a poly-line, and an isolated arc is classified as a composing object of which a shape is called a point (step 503).

Thereafter, in cases where a plurality of arcs classified as a polygon are extracted, the institution information table is referred, a particular institution in which a representative point is placed in a closed area formed by the arcs is looked for. In cases where the particular institution is found out, pieces of data written in the institution name field, the institution type field, the representative point field, the address field, the zip code field and the telephone number field are related to the polygon as data indicating attributes of the polygon, data of the self-governing body field is related to the polygon as data indicating a dependent relationship with the polygon, and data of the time depending data field is related to the polygon as data indicating a time characteristic of the polygon (step 504).

Thereafter, it is judged whether or not all arcs and nodes in the processing hierarchy level are processed (step 505). In cases where all arcs and nodes in the processing hierarchy level are not processed, the steps 503 and 504 are repeated. When all arcs and nodes in the processing hierarchy level are processed, it is judged whether or not all hierarchy levels are processed (step 506). In cases where there is an unprocessed hierarchy level, the steps 502 to 505 are repeated. When all hierarchy levels are processed, the procedure proceeds to a step 507 to perform a data describing type transforming operation.

In the step 507, phase relationships for all composing objects are calculated in the geographical spatial data transformation processing unit 93 by using the pieces of particular geographical spatial data retrieved by the retrieval processing unit 92. For example, a phase relationship in which a first composing object is included in a second composing object is classified as a inclusion relationship, and a phase relationship in which two composing objects cross each other is classified as a crossing relationship.

Thereafter, an identification code is attached to each composing object in a geographical space. Thereafter, each composing object is described by declaredly allocating a plurality of character strings respectively composed of a characteristic identifier indicating a spatial characteristic and data for the characteristic identifier. That is, pieces of data indicating spatial characteristics of a composing object are allocated to the composing object for each composing object. For example, as shown in FIG. 68, character strings "obj1" and "obj2" respectively denote an identification code attached to one composing object. Also, character strings "shape", "positional information", "attribute", "function", "phase relationship", "dependent relationship" and "time characteristic" denote a plurality of characteristic identifiers indicating the spatial characteristics of each composing object. Also, character strings "height", "figure type", "institution type", "institution name", "telephone number" "address", "zip code" and "water volume" denote a plurality of characteristic identifiers indicating a plurality of attributes classified as one spatial characteristic of each composing object. Also, a character string "inclusion relationship" (or "crossing relationship") denotes a characteristic identifier indicating a phase relationship classified as one spatial characteristic of each composing object, a character string "administering self-governing body" denotes a characteristic identifier indicating an independent relationship classified as one spatial characteristic of each composing object, and a character string "data renewal date" denotes a characteristic identifier indicating a time characteristic classified as one spatial characteristic of each composing object.

Data for the characteristic identifier "positional information" of each composing object is quoted from the specified figure table, and data for the characteristic identifier "shape" of each composing object is obtained by collecting latitudes and longitudes of a plurality of nodes written in the node sub-table. Also, pieces of data for the characteristic identifiers "attribute", "function", "dependent relationship" and "time characteristic" of each composing object are quoted from the institution information table, and data for the characteristic identifier "phase relationship" is calculated in the step 507.

Thereafter, the particular geographical spatial data described in the particular data describing form according to the geographical spatial data describing method by the geographical spatial data transformation processing unit 93 are output to the providing side communicating unit 87 under the control of the retrieval control unit 91 (step 508).

Thereafter, the particular geographical spatial data described in the particular data describing form according to the geographical spatial data describing method are transmitted to the information terminal apparatus 83 through the communication network 84 and are stored in the geographical information storing unit 90, and a map indicated by the particular geographical spatial data is displayed in the user interface unit 88. In this case, because a data volume of the particular geographical spatial data is reduced by the geographical spatial data transformation processing unit 93, the particular geographical spatial data can be easily transmitted to the information terminal apparatus 83 even though the particular geographical spatial data pass through the communication network 84.

Figure 69:
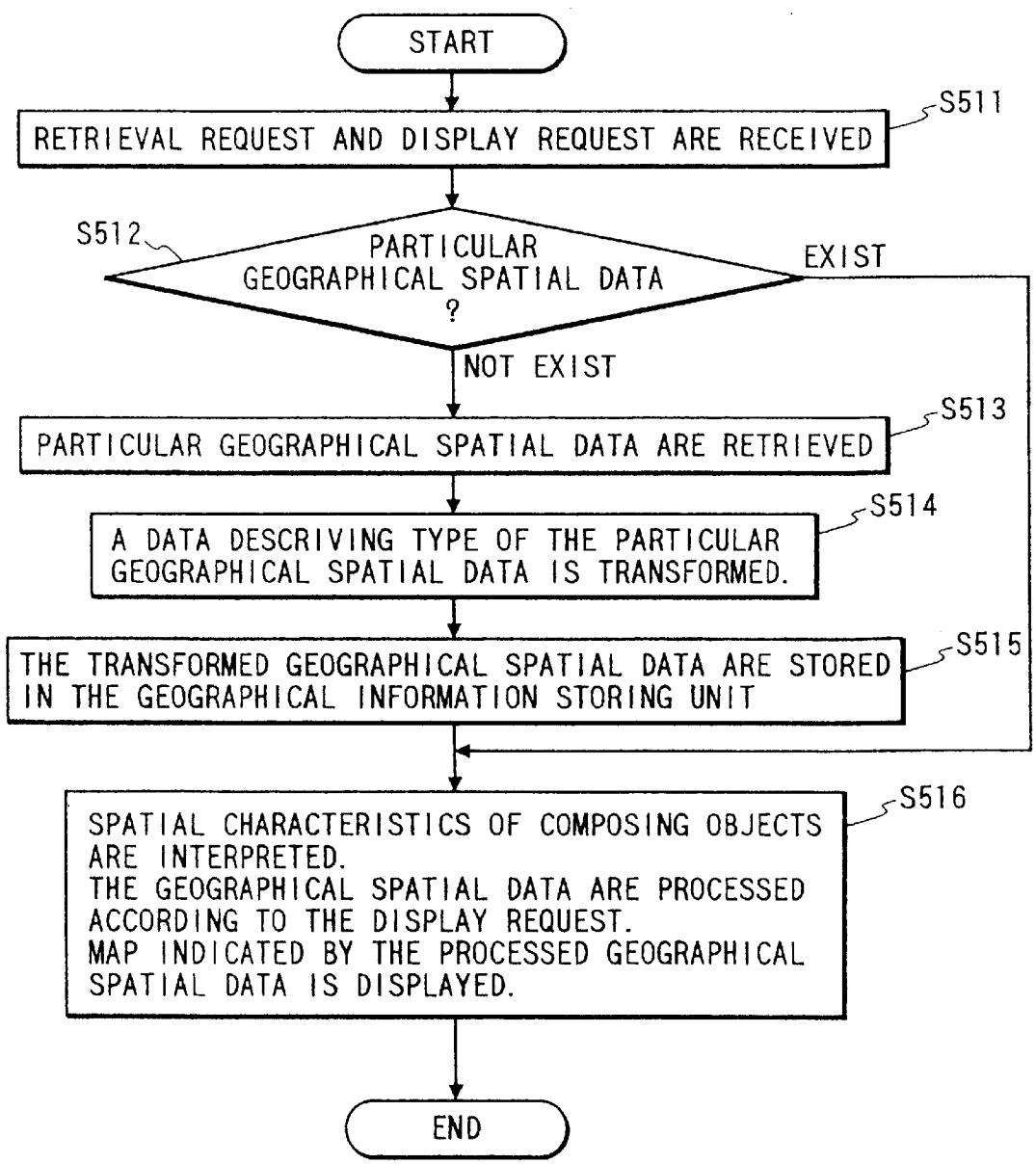
FIG. 69 is a flow chart showing an operation performed in a user interface unit shown in FIG. 63.

Next, an operation performed in the user interface unit 88 of the information terminal apparatus 83 is described with reference to FIG. 69.

When a user's retrieval request and a user's display request are received (step 511), it is checked whether or not pieces of particular geographical spatial data corresponding to the retrieval request are stored in the geographical information storing unit 90 (step 512). In cases where pieces of particular geographical spatial data corresponding to the retrieval request are not stored, the retrieval request is transmitted to the information providing apparatus 82, and pieces of particular geographical spatial data corresponding to the retrieval request are retrieved from the geographical spatial data storing unit 85 (step 513). Thereafter, a data describing type of the particular geographical spatial data is transformed by the geographical spatial data retrieving and transforming unit 86 (step 514). Thereafter, the particular geographical spatial data described according to the geographical spatial data describing method are transmitted to the information terminal apparatus 83 and are temporarily stored in the geographical information storing unit 90 (step 515). Thereafter, spatial characteristics of each composing object described in the particular geographical spatial data are interpreted in the user interface unit 88, and the particular geographical spatial data are processed according to the user's display request, and a map indicated by the particular geographical spatial data is displayed (step 516). In this case, the user's display request indicates which characteristic identifiers indicating spatial characteristics of each composing object are selected to display the spatial characteristics of each composing object. Also, in cases where pieces of particular geographical spatial data corresponding to the retrieval request are stored in the geographical information storing unit 90 in the step 512, the step 516 is performed.

Figure 70:
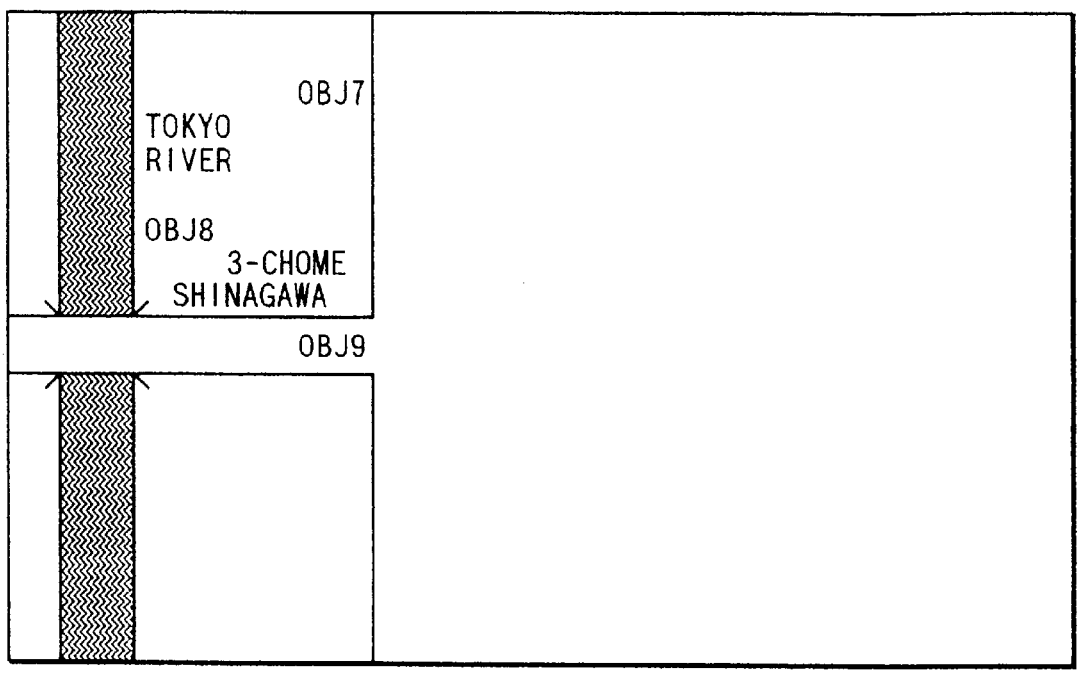
FIG. 70 shows an example of a map obtained by selecting a characteristic identifier "phase relationship" of each composing object described in the particular geographical spatial data according to a user's display request in a user interface unit shown in FIG. 63.
Figure 71:
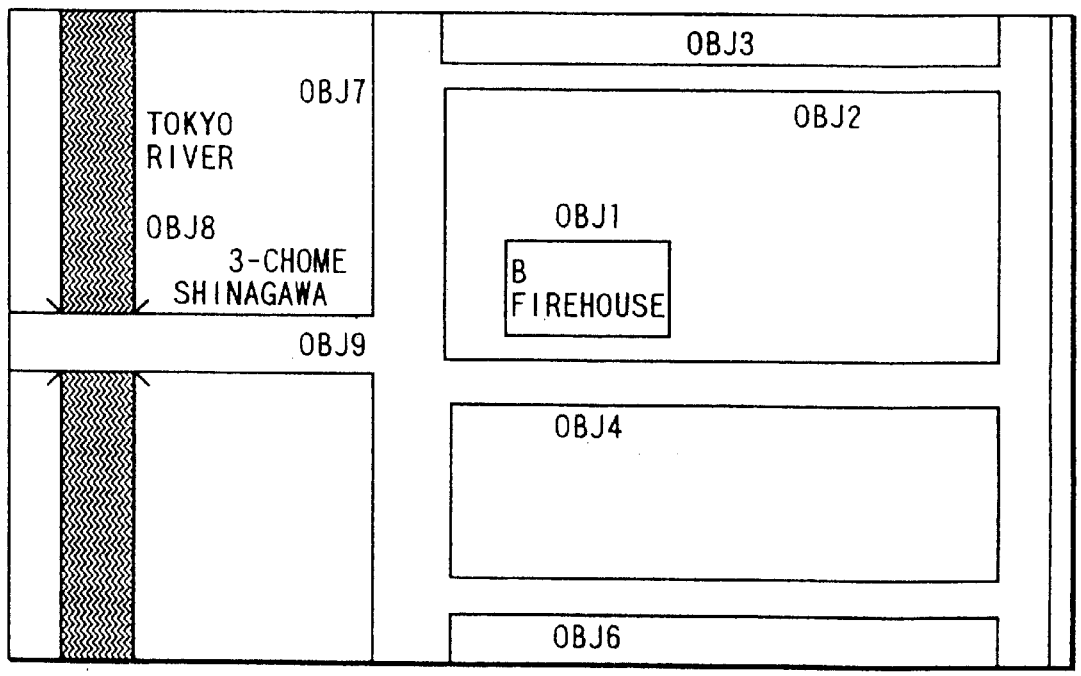
FIG. 71 shows an example of a map obtained by selecting a characteristic identifier "time characteristic" of each composing object described in the particular geographical spatial data according to a user's display request in a user interface unit shown in FIG. 63.

An example of a map in which the Tokyo River Obj8 and a particular road Obj9 crossing over the Tokyo River are drawn in FIG. 70. This map is obtained in the user interface unit 88 by selecting a characteristic identifier "phase relationship" of each composing object described in the particular geographical spatial data according to a user's display request. The Tokyo River and the particular road are set in a crossing relationship. Also, an example of a map in which the Tokyo River Obj8, the particular road Obj9 and a particular building Obj1 "B firehouse" are drawn in FIG. 71. The particular building Obj1 is added by additionally selecting a characteristic identifier "time characteristic" of a particular composing object described in the particular geographical spatial data on condition that a data renewal date for the particular composing object is March 1997.

As is described above, in the geographical information providing system 81 according to this embodiment, a data form of pieces of particular geographical spatial data retrieved from the geographical spatial data storing unit 85 is transformed into the particular data describing form according to the geographical spatial data describing method. Therefore, each of composing objects in a geographical space such as nature on earth, artificial objects (building, road, railway, farm and the like), a boundary and the like is declaredly described by a plurality of characteristic identifiers indicating spatial characteristics of the composing object and data of each characteristic identifier.

Accordingly, because any particular geographical spatial data retrieved from the geographical spatial data storing unit 85 is not transmitted as image data to the information terminal apparatus 83 but the particular geographical spatial data described in the particular data describing form according to the geographical spatial data describing method are transmitted from the information providing apparatus 82 to the information terminal apparatus 83, a data volume of the particular geographical spatial data passing through the communication network 84 can be reduced as compared with a data volume of the image data indicating a map. Therefore, a data transmission efficiency for the particular geographical spatial data passing through the communication network 84 can be greatly improved. As a result, the communication network 84 is not limited to a wire circuit, but the particular geographical spatial data can be transmitted through a radio communication path.

Also, because the particular geographical spatial data transmitted to the information terminal apparatus 83 are described in the particular data describing form according to the geographical spatial data describing method, when data for the characteristic identifier "shape", "positional information" or "phase relationship" of each composing object described in the particular geographical spatial data are interpreted as spatial characteristics of each composing object, figures of the composing objects in a map indicated by the particular geographical spatial data can be accurately reproduced and displayed. Also, in cases where data for the characteristic identifier "attribute" of each composing object described in the particular geographical spatial data is interpreted in the user interface unit 88, institution information such as a height, an institution type, an institution name, a telephone number, an address and a zip code can be displayed with a figure of each composing object in a map.

Also, because spatial characteristics of each composing object in a geographical space of a map are described from various points of view by using various characteristic identifiers according to the geographical spatial data describing method, various spatial characteristics of each composing object described in the particular geographical spatial data can be edited and displayed by selecting various characteristic identifiers on a side of the information terminal apparatus 83. Therefore, even though the user inputs one of various display requests, a map corresponding to the user's display request can be reliably displayed.

Also, because one or more spatial characteristics inherent to a composing object in a map can be described in the particular geographical spatial data according to the geographical spatial data describing method, the map can be flexibly eddied and displayed on a side of the information terminal apparatus 83.

In this embodiment, the road figure table, the institution figure table and the water group figure table are stored in the geographical spatial data storing unit 85. However, it is applicable that a traffic figure table be additionally stored in the geographical spatial data storing unit 85. Also, the fields arranged in each figure table are not limited to this embodiment. Also, a spot name is input by the user as a retrieval request. However, various retrieval requests can be input.

(Seventh Embodiment)

In this embodiment, pieces of particular geographical spatial data indicating a simplified deformed map are transmitted through the communication network 84 to moreover improve a transmission efficiency of the particular geographical spatial data.

Figure 72:
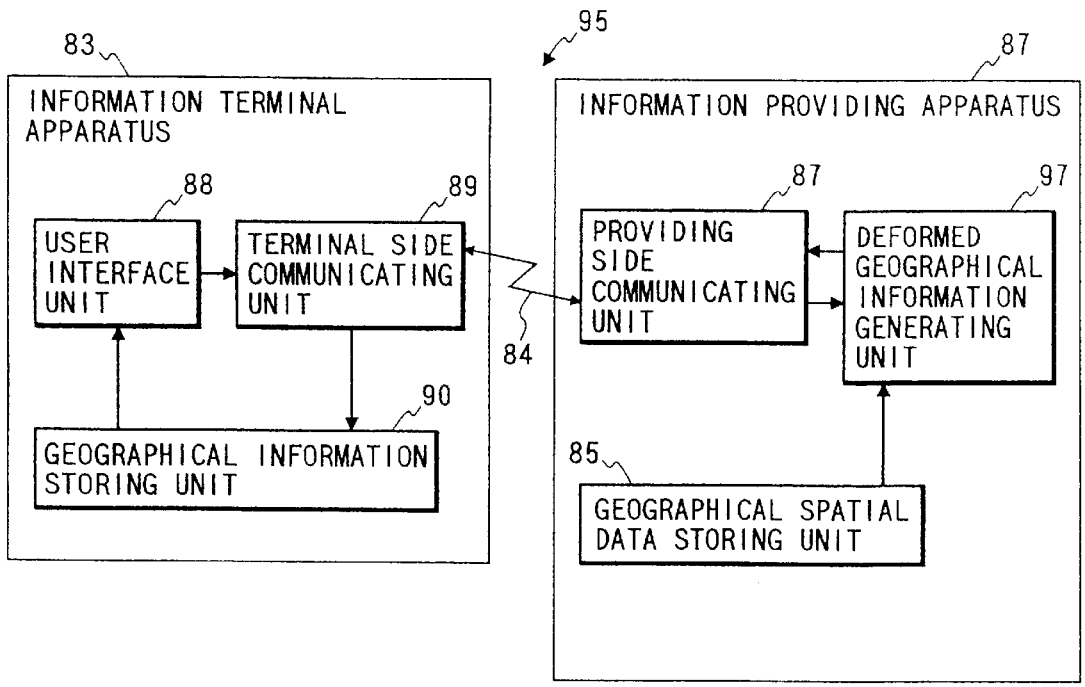
FIG. 72 is a block diagram of a geographical information providing system according to a seventh embodiment of the present invention.

FIG. 72 is a block diagram of a geographical information providing system according to a seventh embodiment of the present invention.

As shown in FIG. 72, a geographical information providing system 95 comprises an information providing apparatus 96 for providing geographical spatial data indicating a simplified deformed map for a user and the information terminal apparatus 83.

The information providing apparatus 96 comprises:

the geographical spatial data storing unit 85;

a deformed geographical information generating unit 97 for retrieving particular geographical spatial data from the geographical spatial data storing unit 85 according to the information retrieval request and generating pieces of deformed geographical spatial data indicating a simplified deformed map as deformed geographical information from the particular geographical spatial data to reduce a data volume of the pieces of deformed geographical spatial data as compared with that of the particular geographical spatial data; and the providing side communicating unit 87.

Figure 73:
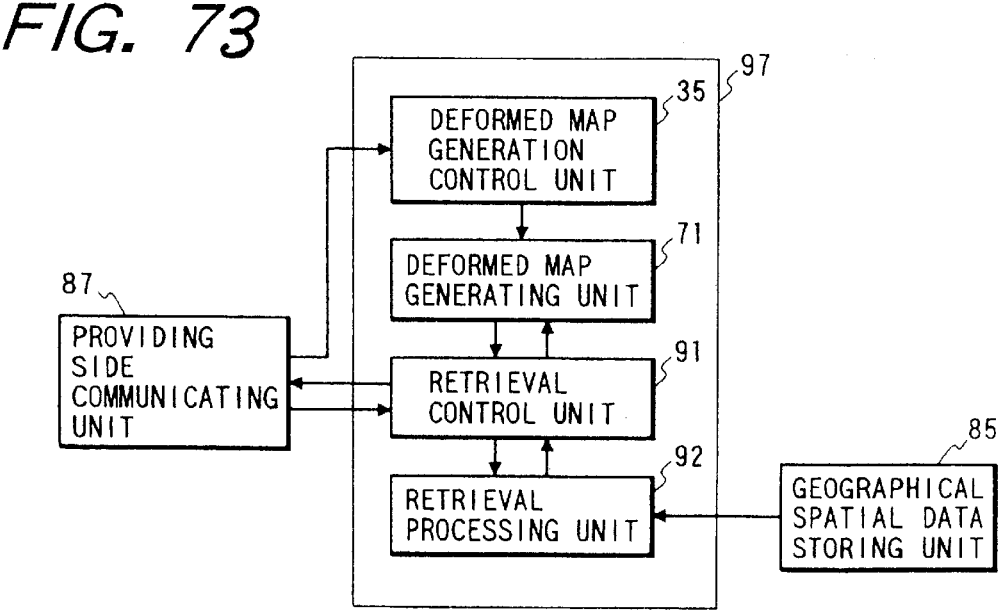
FIG. 73 is a block diagram of a deformed geographical information generating unit shown in FIG. 72.

As shown in FIG. 73, the deformed geographical information generating unit 97 comprises the retrieval control unit 91, the retrieval processing unit 92, the deformed map generating unit 71 for generating the pieces of deformed geographical spatial data from the particular geographical spatial data retrieved by the retrieval processing unit 92, and the deformed map generation control unit 35 for controlling the deformed map generating unit 71 according to deformed map generating information received from the providing side communicating unit 87.

In the above configuration, when pieces of deformed map generating information such as an image drawing region, rout information, a positional relationship determining method, road shape deforming information, mesh information (a size of a mesh and a position of the mesh) and deforming angle information are input to the user interface unit 88 of the information terminal apparatus 83, pieces of deformed geographical spatial data indicating each of various simplified deformed maps are generated in the deformed map generating unit 71 in the same manner as in the fifth embodiment, and each of the simplified deformed maps is reproduced and displayed in the user interface unit 88 in the same manner as in the sixth embodiment.

Accordingly, because pieces of particular geographical spatial data indicating a simplified deformed map are transmitted through the communication network 84, a transmission efficiency of the particular geographical spatial data can be moreover improved.

Also, even though any retrieval request is input, a simplified deformed map corresponding to the retrieval request can be obtained.

Next, an editing operation performed in the user interface unit 88 to display a simplified deformed map is described.

Figure 74:
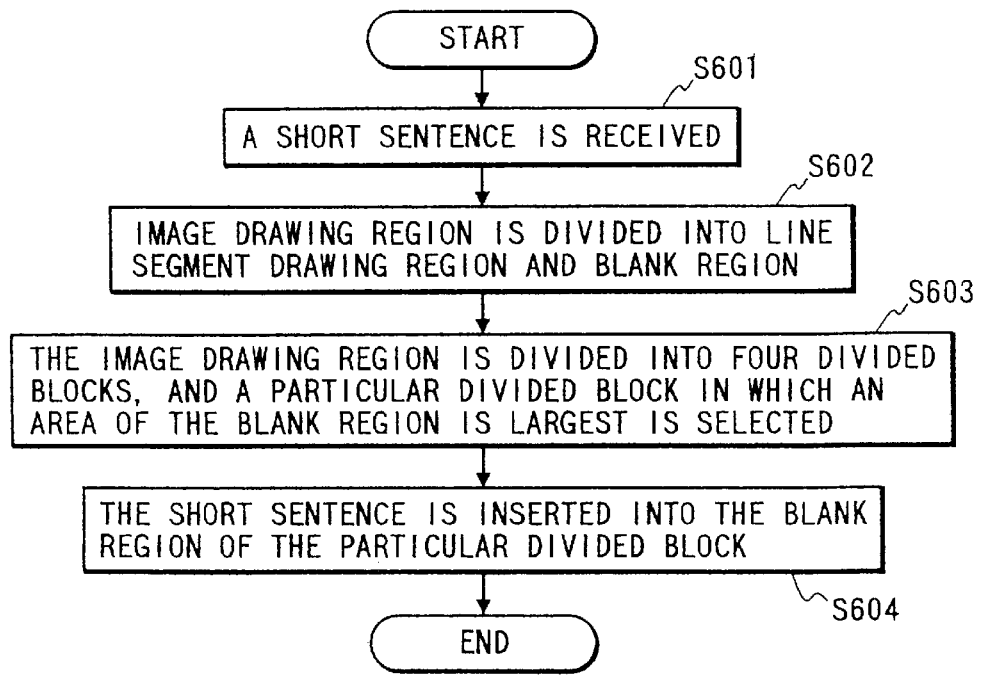
FIG. 74 is a flow chart showing the addition of a short sentence to a simplified deformed map performed in a user interface unit shown in FIG. 72.

In cases where the information terminal apparatus 83 has a printing function, there is a case that a user desires to write a memorandum in a simplified deformed map and print out the simplified deformed map with the memorandum. For example, when a user requests to write a short sentence as a memorandum in the simplified deformed map shown in FIG. 40, the short sentence is added as a display instruction to the simplified deformed map in the user interface unit 88 according to a procedure shown in FIG. 74.

Figure 75A:
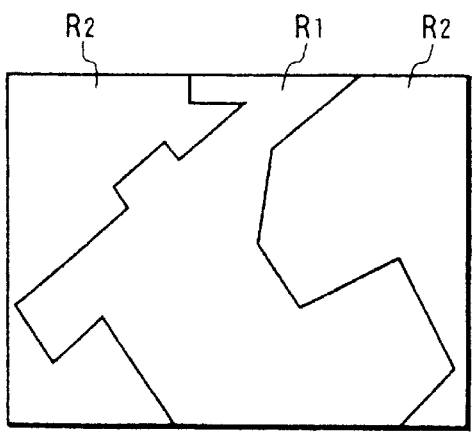
FIG. 75(a) shows an example of an image drawing region divided into a line segment drawing region R1 and a blank region R2.
Figure 75B:
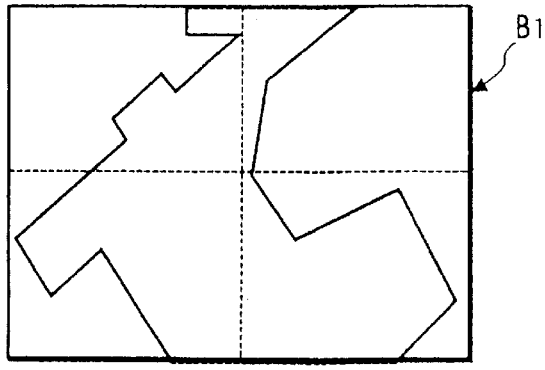
FIG. 75(b) shows an example of an image drawing region equally divided into four blocks.
Figure 75C:
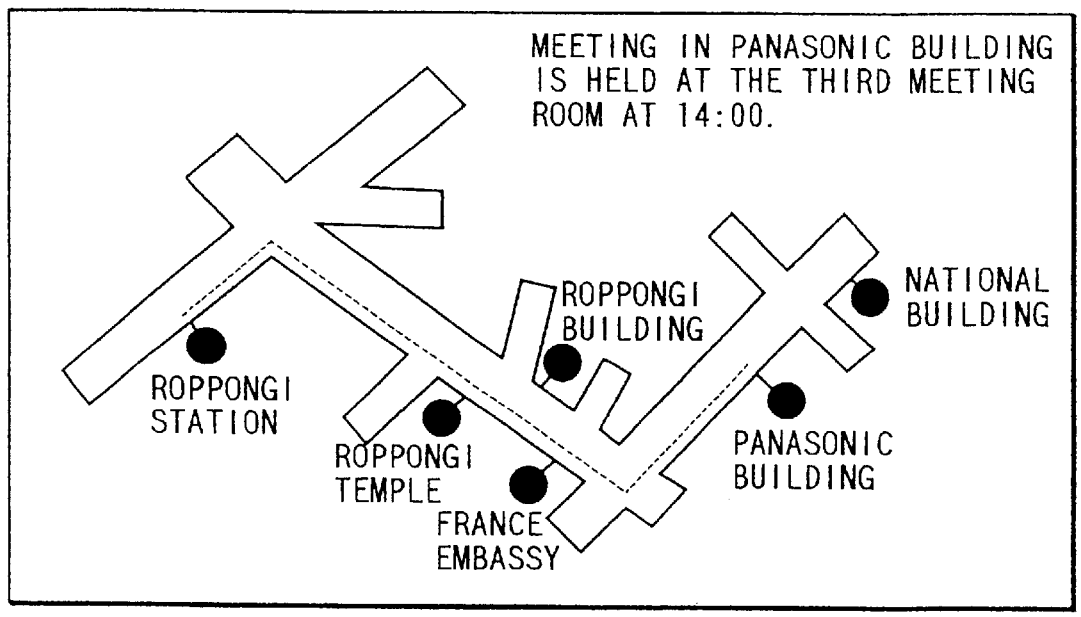
FIG. 75(c) shows a simplified deformed map obtained by adding a short sentence to a map shown in FIG. 40 according to a procedure shown in FIG. 74.

When a short sentence desired by a user to be added to a simplified deformed map for an image drawing region is received in the user interface unit 88 (step 601), as shown in FIG. 75(*a*), the image drawing region of the simplified deformed map is divided into a line segment drawing region R1, in which a plurality of line segments indicating the simplified deformed map are actually drawn, and a blank region R2 in which any line segment is not drawn (step 602). Thereafter, as shown in FIG. 75(*b*), the image drawing region of the simplified deformed map is equally divided into four divided blocks, and a particular divided block BE in which an area of the blank region R2 is largest among those in the four divided blocks is selected (step 603), and the short sentence is automatically inserted into the blank region R2 of the particular divided block B1 (step 604).

Therefore, as shown in FIG. 75(*c*), a simplified deformed map in which the short sentence is added to the blank region R2 is displayed in the user interface unit 88.

Figure 76:
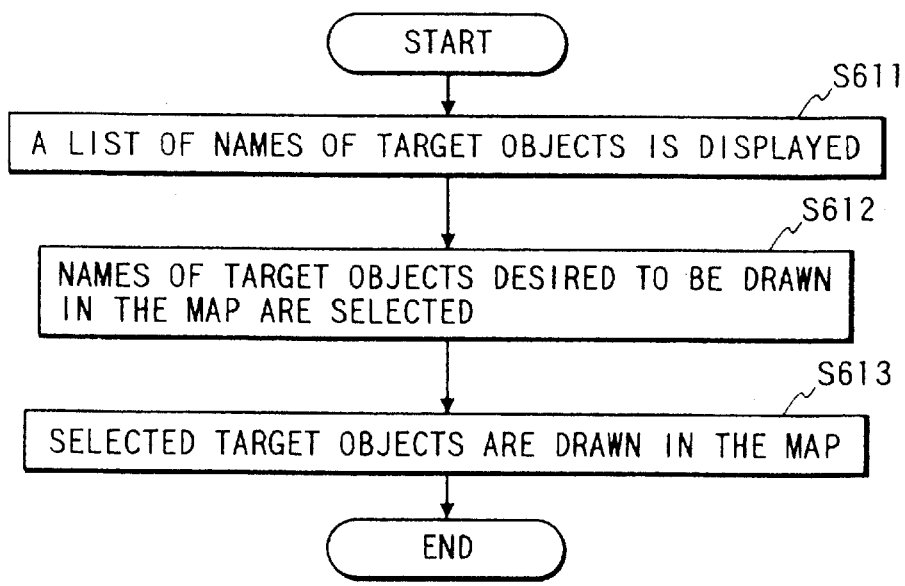
FIG. 76 is a flow chart showing a changing operation of a group of particular target objects drawn in a simplified deformed map according to a display request.

Also, there is a case that the user desires to change a group of particular target objects drawn in a simplified deformed map as a group of particular composing objects to another group of particular target objects. In this case, when the user inputs a display instruction to the user interface unit 88 so as to select names of one or more target objects, the change of a group of particular target objects drawn in a simplified deformed map is performed according to a procedure shown in FIG. 76.

Figure 77A:
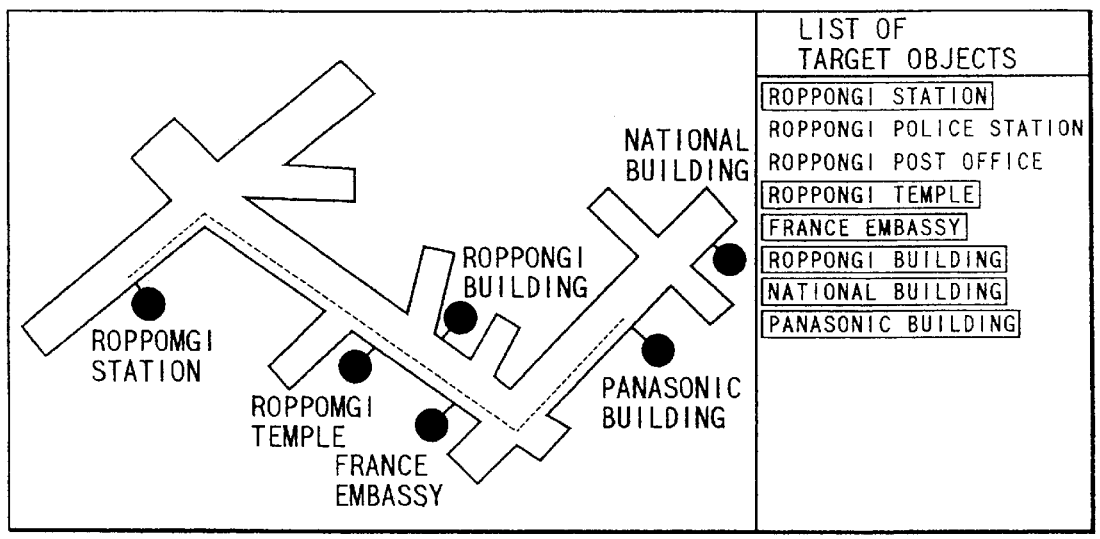
FIG. 77(a) shows an example of a simplified deformed map and a list of target objects obtained according to a procedure shown in FIG. 76.
Figure 77B:
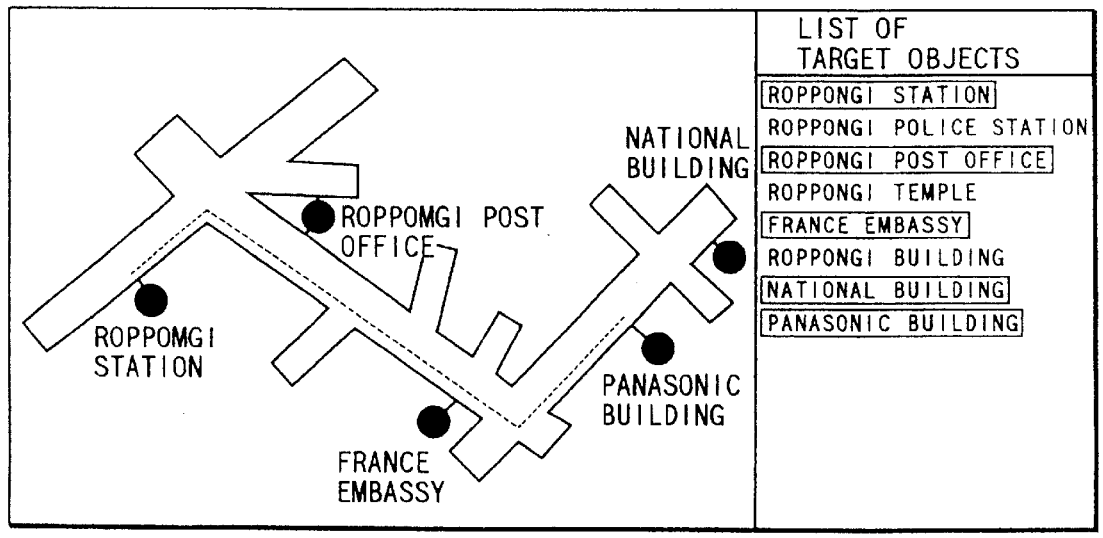
FIG. 77(b) shows another example of a simplified deformed map and a list of target objects obtained according to a procedure shown in FIG. 76.

When a user inputs a displayed target object changing instruction to the user interface unit 88, a list of names of a plurality of particular target objects indicated by the particular target object information transmitted from the information providing apparatus 96 is displayed in a menu form (step 611). For example, as shown in FIG. 77(*a*), a plurality of particular target object names "Roppongi Station", "Roppongi police box" and the like are listed, and names of display target objects actually drawn in the simplified deformed map are highlighted. Thereafter, when the user selects one or more names of target objects which are desired by the user to be drawn in the simplified deformed map (step 612), one or more target objects corresponding to the selected names are drawn in the simplified deformed map (step 613). For example, as shown in FIG. 77(*b*), because a group of names "Roppongi Temple" and "Roppongi Building" is not selected and a name "Roppongi Post Office" is additionally selected, the target objects "Roppongi Temple" and "Roppongi Building" are deleted from the simplified deformed map, and the target object "Roppongi Post Office" is additionally drawn in the simplified deformed map.

Figure 78:
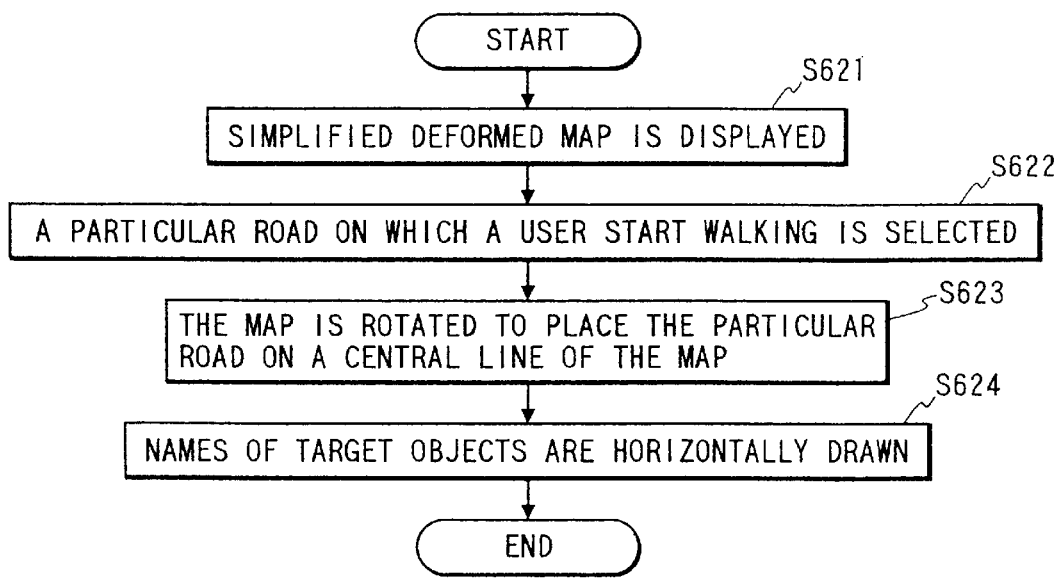
FIG. 78 is a flow chart showing a rotating operation of a simplified deformed map according to a display request.

Also, there is a case that a user desires to rotate a simplified deformed map and place a particular road on a central line of a simplified deformed map. In this case, when the user inputs a display instruction to the user interface unit 88, a map rotating operation is performed in the user interface unit 88 according to a procedure shown in FIG. 78.

Figure 79A:
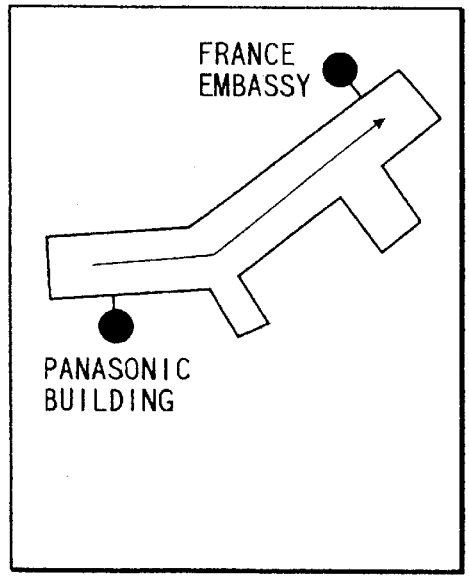
FIG. 79(a) shows an example of a simplified deformed map before the rotating operation according to a procedure shown in FIG. 78.
Figure 79B:
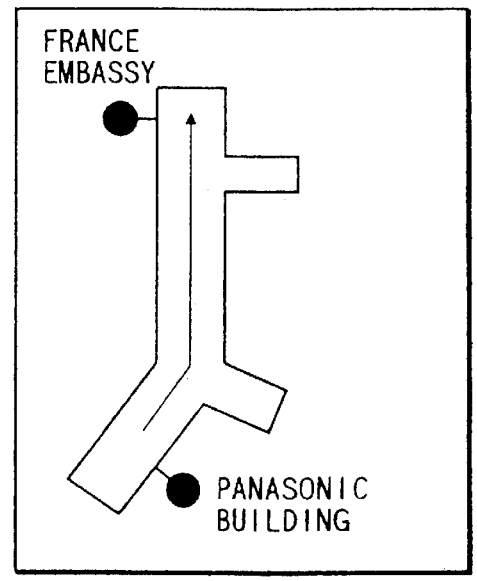
FIG. 79(b) shows an example of a simplified deformed map obtained by performing the rotating operation for the map shown in FIG. 79(a) according to a procedure shown in FIG. 78.

A simplified deformed map in which a route is indicated is displayed in the user interface unit 88 as shown in FIG. 79(*a*) (step 621). Thereafter, when a user inputs a display instruction to the user interface unit 88 to select a particular road placed on the route because the user start walking on the particular road (step 622), as shown in FIG. 79(*b*), the simplified deformed map is rotated to place the particular road on a central line of the simplified deformed map and direct the particular road in a forward direction of the user (step 623). In this case, the particular road is directed in an upper direction of a display plane of the user interface unit 88. Thereafter, names of one or more target objects drawn on the simplified deformed map as one or more composing objects are respectively drawn horizontally (step 624).

Figure 81:
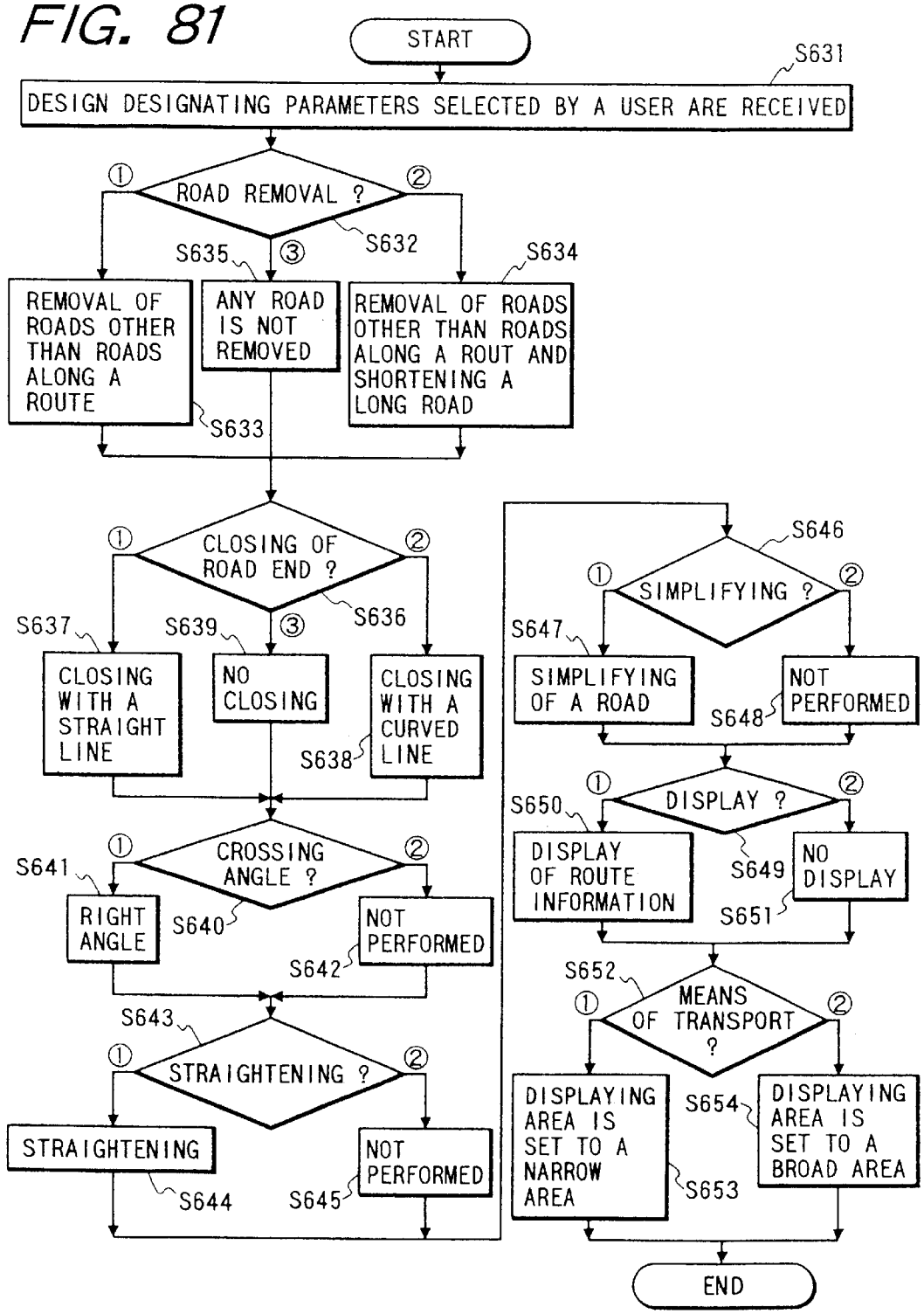
FIG. 81 is a flow chart showing a design designating operation performed according to a display request.

Also, there is a case that a user desires to designate a design for a simplified deformed map. In this case, when the user selects the designation of a design for a simplified deformed map in the user interface unit 88, a design designating image shown in FIG. 80 is displayed on a display plane of the user interface unit 88. Thereafter, when the user inputs a display instruction to select a plurality of design designating parameters displayed in the design designating image, a design designating operation is performed in the deformed geographical information generating unit 97 according to the selected design designating parameters. A procedure of the design designating operation is shown in FIG. 81.

When the deformed geographical information generating unit 97 receives the design designating parameters selected by the user (step 631), it is checked whether or not a design designating parameter indicating the removal of a road is selected (step 632). In cases where a design designating parameter indicating the removal of one or more particular roads other than roads along a route is selected, the simplified deformed map is processed by the closed road area removing unit 73 of the generating unit 97 to remove the particular roads from the simplified deformed map (step 633). Also, in cases where a design designating parameter indicating the removal of one or more particular roads other than roads along a route and the shortening of a long straight road along the route is selected, the simplified deformed map is processed by the closed road area removing unit 73 and the long road shortening unit 75 of the generating unit 97 to remove the particular roads and shorten the long straight road in the simplified deformed map (step 634). Also, in cases where any design designating parameter indicating the removal of a road is not selected, the removal of a road is not performed in the generating unit 97 (step 635).

After the step 633, 634 or 635, it is checked whether or not a design designating parameter indicating the closing of an open end of a road is selected (step 636). In cases where a design designating parameter indicating the closing of each road end with a straight line segment is selected, the simplified deformed map is processed by the generating unit 97 to close each road end with a straight line segment in the simplified deformed map (step 637). Also, in cases where a design designating parameter indicating the closing of each road end with a curved line segment is selected, the simplified deformed map is processed by the generating unit 97 to close each road end with a curved line segment in the simplified deformed map (step 638). Also, in cases where any design designating parameter indicating the closing of each road end is not selected, the closing of each road end is not performed in the generating unit 97 (step 639).

After the step 637, 638 or 639, it is checked whether or not a design designating parameter indicating the resetting of a crossing angle at an intersection of two particular roads is selected (step 640). In cases where a design designating parameter indicating the resetting of a crossing angle at an intersection of two particular roads to the right angle is selected, the simplified deformed map is processed by the crossing angle resetting unit 41 of the generating unit 97 to reset a crossing angle at an intersection of two particular roads to the right angle (step 641). In contrast, in cases where a design designating parameter indicating the resetting of a crossing angle at an intersection of two particular roads is not selected, the resetting of a crossing angle is not performed in the generating unit 97 (step 642).

After the step 641 or 642, it is checked whether or not a design designating parameter indicating the straightening of a particular road is selected (step 643). In cases where a design designating parameter indicating the straightening of the particular road is selected, the simplified deformed map is processed by the road shape deforming unit 43 of the generating unit 97 to straighten the particular road (step 644). In contrast, in cases where a design designating parameter indicating the straightening of the particular road is not selected, the straightening of the particular road is not performed in the generating unit 97 (step 645).

After the step 644 or 645, it is checked whether or not a design designating parameter indicating the simplifying of a particular road is selected (step 646). In cases where a design designating parameter indicating the simplifying of a particular road is selected, the simplified deformed map is processed by the target object no-related road area simplifying unit 40 of the generating unit 97 to simplify the drawing of the particular road (step 647). In contrast, in cases where a design designating parameter indicating the simplifying of a particular road is not selected, the simplifying of a particular road is not performed in the generating unit 97 (step 648).

After the step 647 or 648, it is checked whether or not a design designating parameter indicating the display of route information is selected (step 649). In cases where a design designating parameter indicating the display of route information is selected, the simplified deformed map is processed by the generating unit 97 to display route information (step 650). In contrast, in cases where a design designating parameter indicating the display of route information is not selected, the display of route information is not performed in the generating unit 97 (step 651).

After the step 650 or 651, it is checked whether or not a design designating parameter indicating a means of transport is selected (step 652). In cases where a design designating parameter indicating "walking" is selected, the simplified deformed map is processed by the map displaying area setting unit 72 of the generating unit 97 to set the displaying area for the simplified deformed map to a narrow area along a route of the user moving on foot and draw the narrow area in detail (step 653). In contrast, in cases where a design designating parameter indicating "car" is selected, the simplified deformed map is processed by the map displaying area setting unit 72 of the generating unit 97 to set the displaying area for the simplified deformed map to a broad area along a route of the user moving by car and draw the broad area roughly (step 654). Thereafter, the generation of the simplified deformed map is completed (step 655).

Figure 82B:
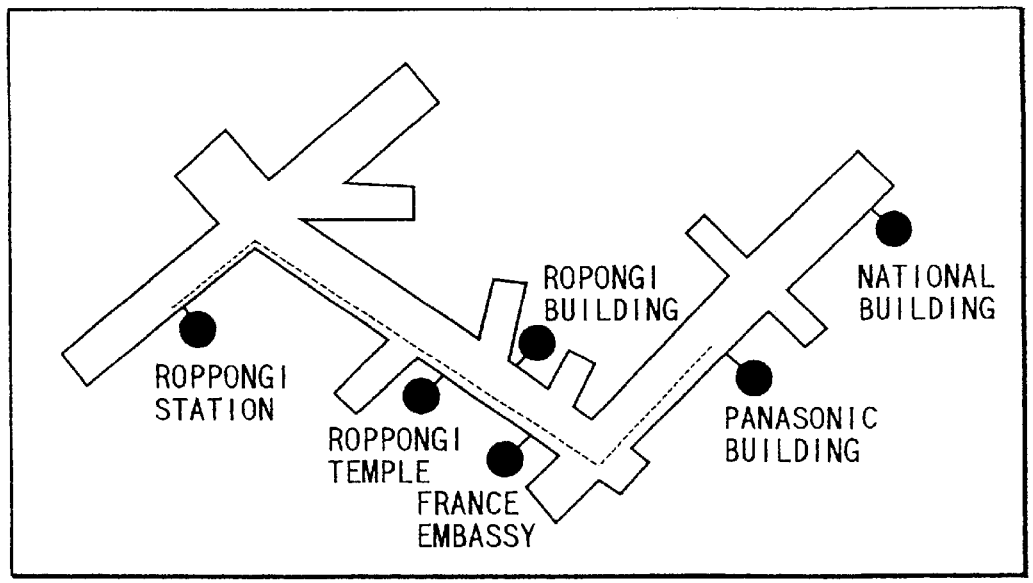
FIG. 82(b) is a simplified deformed map displayed by selecting the design designating parameters shown in FIG. 82(a)

For example, in cases where the user selects a plurality of design designating parameters indicated black circles in FIG. 82(*a*) in the steps 632, 636, 640, 643, 646, 649 and 652, a simplified deformed map shown in FIG. 82(*b*) is displayed in the user interface unit 88.

Figure 83B:
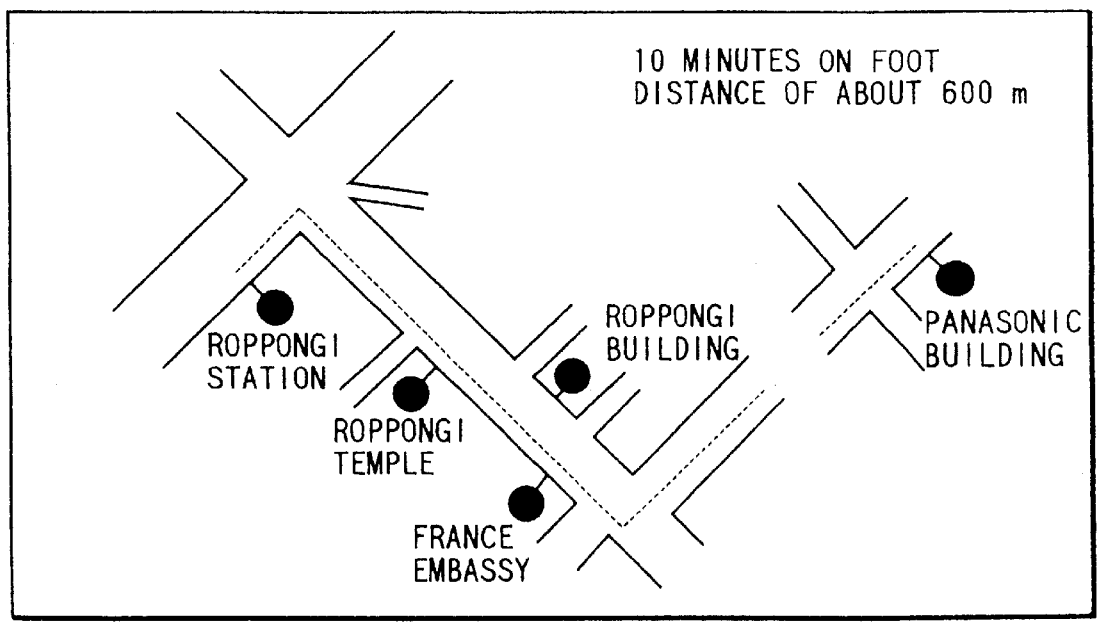
FIG. 83(b) is a simplified deformed map displayed by selecting the design designating parameters shown in FIG. 83(a)

Also, in cases where the user selects a plurality of design designating parameters indicated black circles in FIG. 83(*a*) in the steps 632, 636, 640, 643, 646, 649 and 652, a simplified deformed map shown in FIG. 83(*b*) is displayed in the user interface unit 88. In this case, because a design designating parameter indicating the display of route information is selected in the step 649 and "walking" is selected as a means of transport in the step 652, a distance from a subway station to a destination and a necessary time required to reach the destination on foot are displayed with the simplified deformed map.

Figure 84B:
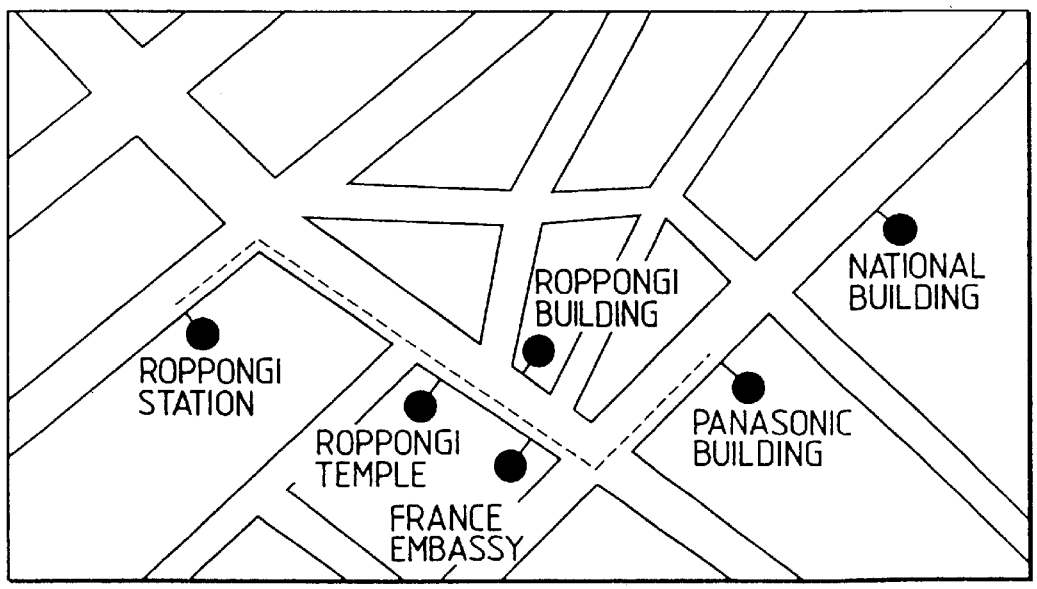
FIG. 84(b) is a simplified deformed map displayed by selecting the design designating parameters shown in FIG. 84(a).

Also, in cases where the user selects a plurality of design designating parameters indicated black circles in FIG. 84(*a*) in the steps 632, 636, 640, 643, 646, 649 and 652, a simplified deformed map shown in FIG. 84(*b*) is displayed in the user interface unit 88.

Accordingly, even though the user inputs one of various display instructions to the user interface unit 88, the user can views a simplified map deformed according to the corresponding display instruction.

Also, the communication network 84 is not limited to a wire circuit, but the particular geographical spatial data can be transmitted through a radio communication path.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A deformed map automatic generation system, comprising:

road information storing means for storing pieces of road information respectively indicating an area of a road and pieces of target object information respectively indicating a position of a target object;

input data receiving means for receiving an image drawing region as well as route information and deformation information entered by a user;

road information reading means for automatically reading out pieces of display road information and pieces of display target object information, which indicate a display road map corresponding to the image drawing region received by the input data receiving means, from the road information storing means in response to the inputting of the image drawing region, a plurality of display target objects placed at prescribed positions indicated by the display target object information being drawn with a plurality of display road areas in the display road map;

positional relationship determining means for automatically determining a positional relationship between one display target object indicated by one piece of display target object information read by the road information reading means and one display road area placed close to the display target object for each display target object and automatically generating a positional relationship fixing map, in which the display road areas are drawn with the display target objects while fixing the positional relationships of the display road areas with the display target objects, from the display road map;

route map extracting means for automatically extracting a route area around a route indicated by the route information received by the input data receiving means from the image drawing region and automatically extracting a route map corresponding to the route area from the positional relationship fixing map generated by the positional relationship determining means;

deformed map generating means for automatically generating a deformed map from the route map extracted by the route map extracting means with reference to said deformation information received by said input data receiving means, by deforming a shape of one display road area drawn in the route map to cause a substantial areal and configurational change in the deformed display road area before and after deformation, thereby decreasing a volume of data indicating the display road area while maintaining the positional relationships; and deformed map outputting means for outputting the deformed map generated by the deformed map generating means.

2. A deformed map automatic generation system according to claim 1 in which the input data receiving means additionally receives route information, and the deformed map generating means comprises:
route map generating means for automatically extracting a route area around a route indicated by the route information from the image drawing region of the positional relationship fixing map and automatically generating a route map corresponding to the route area as the deformed map.

3. A deformed map automatic generation system according to claim 1 in which the deformed map generating means comprises target object related road area lengthening means for automatically selecting two particular target objects, which are respectively related to a particular road area selected from the display road areas and overlap each other, from among the display target objects drawn in the positional relationship fixing map and automatically lengthening the particular road area not to overlap the particular target objects with each other.

4. A deformed map automatic generation system according to claim 1 in which the deformed map generating means comprises target object no-related road area simplifying means for automatically selecting a particular road area not related to any display target object from among the display target objects drawn in the positional relationship fixing map and automatically simplifying the display of the particular road area by thinning out display data of the particular road area.

5. A deformed map automatic generation system according to claim 1 in which the input data receiving means additionally receives deforming angle information, and the deformed map generating means comprises:
crossing angle resetting means for automatically selecting two particular road areas crossing each other from among the road areas drawn in the positional relationship fixing map and automatically resetting a crossing angle between the particular road areas to a deforming angle which is indicated by the deforming angle information received by the input data receiving means.

6. A deformed map automatic generation system according to claim 1 in which the input data receiving means additionally receives mesh information, and the deformed map generating means comprises:
line segment end moving means for automatically superimposing a mesh having a plurality of mesh intersections on the positional relationship fixing map according to the mesh information received by the input data receiving means and automatically moving an end of a line segment written in the positional relationship fixing map to a particular mesh intersection placed closest to the end of the line segment for each of a plurality of line segments.

7. A deformed map automatic generation system according to claim 1 in which the input data receiving means additionally receives mesh information, a plurality of line segment rows respectively composed of a series of line segments are automatically drawn in the positional relationship fixing map generated by the positional relationship determining means to determine a shape of each display road area surrounded by one line segment row, and the deformed map generating means comprises:

a road shape deforming means for automatically superimposing a mesh having a plurality of lateral lines and a plurality of longitudinal lines on the positional relationship fixing map according to the mesh information received by the input data receiving means, automatically detecting a plurality of crossing points, respectively denoting a point at which one line segment of one line segment row crosses one lateral or longitudinal line of the mesh, as a group of crossing points for each line segment row and automatically replacing one line segment row passing though one group of crossing points with an approximate line segment row composed of a plurality of straight approximate line segments respectively connecting one pair of crossing points adjacent to each other, for each line segment row drawn in the positional relationship fixing map.

8. A deformed map automatic generation system according to claim 1 in which the input data receiving means additionally receives a specific point; and the deformed map generating means comprises:
map displaying area setting means for automatically specifying specific display target objects placed around the specified point received by the input data receiving means in the positional relationship fixing map on condition that the number of specific display target objects is a prescribed value, automatically setting a displaying area around the specific point on condition that the specific display target objects are arranged in the displaying area and automatically generating a deformed map corresponding to the displaying area.

9. A deformed map automatic generation system according to claim 1 in which the deformed map generating means comprises:
a road area removing means for automatically selecting a particular road area, of which a particular closed area has a size smaller than a predetermined size, from among the display road areas respectively having a closed area in the positional relationship fixing map and removing the particular road area from the positional relationship fixing map.

10. A deformed map automatic generation system according to claim 1 in which the deformed map generating means comprises:
curved road straightening means for automatically selecting a particular road area indicating a road curved at an angle smaller than a predetermined angle from among the display road areas of the positional relationship fixing map and deforming the particular road area to straighten the curved road.

11. A deformed map automatic generation system according to claim 1 in which the deformed map generating means comprises:
long road shortening means for automatically selecting a particular road area indicating a straight road longer than a prescribed length from among the display road areas of the positional relationship fixing map and automatically deforming the particular road area to shorten the straight road.

12. A deformed map automatic generation system according to claim 1 in which
the deformed map generating means comprises:
target object deleting means for automatically selecting a particular target object overlapping with one of the display target objects from among the display target objects of the positional relationship fixing map and deleting the particular target object from the positional relationship fixing map.

13. A deformed map automatic generation system according to claim 1 in which the deformed map generating means comprises target object related road area lengthening means for automatically selecting from among the display target objects in the positional relationship fixing map two particular target objects, which overlap each other and which are respectively related to a particular road area, the particular road area selected from the display road areas and being drawn in only a sub-portion of the positional relationship fixing map,
said target object related road area lengthening means operating for automatically enlarging only the portion of the positional relationship fixing map in which the particular road area is drawn, thereby deforming another sub-portion of the positional relationship fixing map and avoiding overlap of the particular target objects with each other.

14. A deformed map generation system, comprising:
road information storing means for storing pieces of road information respectively indicating an area of a road and pieces of target object information respectively indicating a position of a target object;
input data receiving means for receiving an image drawing region and deformed map generating information entered by a user;
road information reading means for reading out pieces of display road information and pieces of display target object information, which indicate a display road map corresponding to said image drawing region, from the road information storing means in response to the inputting of said image drawing region, a plurality of display target objects placed at prescribed positions indicated by the display target object information being drawn with a plurality of display road areas in the display road map;
positional relationship determining means for determining a positional relationship between at least one of said display target objects and said display road areas placed close to said one of the display target objects and generating a positional relationship fixing map from the display road map, in which the display road areas are drawn with the said at least one of the display target objects while fixing the positional relationships of the display road areas with said at least one of the display target objects;
deformed map generating means for generating a deformed map from said positional relationship fixing map by deforming a shape of at least one of said display road areas to cause a substantial areal and configurational change in the deformed display road area before and after deformation while maintaining the positional relationships, and
deformed map outputting means for outputting the deformed map generated by the deformed map generating means.

15. The deformed map generation system in accordance with claim 14, wherein said deformed map generating means generates said deformed map by emphasizing a display road area relevant to said target object and simplifying a display road area not relevant to said target object.

16. A deformed map automatic generation system, comprising:
road information storing means for storing pieces of road information respectively indicating an area of a road and pieces of target object information respectively indicating a position of a target object;
said road information storing means storing road areas as display objects;
input data receiving means for receiving an image drawing region as well as route information and deformation information entered by a user;
road information reading means for automatically reading out pieces of display road information and pieces of display target object information, which indicate a display road map corresponding to the image drawing region received by the input data receiving means, from the road information storing means in response to the inputting of the image drawing region, a plurality of display target objects placed at prescribed positions indicated by the display target object information being drawn with a plurality of display road areas in the display road map;
positional relationship determining means for automatically determining a positional relationship between one display target object indicated by one piece of display target object information read by the road information reading means and one display road area placed close to the display target object for each display target object and automatically generating a positional relationship fixing map, in which the display road areas are drawn with the display target objects while fixing the positional relationships of the display road areas with the display target objects, from the display road map;
route map extracting means for automatically extracting a route area around a route indicated by the route information received by the input data receiving means from the image drawing region and automatically extracting a route map corresponding to the route area from the positional relationship fixing map generated by the positional relationship determining means;
deformed map generating means for automatically generating a deformed map from the route map extracted by the route map extracting means with reference to said deformation information received by said input data receiving means, by deforming a shape of one display road area drawn in the route map to cause a substantial areal and configurational change in the deformed display road area before and after deformation,
said deformed map generating means modifying a configuration of said one display road area by changing an angular relation between peripheral segments thereof, thereby decreasing a volume of data indicating the display road area while maintaining the positional relationships; and
deformed map outputting means for outputting the deformed map generated by the deformed map generating means.

* * * * *